(12) United States Patent
Boles et al.

(10) Patent No.: US 10,719,495 B2
(45) Date of Patent: Jul. 21, 2020

(54) STREAM SELECTION FOR MULTI-STREAM STORAGE DEVICES

(71) Applicant: Micron Technology, Inc., Boise, ID (US)

(72) Inventors: David Boles, Austin, TX (US); John M. Groves, Austin, TX (US); Steven Moyer, Round Rock, TX (US); Alexander Tomlinson, Austin, TX (US)

(73) Assignee: Micron Technology, Inc., Boise, ID (US)

(*) Notice: Subject to any disclaimer, the term of this patent is extended or adjusted under 35 U.S.C. 154(b) by 266 days.

(21) Appl. No.: 15/428,976

(22) Filed: Feb. 9, 2017

(65) Prior Publication Data
US 2018/0225316 A1    Aug. 9, 2018

(51) Int. Cl.
*G06F 16/22* (2019.01)

(52) U.S. Cl.
CPC .............................. *G06F 16/2246* (2019.01)

(58) Field of Classification Search
CPC ......... G06F 17/30327; G06F 17/30371; G06F 17/30867; G06F 16/2246
USPC ........................................................ 707/696
See application file for complete search history.

(56) References Cited

U.S. PATENT DOCUMENTS

| | | | |
|---|---|---|---|
| 5,204,958 A | 4/1993 | Cheng et al. | |
| 5,530,850 A | 6/1996 | Ford et al. | |
| 6,597,957 B1 | 7/2003 | Beakley | |
| 9,367,260 B1 | 6/2016 | Natanzon | |
| 9,400,816 B1 | 7/2016 | Gubarev et al. | |
| 9,858,301 B1 | 1/2018 | Hardy et al. | |
| 10,235,257 B1 | 3/2019 | Danilov et al. | |
| 2005/0165865 A1 | 7/2005 | Farmer | |
| 2008/0016066 A1 | 1/2008 | Kuznetsov et al. | |
| 2010/0246446 A1 | 9/2010 | Du et al. | |
| 2012/0072656 A1 | 3/2012 | Archak et al. | |
| 2012/0223889 A1 | 9/2012 | Medlock et al. | |
| 2013/0117524 A1 | 5/2013 | Helman et al. | |

(Continued)

FOREIGN PATENT DOCUMENTS

| | | |
|---|---|---|
| CN | 101515298 B | 9/2013 |
| CN | 105095287 A | 11/2015 |

(Continued)

OTHER PUBLICATIONS

"Taiwanese Application Serial No. 107104566, First Office Action dated Feb. 14, 2019", w English Translation, 36 pgs.

(Continued)

*Primary Examiner* — Syed H Hasan
*Assistant Examiner* — Saba Ahmed
(74) *Attorney, Agent, or Firm* — Schwegman Lundberg & Woessner, P.A.

(57) ABSTRACT

Systems and techniques for stream selection from multi-stream storage devices. Notification of a KVS tree write request for a multi-stream storage device is received. The notification includes a KVS tree scope corresponding to data in the write request. A stream identifier (ID) is assigned to the write request based on the KVS tree scope and a stability value of the write request. The stream ID is returned to govern stream assignment to the write request, the stream assignment modifying a write operation of the multi-stream storage device.

38 Claims, 26 Drawing Sheets

(56) References Cited

U.S. PATENT DOCUMENTS

| | | | |
|---|---|---|---|
| 2013/0218840 A1 | 8/2013 | Smith et al. | |
| 2013/0306276 A1 | 11/2013 | Duchesneau | |
| 2014/0064490 A1 | 3/2014 | Wang et al. | |
| 2014/0074841 A1 | 3/2014 | Majnemer et al. | |
| 2014/0082028 A1 | 3/2014 | Sivasubramanian et al. | |
| 2014/0129530 A1 | 5/2014 | Raufman | |
| 2014/0222870 A1 | 8/2014 | Zhang | |
| 2014/0279944 A1* | 9/2014 | Ghandeharizadeh | G06F 17/30371 707/690 |
| 2014/0344287 A1* | 11/2014 | Carvalho | G06F 17/30433 707/748 |
| 2015/0058291 A1 | 2/2015 | Earl et al. | |
| 2015/0127658 A1* | 5/2015 | Ding | G06F 17/30336 707/747 |
| 2015/0178375 A1 | 6/2015 | Ishizaki | |
| 2015/0244558 A1 | 8/2015 | Tully et al. | |
| 2015/0254272 A1* | 9/2015 | Regni | G06F 17/30227 707/694 |
| 2015/0286695 A1 | 10/2015 | Kadayam et al. | |
| 2015/0293958 A1 | 10/2015 | Chen et al. | |
| 2015/0347495 A1 | 12/2015 | Wang et al. | |
| 2016/0173445 A1 | 6/2016 | Mosko et al. | |
| 2016/0275094 A1 | 9/2016 | Lipcon | |
| 2016/0335299 A1 | 11/2016 | Vemulapati et al. | |
| 2017/0017411 A1* | 1/2017 | Choi | G06F 12/0246 |
| 2017/0141791 A1 | 5/2017 | Balegar et al. | |
| 2017/0185622 A1 | 6/2017 | Prahlad et al. | |
| 2017/0192989 A1 | 7/2017 | Georgiev et al. | |
| 2017/0212680 A1 | 7/2017 | Waghulde | |
| 2018/0011766 A1 | 1/2018 | Lee et al. | |
| 2018/0067975 A1 | 3/2018 | Kato et al. | |
| 2018/0089074 A1 | 3/2018 | Li et al. | |
| 2018/0225315 A1 | 8/2018 | Boles et al. | |
| 2018/0225321 A1 | 8/2018 | Boles et al. | |
| 2018/0225322 A1 | 8/2018 | Boles et al. | |
| 2018/0253386 A1 | 9/2018 | Qiu et al. | |
| 2019/0034427 A1 | 1/2019 | Trika et al. | |
| 2019/0065557 A1 | 2/2019 | Boles et al. | |
| 2020/0117728 A1 | 4/2020 | Tomlinson et al. | |
| 2020/0117744 A1 | 4/2020 | Tomlinson | |

FOREIGN PATENT DOCUMENTS

| | | |
|---|---|---|
| CN | 110383261 A | 10/2019 |
| KR | 20130018602 | 2/2013 |
| KR | 20130115929 A | 10/2013 |
| TW | 200421114 A | 10/2004 |
| TW | 200822066 A | 5/2008 |
| TW | 200836084 A | 9/2008 |
| TW | 201342088 | 10/2013 |
| TW | 201408070 | 2/2014 |
| TW | I454166 B | 9/2014 |
| TW | 201837720 | 10/2018 |
| TW | 201841122 A | 11/2018 |
| TW | 201841123 A | 11/2018 |
| TW | 201842454 A | 12/2018 |
| WO | WO-2018148149 A1 | 8/2018 |
| WO | WO-2018148151 A1 | 8/2018 |
| WO | WO-2018148198 A1 | 8/2018 |
| WO | WO-2018148203 A1 | 8/2018 |
| WO | WO-2020076580 A1 | 4/2020 |
| WO | WO-2020076581 A1 | 4/2020 |

OTHER PUBLICATIONS

"International Application Serial No. PCT/US2018/016892, International Search Report dated Jun. 4, 2018", 3 pgs.

"International Application Serial No. PCT/US2018/016892, Written Opinion dated Jun. 4, 2018", 9 pgs.

"International Application Serial No. PCT/US2018/016906, International Search Report dated Jun. 4, 2018", 3 pgs.

"International Application Serial No. PCT/US2018/016906, Written Opinion dated Jun. 4, 2018", 9 pgs.

"International Application Serial No. PCT/US2018/017043, International Search Report dated May 28, 2018", 3 pgs.

"International Application Serial No. PCT/US2018/017043, Written Opinion dated May 28, 2018", 7 pgs.

"International Application Serial No. PCT/US2018/017056, International Preliminary Report on Patentability dated Aug. 22, 2019", 9 pgs.

"International Application Serial No. PCT/US2019/054254, International Search Report dated Jan. 15, 2020", 3 pgs.

"International Application Serial No. PCT/US2019/054254, Written Opinion dated Jan. 15, 2020", 4 pgs.

"Taiwanese Application Serial No. 107104242, Office Action dated Feb. 25, 2019",w/English Translation, 22 pgs.

"Taiwanese Application Serial No. 107104242, Response filed Jun. 4, 2019 to Office Action dated Feb. 25, 2019", w/ English Claims, 105 pgs.

"Taiwanese Application Serial No. 107104545, First Office Action dated Apr. 11, 2019", w/ English translation, 44 pgs.

"Taiwanese Application Serial No. 107104545, Office Action dated Dec. 21, 2018",W/English Translation, 17 pgs.

"Taiwanese Application Serial No. 107104545, Response filed May 19, 2019 to Office Action dated Dec. 21, 2018", w/English Claims, 15 pgs.

"Taiwanese Application Serial No. 107104545, Response filed Jul. 12, 2019 to First Office Action dated Apr. 11, 2019", w/ English Claims, 124 pgs.

"Taiwanese Application Serial No. 107104550, Office Action dated Jan. 9, 2019", W/ English Translation, 28 pgs.

"Taiwanese Application Serial No. 107104550, Response filed Apr. 11, 2019 to Office Action dated Jan. 9, 2019", w/ English Claims, 93 pgs.

"Taiwanese Application Serial No. 107104566, Response filed Aug. 15, 2019 to First Office Action dated Feb. 14, 2019", w/ English Claims, 104 pgs.

"Transaction Log", Wkipedia, (Accessed on Apr. 8, 2019), 3 pgs.

"Xingbo Wu and Yuehai Xu", LSM-trie: An LSM-tree-based Ultra-Large Key-Value Store for Small Data, https://www.usenix.org/system/files/conference/atc15/atc15-paper-wu.pdf, (Jul. 8-10, 2015), 13 pgs.

Amur, Hrishikesh, et al., "Design of a Write-Optimized Data Store", [Online] Retrieved from the internet <https://smartech.gatech.edu/handle/1853/53627>, (2013), 12 pgs.

Clements, Austin T, etal., "Scalable Address Spaces Using RCU Balanced Trees", (2012), 12 pgs.

Ghosh, Mainak, et al., "Fast Compaction Algorithms for NoSQL Databases", IEEE 35th International Conference on Distributed Computing Systems, (2015), 10 pgs.

Lim, Heyontaek, et al., "TowardsAccurate and Fast Evaluation of Multi-Stage Log-Structured Designs", USENIX Association 14th USENIX Conference on File and Storage Technologies FAST 16, (2016), 149-166.

Lu, Lanyue, et al., "WiscKey: Separating Keys from Values in SSD-conscious Storage", 14th USENIX Conference, (2016), 17 pgs.

O'Neil, Patrick E., et al., "The Log-Structured Merge-Tree", ACTA Infomiatica 33(4), (1996).

Papapetrou, Odysseas, et al., "Cardinality estimation and dynamic length adaptation for Bloom filters", 34 pgs.

Peng, Wang, et al., "An Efficient Design and Implementation of LSM-Tree based Key-Value Store on Open-Channel SSD", Proceedings of the Ninth European Conference on ComputerSystems(EuroSys 2014), Article No. 6, (Apr. 2014), 14 pgs.

Putze, Felix, et al., "Cache-, Hash-and Space-EfficientBloom Filters", (2007), 14 pgs.

Xingbo, Wu, et al., "LSM-trie: An LSM-tree-based Ultra-Large Key-Value Store for Small Data", Proceedingsof 2015 USENIX Annual Technical Conference,, (Jul. 8-10, 2015), 71-82.

Yuzhe, Tang, et al., "Deferred Lightweight Indexing for Log-Structured Key-Value Stores", 15th IEEE/ACM International Symposium on Cluster, Cloud and Grid Computing (CCGrid), (May 4-7, 2015), 10 pgs.

(56) References Cited

OTHER PUBLICATIONS

U.S. Appl. No. 16/220,646, filed Dec. 14, 2018, Key-Value Store Using Journaling With Selective Data Storage Format.
U.S. Appl. No. 16/156,440, filed Oct. 10, 2018, Key-Value Store Tree Data Block Spill With Compaction.
U.S. Appl. No. 16/220,729, filed Dec. 14, 2018, Key-Value Store Tree With Selective Use of Key Portion.
U.S. Appl. No. 16/156,400, filed Oct. 10, 2018, Counter-Based Compaction of Key-Value Store Tree Data Block.
U.S. Appl. No. 16/232,422, filed Dec. 26, 2018, Data Tree With Order-Based Node Traversal.
"International Application Serial No. PCT US2019 054243, International Search Report dated Jan. 22, 2020", 3 pgs.
"International Application Serial No. PCT US2019 054243, Written Opinion dated Jan. 22, 2020", 4 pgs.
"International Application Serial No. PCT/US2018/017056, International Search Report dated Jun. 4, 2018", 4 pgs.
"International Application Serial No. PCT/US2018/017056, Written Opinion dated Jun. 4, 2018", 7 pgs.
"NVM Express Revision 1.2 specification", NVM Express, [Online] Retrieved from the internet:<http://nvmexpress.org/resources/specifications>, (Nov. 3, 2014), 1-205.
Trong-Dat, Nguyen, et al., "Opportunity of using Multi-Streamed SSD in MongoDB", In: Korea Computer Congress 2016, [Online]Retrieved from the internet: <http://www.dbpia.co.kr/Article/NODE07018146>, (Jun. 2016), 169-171.
Kang, Jeong-Uk, et al., "The Multi-streamed Solid-State Drive", 5 pgs.
"International Application Serial No. PCT/US2019/065692, International Search Report dated Apr. 3, 2020", 3 pgs.
"International Application Serial No. PCT/US2019/065692, Written Opinion dated Apr. 3, 2020", 4 pgs.
"International Application Serial No. PCT/US2019/065702, International Search Report dated Apr. 3, 2020", 3 pgs.
"International Application Serial No. PCT/US2019/065702, Written Opinion dated Apr. 3, 2020", 5 pgs.

\* cited by examiner

US 10,719,495 B2

STREAM SELECTION FOR MULTI-STREAM STORAGE DEVICES

TECHNICAL FIELD

Embodiments described herein generally relate to a key-value data store and more specifically to stream selection for multi-stream storage devices.

BACKGROUND

Data structures are organizations of data that permit a variety of ways to interact with the data stored therein. Data structures may be designed to permit efficient searches of the data, such as in a binary search tree, to permit efficient storage of sparse data, such as with a linked list, or to permit efficient storage of searchable data such as with a B-tree, among others.

Key-value data structures accept a key-value pair and are configured to respond to queries for the key. Key-value data structures may include such structures as dictionaries (e.g., maps, hash maps, etc.) in which the key is stored in a list that links (or contains) the respective value. While these structures are useful in-memory (e.g., in main or system state memory as opposed to storage), storage representations of these structures in persistent storage (e.g., on-disk) may be inefficient. Accordingly, a class of log-based storage structures have been introduced. An example is the log structured merge tree (LSM tree).

There have been a variety of LSM tree implementations, but many conform to a design in which key-value pairs are accepted into a key-sorted in-memory structure. As that in-memory structure fills, the data is distributed amongst child nodes. The distribution is such that keys in child nodes are ordered within the child nodes themselves as well as between the child nodes. For example, at a first tree-level with three child nodes, the largest key within a left-most child node is smaller than a smallest key from the middle child node and the largest key in the middle child node is smaller than the smallest key from the right-most child node. This structure permits an efficient search for both keys, but also ranges of keys in the data structure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
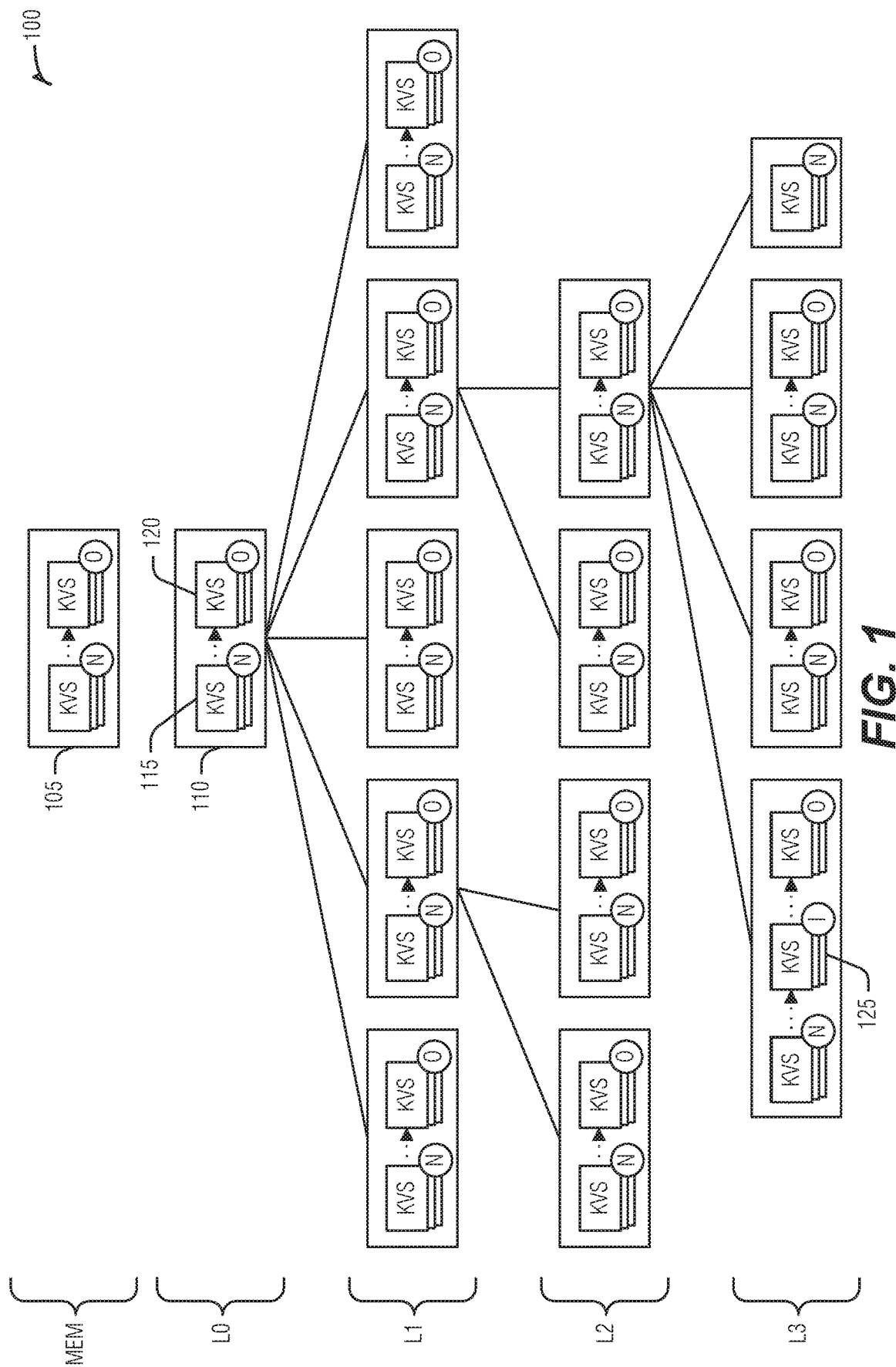
FIG. 1 illustrates an example of a KVS tree, according to an embodiment.

LSM trees have become a popular storage structure for data in which high volume writes are expected and also for which efficient access to the data is expected. To support these features, portions of the LSM are tuned for the media upon which they are kept and a background process generally addresses moving data between the different portions (e.g., from the in-memory portion to the on-disk portion). Herein, in-memory refers to a random access and byte-addressable device (e.g., static random access memory (SRAM) or dynamic random access memory (DRAM)) and on-disk refers to a block addressable device (e.g., hard disk drive, compact disc, digital versatile disc, or solid-state drive (SSD) such as a flash memory based device), which also be referred to as a media device or a storage device. LSM trees leverage the ready access provided by the in-memory device to sort incoming data, by key, to provide ready access to the corresponding values. As the data is merged onto the on-disk portion, the resident on-disk data is merged with the new data and written in blocks back to disk.

While LSM trees have become a popular structure underlying a number of data base and volume storage (e.g., cloud storage) designs, they do have some drawbacks. First, the constant merging of new data with old to keep the internal structures sorted by key results in significant write amplification. Write amplification is an increase in the minimum number of writes for data that is imposed by a given storage technique. For example, to store data, it is written at least once to disk. This may be accomplished, for example, by simply appending the latest piece of data onto the end of already written data. This structure, however, is slow to search (e.g., it grows linearly with the amount of data), and may result in inefficiencies as data is changed or deleted. LSM trees increase write amplification as they read data from disk to be merged with new data and then re-write that data back to disk. The write amplification problem may be exacerbated when storage device activities are included, such as defragmenting hard disk drives or garbage collection of SSDs. Write amplification on SSDs may be particularly pernicious as these devices may "wear out" as a function of a number of writes. That is. SSDs have a limited lifetime measured in writes. Thus, write amplification with SSDs works to shorten the usable life of the underlying hardware.

A second issue with LSM trees includes the large amount of space that may be consumed while performing the merges. LSM trees ensure that on-disk portions are sorted by key. If the amount of data resident on-disk is large, a large amount of temporary, or scratch, space may be consumed to perform the merge. This may be somewhat mitigated by dividing the on-disk portions into non-overlapping structures to permit merges on data subsets, but a balance between structure overhead and performance may be difficult to achieve.

A third issue with LSM trees includes possibly limited write throughput. This issue stems from the essentially always sorted nature of the entirety of the LSM data. Thus, large volume writes that overwhelm the in-memory portion must wait until the in-memory portion is cleared with a possibly time-consuming merge operation. To address this issue, a write buffer (WB) tree has been proposed in which smaller data inserts are manipulated to avoid the merge issues in this scenario. Specifically, a WB tree hashes incoming keys to spread data, and stores the key-hash and value combinations in smaller intake sets. These sets may be merged at various times or written to child nodes based on the key-hash value. This avoids the expensive merge operation of LSM trees while being performant in looking up a particular key. However, WB trees, being sorted by key-hash, result in expensive whole tree scans to locate values that are not directly referenced by a key-hash, such as happens when searching for a range of keys.

To address the issues noted above, a KVS tree and corresponding operations are described herein. KVS trees are a tree data structure including nodes with connections between parent and child based on a predetermined derivation of a key rather than the content of the tree. The nodes include temporally ordered sequences of key-value sets (kvsets). The kvsets contain key-value pairs in a key-sorted structure. Kvsets are also immutable once written. The KVS tree achieves the write-throughput of WB trees while improving upon WB tree searching by maintaining kvsets in nodes, the kvsets including sorted keys as well as, in an example, key metrics (such as bloom filters, minimum and maximum keys, etc.), to provide efficient search of the kvsets. In many examples, KVS trees may improve upon the temporary storage issues of LSM trees by separating keys from values and merging smaller kvset collections. Additionally, the described KVS trees may reduce write amplification through a variety of maintenance operations on kvsets. Further, as the kvsets in nodes are immutable, issues such as write wear on SSDs may be managed by the data structure, reducing garbage collection activities of the device itself. This has the added benefit of freeing up internal device resources (e.g., bus bandwidth, processing cycles, etc.) that result in better external drive performance (e.g., read or write speed). Additional details and example implementations of KVS trees and operations thereon are described below.

FIG. 1 illustrates an example of a KVS tree 100, according to an embodiment. The KVS tree 100 is a key-value data structure that is organized as a tree. As a key-value data structure, values are stored in the tree 100 with corresponding keys that reference the values. Specifically, key-entries are used to contain both the key and additional information, such as a reference to the value, however, unless otherwise specified, the key-entries are simply referred to as keys for simplicity. Keys themselves have a total ordering within the tree 100. Thus, keys may be sorted amongst each other. Keys may also be divided into sub-keys. Generally, sub-keys are non-overlapping portions of a key. In an example, the total ordering of keys is based on comparing like sub-keys between multiple keys (e.g., a first sub-key of a key is compared to the first sub-key of another key). In an example, a key prefix is a beginning portion of a key. The key prefix may be composed of one or more sub-keys when they are used.

The tree 100 includes one or more nodes, such as node 110. The node 110 includes a temporally ordered sequence of immutable key-value sets (kvsets). As illustrated, kvset 115 includes an 'N' badge to indicate that it is the newest of the sequence while kvset 120 includes an 'O' badge to indicate that it is the oldest of the sequence. Kvset 125 includes an 'I' badge to indicate that it is intermediate in the sequence. These badges are used throughout to label kvsets, however, another badge (such as an 'X') denotes a specific kvset rather than its position in a sequence (e.g., new, intermediate, old, etc.), unless it is a tilde '~' in which case it is simply an anonymous kvset. As is explained in greater detail below, older key-value entries occur lower in the tree 100. Thus, bringing values up a tree-level, such as from L2 to L1 results in a new kvset in the oldest position in the recipient node.

The node 110 also includes a determinative mapping for a key-value pair in a kvset of the node to any one child node of the node 110. As used herein, the determinative mapping means that, given a key-value pair, an external entity could trace a path through the tree 100 of possible child nodes without knowing the contents of the tree 100. This, for example, is quite different than a B-tree, for example, where the contents of the tree will determine where a given key's value will fall in order to maintain the search-optimized structure of the tree. Instead, here, the determinative mapping provides a rule such that, for example, given a key-value pair, one may calculate the child at L3 this pair would map even if the maximum tree-level (e.g., tree depth) is only at L1. In an example, the determinative mapping includes a portion of a hash of a portion of the key. Thus, a sub-key may be hashed to arrive at a mapping set. A portion of this set may be used for any given level of the tree. In an example, the portion of the key is the entire key. There is no reason that the entire key may not be used.

In an example, the hash includes a multiple of non-overlapping portions including the portion of the hash. In an example, each of the multiple of non-overlapping portions corresponds to a level of the tree. In an example, the portion of the hash is determined from the multiple of non-overlapping portions by a level of the node. In an example, a maximum number of child nodes for the node is defined by a size of the portion of the hash. In an example, the size of the portion of the hash is a number of bits. These examples may be illustrated by taking a hash of a key that results in 8 bits. These eight bits may be divided into three sets of the first two bits, bits three through six (resulting in four bits), and bits seven and eight. Child nodes may be index based on a set of bits, such that children at the first level (e.g., L1) have two bit names, children on the second level (e.g., L2) have four-bit names, and children on the third level (e.g., L3) have two bit names. An expanded discussion is included below with regard to FIGS. 13 and 14.

Kvsets are the key and value store organized in the nodes of the tree 100. The immutability of the kvsets means that the kvset, once placed in a node, does not change. A kvset may, however, be deleted, some or all of its contents may be added to a new kvsets, etc. In an example, the immutability of the kvset also extends to any control or meta-data contained within the kvset. This is generally possible because the contents to which the meta-data applies are unchanging and thus, often the meta-data will also be static at that point.

Also of note, the KVS tree 100 does not require uniqueness among keys throughout the tree 100, but a kvset does have only one of a key. That is, every key in a given kvset is different than the other keys of the kvset. This last statement is true for a particular kvset, and thus may not apply when, for example, a kvset is versioned. Kvset versioning may be helpful for creating a snapshot of the data. With a versioned kvset, the uniqueness of a key in the kvset is determined by a combination of the kvset identification (ID) and the version. However, two different kvsets (e.g., kvset 115 and kvset 120) may each include the same key.

In an example, the kvset includes a key-tree to store key entries of key-value pairs of the kvset. A variety of data structures may be used to efficiently store and retrieve unique keys in the key-tree (it may not even be a tree), such as binary search trees, B-trees, etc. In an example, the keys are stored in leaf nodes of the key-tree. In an example, a maximum key in any subtree of the key-tree is in a rightmost entry of a rightmost child. In an example, a rightmost edge of a first node of the key-tree is linked to a sub-node of the key-tree. In an example, all keys in a subtree rooted at the sub-node of the key-tree are greater than all keys in the first node of the key tree. These last few examples illustrate features of a KB tree, as discussed below with regard to FIG. 6.

In an example, key entries of the kvset are stored in a set of key-blocks including a primary key-block and zero or more extension key-blocks. In an example, members of the set of key-blocks correspond to media blocks for a storage medium, such as an SSD, hard disk drive, etc. In an example, each key-block includes a header to identify it as a key-block. In an example, the primary key-block includes a list of media block identifications for the one or more extension key-blocks of the kvset.

In an example, the primary key-block includes a header to a key-tree of the kvset. The header may include a number of values to make interacting with the keys, or kvset generally, easier. In an example, the primary key-block, or header, includes a copy of a lowest key in a key-tree of the kvset. Here, the lowest key is determined by a pre-set sort-order of the tree (e.g., the total ordering of keys in the tree 100). In an example, the primary key-block includes a copy of a highest key in a key-tree of the kvset, the highest key determined by a pre-set sort-order of the tree. In an example, the primary key-block includes a list of media block identifications for a key-tree of the kvset. In an example, the primary key-block includes a bloom filter header for a bloom filter of the kvset. In an example, the primary key-block includes a list of media block identifications for a bloom filter of the kvset.

In an example, values of the kvset are stored in a set of value-blocks. Here, members of the set of value-blocks correspond to media blocks for the storage medium. In an example, each value-block includes a header to identify it as a value-block. In an example, a value block includes storage section to one or more values without separation between. Thus, the bits of a first value run into bits of a second value on the storage medium without a guard, container, or other delimiter between them. In an example, the primary key-block includes a list of media block identifications for value-blocks in the set of value blocks. Thus, the primary key-block manages storage references to value-blocks.

In an example, the primary key-block includes a set of metrics for the kvset. In an example, the set of metrics include a total number of keys stored in the kvset. In an example, the set of metrics include a number of keys with tombstone values stored in the kvset. As used herein, a tombstone is a data marker indicating that the value corresponding to the key has been deleted. Generally, a tombstone will reside in the key entry and no value-block space will be consumed for this key-value pair. The purpose of the tombstone is to mark the deletion of the value while avoiding the possibly expensive operation of purging the value from the tree 100. Thus, when one encounters the tombstone using a temporally ordered search, one knows that the corresponding value is deleted even if an expired version of the key-value pair resides at an older location within the tree 100.

In an example, the set of metrics stored in the primary key-block include a sum of all key lengths for keys stored in the kvset. In an example, the set of metrics include a sum of all value lengths for keys stored in the kvset. These last two metrics give an approximate (or exact) amount of storage consumed by the kvset. In an example, the set of metrics include an amount of unreferenced data in value-blocks (e.g., unreferenced values) of the kvset. This last metric gives an estimate of the space that may be reclaimed in a maintenance operation. Additional details of key-blocks and value-blocks are discussed below with respect to FIGS. 4 and 5.

In an example, the tree 100 includes a first root 105 in a first computer readable medium of the at least one machine readable medium, and a second root 110 in a second computer readable medium of the at least one computer readable medium. In an example, the second root is the only child to the first root. In an example, the first computer readable medium is byte addressable and wherein the second computer readable is block addressable. This is illustrated in FIG. 1 with node 105 being in the MEM tree-level to signify its in-memory location while node 110 is at L0 to signify it being in the root on-disk element of the tree 100.

Figure 2:
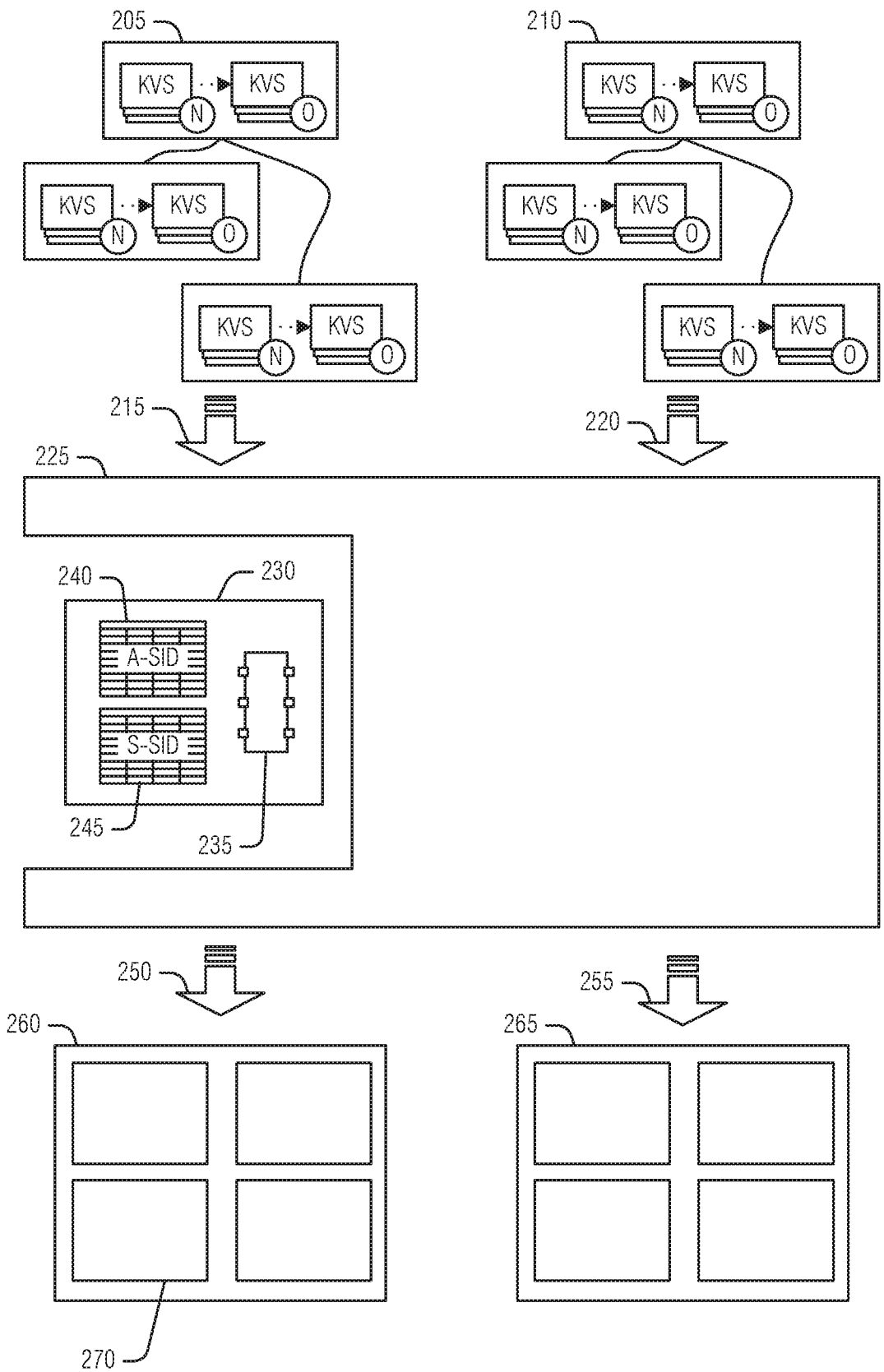
FIG. 2 is a block diagram illustrating an example of a write to a multi-stream storage device, according to an embodiment.
Figure 3:
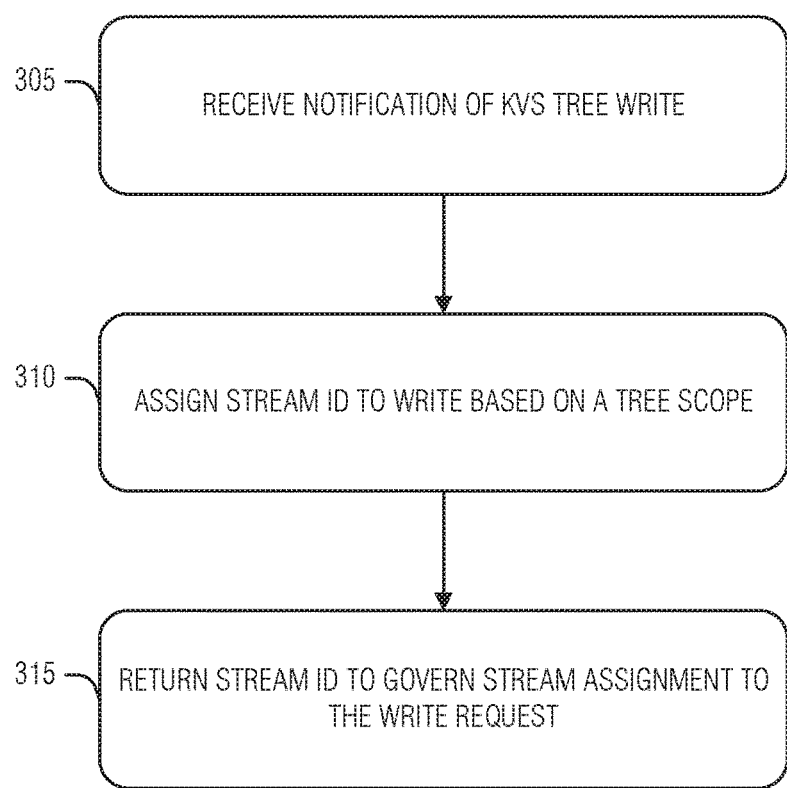
FIG. 3 illustrates an example of a method to facilitate writing to a multi-stream storage device, according to an embodiment.

The discussion above demonstrates a variety of the organization attributes of a KVS tree 100. Operations to interact with the tree 100, such as tree maintenance (e.g., optimization, garbage collection, etc.), searching, etc. are discussed below with respect to FIGS. 7-25. Before proceeding to these subjects, FIGS. 2 and 3 illustrate a technique to leverage the structure of the KVS tree 100 to implement an effective use of multi-stream storage devices.

Storage devices comprising flash memory, or SSDs, may operate more efficiently and have greater endurance (e.g., will not "wear out") if data with a similar lifetime is grouped in flash erase blocks. Storage devices comprising other non-volatile media may also benefit from grouping data with a similar lifetime, such as shingled magnetic recording (SMR) hard-disk drives (HDDs). In this context, data has a similar lifetime if it is deleted at the same time, or within a relatively small time interval. The method for deleting data on a storage device may include explicitly deallocating, logically overwriting, or physically overwriting the data on the storage device.

As a storage device may be generally unaware of the lifetime of the various data to be stored within it, the storage device may provide an interface for data access commands (e.g., reading or writing) that identify a logical lifetime group with which the data is associated. For example, the industry standard SCSI and proposed NVMe storage device interfaces specify write commands comprising data to be written to a storage device and a numeric stream identifier (stream ID) for a lifetime group called a stream, to which the data corresponds. A storage device supporting a plurality of streams is a multi-stream storage device.

Temperature is a stability value to classify data, whereby the value corresponds to a relative probability that the data will be deleted in any given time interval. For example, HOT data may be expected to be deleted (or changed) within a minute while COLD data may be expected to last an hour. In an example, a finite set of stability values may be used to specify such a classification. In an example, the set of stability values may be (Hot, Warm, Cold) where, in a given time interval, data classified as Hot has a higher probability of being deleted than data classified as Warm, which in turn has a higher probability of being deleted than data classified as Cold.

FIGS. 2 and 3 address assigning different stream IDs to different writes based on a given stability value as well as one or more attributes of the data with respect to one or more KVS trees. Thus, continuing the prior example, for a given storage device a first set of stream identifiers may be used with write commands for data classified as Hot, a second set of stream identifiers may be used with write commands for data classified as Warm. and a third set of stream identifiers may be used with write commands for data classified as Cold, where a stream identifier is in at most one of these three sets.

The following terms are provided for convenience in discussing the multi-stream storage device systems and techniques of FIGS. 2 and 3:

DID is a unique device identifier for a storage device.
SID is a stream identifier for a stream on a given storage device.
TEMPSET is a finite set of temperature values.
TEMP is an element of TEMPSET.
FID is a unique forest identifier for a collection of KVS trees.
TID is a unique tree identifier for a KVS tree. The KVS tree 100 has a TID.
LNUM is a level number in a given KVS tree, where, for convenience, the root node of the KVS tree is considered to be at tree-level 0, the child nodes of the root node (if any) are considered to be at tree-level 1, and so on. Thus, as illustrated, KVS tree 100 includes tree-levels L0 (including node 110) through L3.
NNUM is a number for a given node at a given level in a given KVS tree, where, for convenience, NNUM may be a number in the range zero through (NodeCount(LNUM)−1), where NodeCount(LNUM) is the total number of nodes at a tree-level LNUM, such that every node in the KVS tree 100 is uniquely identified by the tuple (LNUM, NNUM). As illustrated in FIG. 1, the complete listing of node tuples, starting at node 110 and progressing top-to-bottom, left-to-right, would be:
L0 (root): (0,0)
L1: (1,0), (1,1), (1,2), (1,3), (1,4)
L2: (2,0), (2,1), (2,2), (2,3)
L3: (3,0), (3,1), (3,2), (3,3)
KVSETID is a unique kvset identifier.
WTYPE is the value KBLOCK or VBLOCK as discussed below.
WLAST is a Boolean value (TRUE or FALSE) as discussed below.

FIG. 2 is a block diagram illustrating an example of a write to a multi-stream storage device (e.g., device 260 or 265), according to an embodiment. FIG. 2 illustrates multiple KVS trees, KVS tree 205 and KVS tree 210. As illustrated, each tree is respectively performing a write operation 215 and 220. These write operations are handled by a storage subsystem 225. The storage subsystem may be a device driver, such as for device 260, may be a storage product to manage multiple devices (e.g., device 260 and device 265) such as those found in operating systems, network attached storage devices, etc. In time the storage subsystem 225 will complete the writes to the storage devices in operations 250 and 255 respectively. The stream-mapping circuits 230 provide a stream ID to a given write 215 to be used in the device write 250.

In the KVS tree 205, the immutability of kvsets results in entire kvsets being written or deleted at a time. Thus, the data comprising a kvset has a similar lifetime. Data comprising a new kvset may be written to a single storage device or to several storage devices (e.g., device 260 and device 265) using techniques such as erasure coding or RAID. Further, as the size of kvsets may be larger than any given device write 250, writing the kvset may involve directing multiple write commands to a given storage device 260. To facilitate operation of the stream-mapping circuits 230, one or more of the following may be provided for selecting a stream ID for each such write command 250:

A) KVSETID of the kvset being written;
B) DID for the storage device;
C) FID for the forest to which the KVS tree belongs;
D) TID for the KVS tree;
E) LNUM of the node in the KVS tree containing the kvset;
F) NNUM of the node in the KVS tree containing the kvset;
G) WTYPE is KBLOCK if the write command is for a key-block for KVSETID on DID, or is VBLOCK if the write command is for a value-block for KVSETID on DID
H) WLAST is TRUE if the write command is the last for a KVSETID on DID, and is FALSE otherwise In an example, for each such write command, the tuple (DID, FID, TID, LNUM, NNUM, KVSETID, WTYPE, WLAST)—referred to as a stream-mapping tuple—may be sent to the stream-mapping circuits 230. The stream-mapping circuits 230 may then respond with the stream ID for the storage subsystem 225 to use with the write command 250.

The stream-mapping circuits 230 may include an electronic hardware implemented controller 235, accessible stream ID (A-SID) table 240 and a selected stream ID (S-SID) table 245. The controller 235 is arranged to accept as input a stream-mapping tuple and respond with the stream ID. In an example, the controller 235 is configured to a plurality of storage devices 260 and 265 storing a plurality of KVS trees 205 and 210. The controller 235 is arranged to obtain (e.g., by configuration, querying, etc.) a configuration for accessible devices. The controller 235 is also arranged to configure the set of stability values TEMPSET, and for each value TEMP in TEMPSET configure a fraction, number, or other determiner of the number of streams on a given storage device to use for data classified by that value.

In an example, the controller 235 is arranged to obtain (e.g., receive via configuration message, etc., retrieve from configuration device, firmware, etc.) a temperature assignment method. The temperature assignment method will be used to assign stability values to the write request 215 in this example. In an example, a stream-mapping tuple may include any one or more of DID, FID, TID, LNUM, NNUM, KVSETID, WTYPE or WLAST and be used as input to the temperature assignment method executed by the controller 235 to select a stability value TEMP from the TEMPSET. In an example, a KVS tree scope is a collection of parameters for a write specific to the KVS tree component (e.g., kvset) being written. In an example, the KVS tree scope includes one or more of FID, TID, LNUM, NNUM, or KVSETID. Thus, in this example, the stream-mapping tuple may include components of the KVS tree scope as well as device specific or write specific components, such as DID, WLAST, or WTYPE. In an example, a stability, or temperature, scope tuple TSCOPE is derived from the stream-mapping tuple. The following are example constituent KVS tree scope components that may be used to create TSCOPE:
  A) TSCOPE computed as (FID, TID, LNUM);
  B) TSCOPE computed as (LNUM);
  C) TSCOPE computed as (TID);
  D) TSCOPE computed as (TID, LNUM); or
  E) TSCOPE computed as (TID, LNUM, NNUM).

In an example, the controller 235 may implement a static temperature assignment method. The static temperature assignment method may read the selected TEMP, for example, from a configuration file, database, KVS tree meta data, or meta data in the KVS tree 105 TID or other database, including metadata stored in the KVS tree TID. In this example, these data sources include mappings from the TSCOPE to a stability value. In an example, the mapping may be cached (e.g., upon controller 235's activation or dynamically during later operation) to speed the assignment of stability values as write requests arrive.

In an example, the controller 235 may implement a dynamic temperature assignment method. The dynamic temperature assignment method may compute the selected TEMP based on a frequency with which kvsets are written to TSCOPE. For example, the frequency with which the controller 235 executes the temperature assignment method for a given TSCOPE may be measured and clustered around TEMPS in TEMPSET. Thus, such a computation may, for example, define a set of frequency ranges and a mapping from each frequency range to a stability value so that the value of TEMP is determined by the frequency range containing the frequency with which kvsets are written to TSCOPE.

The controller 235 is arranged to obtain (e.g., receive via configuration, message, etc., retrieve from configuration device, firmware, etc.) a stream assignment method. The stream assignment method will consume the KVS tree 205 aspects of the write 215 as well as the stability value (e.g., from the temperature assignment) to produce the stream ID. In an example, controller 235 may use the stream-mapping tuple (e.g., including KVS tree scope) in the stream assignment method to select the stream ID. In an example, any one or more of DID, FID, TID, LNUM, NNUM, KVSETID, WTYPE or WLAST along with the stability value may be used in the stream assignment method executed by the controller 235 to select the stream ID. In an example, a stream-scope tuple SSCOPE is derived from the stream-mapping tuple. The following are example constituent KVS tree scope components that may be used to create SSCOPE:
  A) SSCOPE computed as (FID. TID, LNUM. NNUM)
  B) SSCOPE computed as (KVSETID)
  C) SSCOPE computed as (TID)
  D) SSCOPE computed as (TID, LNUM)
  E) SSCOPE computed as (TID, LNUM, NNUM)
  F) SSCOPE computed as (LNUM)

The controller 235 may be arranged to, prior to accepting inputs, initialize the A-SID table 240 and the S-SID table 245. A-SID table 240 is a data structure (table, dictionary, etc.) that may store entries for tuples (DID, TEMP, SID) and may retrieve such entries with specified values for DID and TEMP. The notation A-SID(DID, TEMP) refers to all entries in A-SID table 240, if any, with the specified values for DID and TEMP. In an example, the A-SID table 240 may be initialized for each configured storage device 260 and 265 and temperature value in TEMPSET. The A-SID table 240 initialization may proceed as follows: For each configured storage device DID, the controller 235 may be arranged to:
  A) Obtain the number of streams available on DID, referred to as SCOUNT;
  B) Obtain a unique SID for each of the SCOUNT streams on DID; and
  C) For each value TEMP in TEMPSET;
    a) Compute how many of the SCOUNT streams to use for data classified by TEMP in accordance with the configured determiner for TEMP, referred to as TCOUNT; and
    b) Select TCOUNT SIDs for DID not yet entered in the A-SID table 240 and, for each selected TCOUNT SID for DID, create one entry (e.g., row) in A-SID table 240 for (DID, TEMP, SID).

Thus, once initialized, the A-SID table 240 includes an entry for each configured storage device DID and value TEMP in TEMPSET assigned a unique SID. The technique for obtaining the number of streams available for a configured storage device 260 and a usable SID for each differs by storage device interface, however, these are readily accessible via the interfaces of multi-stream storage devices The S-SID table 245 maintains a record of streams already in use (e.g., already a part of a given write). S-SID table 245 is a data structure (table, dictionary, etc.) that may store entries for tuples (DID, TEMP, SSCOPE, SID, Timestamp) and may retrieve or delete such entries with specified values for DID, TEMP, and optionally SSCOPE. The notation S-SID(DID, TEMP) refers to all entries in S-SID table 245, if any, with the specified values for DID and TEMP. Like the A-SID table 240, the S-SID table 245 may be initialized by the controller 235. In an example, the controller 235 is arranged to initialize the S-SID table 245 for each configured storage device 260 and 265 and temperature value in TEMPSET.

As noted above, the entries in S-SID table 245 represent currently, or already, assigned streams for write operations. Thus, generally, the S-SID table 245 is empty after initiation, entries being created by the controller 235 as stream IDs are assigned.

In an example, the controller 235 may implement a static stream assignment method. The static stream assignment method selects the same stream ID for a given DID, TEMP, and SSCOPE. In an example, the static stream assignment method may determine whether S-SID(DID, TEMP) has an entry for SSCOPE. If there is no conforming entry, the static stream assignment method selects a stream ID SID from A-SID(DID, TEMP) and creates an entry in S-SID table 245 for (DID, TEMP. SSCOPE, SID, timestamp), where timestamp is the current time after the selection. In an example, the selection from A-SID(DID, TEMP) is random, or the result of a round-robin process. Once the entry from S-SID table 245 is either found or created, the stream ID SID is returned to the storage subsystem 225. In an example, if WLAST is true, the entry in S-SID table 245 for (DID, TEMP, SSCOPE) is deleted. This last example demonstrates the usefulness of having WLAST to signal the completion of a write 215 for a kvset or the like that would be known to the tree 205 but not to the storage subsystem 225.

In an example, the controller 235 may implement a least recently used (LRU) stream assignment method. The LRU stream assignment method selects the same stream ID for a given DID, TEMP, and SSCOPE within a relatively small time interval. In an example, the LRU assignment method determines whether S-SID(DID. TEMP) has an entry for SSCOPE. If the entry exists, the LRU assignment method thens select the stream ID in this entry and sets the timestamp in this entry in S-SID table 245 to the current time.

If the SSCOPE entry is not in S-SID(DID, TEMP), the LRU stream assignment method determines whether the number of entries S-SID(DID, TEMP) equals the number of entries A-SID(DID, TEMP). If this is true, then the LRU assignment method selects the stream ID SID from the entry in S-SID(DID, TEMP) with the oldest timestamp. Here, the entry in S-SID table 245 is replaced with the new entry (DID, TEMP, SSCOPE. SID, timestamp) where timestamp is the current time after the selection.

If there are fewer S-SSID(DID, TEMP) entries than A-SID(DID, TEMP) entries, the method selects a stream ID SID from A-SID(DID, TEMP) such that there is no entry in S-SID(DID, TEMP) with the selected stream ID and creates an entry in S-SID table 245 for (DID, TEMP. SSCOPE, SID, timestamp) where timestamp is the current time after the selection.

Once the entry from S-SID table 245 is either found or created, the stream ID SID is returned to the storage subsystem 225. In an example, if WLAST is true, the entry in S-SID table 245 for (DID, TEMP, SSCOPE) is deleted.

In operation the controller 235 is configured to assign a stability value for a given stream-mapping tuple received as part of the write request 215. Once the stability value is determined, the controller 235 is arranged to assign the SID. The temperature assignment and stream assignment methods may each reference and update the A-SID table 240 and the S-SID table 245. In an example, the controller 235 is also arranged to provide the SID to a requester, such as the storage subsystem 225.

Using the stream ID based on the KVS tree scope permits like data to be colocated in erase blocks 270 on multi-stream storage device 260. This reduces garbage collection on the device and thus may increase device performance and longevity. This benefit may be extended to multiple KVS trees. KVS trees may be used in a forest, or grove, whereby several KVS trees are used to implement a single structure, such as a file system. For example, one KVS tree may use block number as the key and bits in the block as a value while a second KVS tree may use file path as the key and a list of block numbers as the value. In this example, it is likely that kvsets for a given file referenced by path and the kvsets holding the block numbers have similar lifetimes. Thus the inclusion of FID above.

The structure and techniques described above provide a number of advantages in systems implementing KVS trees and storage devices such as flash storage devices. In an example, a computing system implementing several KVS trees stored on one or more storage devices may use knowledge of the KVS tree to more efficiently select streams in multi-stream storage devices. For example, the system may be configured so that the number of concurrent write operations (e.g., ingest or compaction) executed for the KVS trees is restricted based on the number of streams on any given storage device that are reserved for the temperature classifications assigned to kvset data written by these write operations. This is possible because, within a kvset, the life expectancy of that data is the same as kvsets are written and deleted in their entirety. As noted elsewhere, keys and values may be separated. Thus, key write will have the same life-time which is likely shorter than value life-times when key compaction, discussed below, is performed. Additionally, tree-level experimentally appears to be a strong indication of data life-time, the older data, and thus greater (e.g., deeper) tree-level, having a longer life-time than younger data at higher tree-levels.

The following scenario may further elucidate the operation of the stream-mapping circuits 230 to restrict writes, consider:
A) Temperature values {Hot. Cold}, with H streams on a given storage device used for data classified as Hot, and C streams on a given storage device used for data classified as Cold.
B) A temperature assignment method configured with TSCOPE computed as (LNUM) whereby data written to L0 in any KVS tree is assigned a temperature value of Hot, and data written to L1 or greater in any KVS tree is assigned a temperature value of Cold.
C) An LRU stream assignment method configured with SSCOPE computed as (TID. LNUM).

In this case, the total number of concurrent ingest and compaction operations-operations producing a write—for all KVS trees follows these conditions: concurrent ingest operations for all KVS trees is at most H—because the data for all ingest operations is written to level 0 in a KVS tree and hence will be classified as Hot—and concurrent compaction operations for all KVS trees is at most C—because the data for all spill compactions, and the majority of other compaction operations, is written to level 1 or greater and hence will be classified as Cold.

Other such restrictions are possible and may be advantageous depending on certain implementation details of the KVS tree and controller 235. For example, given controller 235 configured as above, it may be advantageous for the number of ingest operations to be a fraction of H (e.g., one-half) and the number of compaction operations to be a fraction of C (e.g., three-fourths) because LRU stream assignment with SSCOPE computed as (TID, LNUM) may not take advantage of WLAST in a stream-mapping tuple to remove unneeded S-SID table 245 entries upon receiving the last write for a given KVSET in TID, resulting in a suboptimal SID selection.

Although the operation of the stream-mapping circuits 230 are described above in the context of KVS trees, other structures, such as LSM tree implementations, may equally benefit from the concepts presented herein. Many LSM Tree variants store collections of key-value pairs and tombstones whereby a given collection may be created by an ingest operation or garbage collection operation (often referred to as a compaction or merge operation), and then later deleted in whole as the result of a subsequent ingest operation or garbage collection operation. Hence the data comprising such a collection has a similar lifetime, like the data comprising a kvset in a KVS tree. Thus, a tuple similar to the stream-mapping tuple above, may be defined for most other LSM Tree variants, where the KVSETID may be replaced by a unique identifier for the collection of key-value pairs or tombstones created by an ingest operation or garbage collection operation in a given LSM Tree variant. The stream-mapping circuits 230 may then be used as described to select stream identifiers for the plurality of write commands used to store the data comprising such a collection of key-value pairs and tombstones.

FIG. 3 illustrates an example of a method 300 to facilitate writing to a multi-stream storage device, according to an embodiment. The operations of the method 300 are implemented with electronic hardware, such as that described throughout at this application, including below with respect to FIG. 26 (e.g., circuits). The method 300 provides a number of examples to implement the discussion above with respect to FIG. 2.

At operation 305, notification of a KVS tree write request for a multi-stream storage device is received. In an example, the notification includes a KVS tree scope corresponding to data in the write request. In an example, the KVS tree scope includes at least one of: a kvset ID corresponding to a kvset of the data; a node ID corresponding to a node of the KVS tree corresponding to the data; a level ID corresponding to a tree-level corresponding to the data; a tree ID for the KVS tree; a forest ID corresponding to the forest to which the KVS tree belongs; or a type corresponding to the data. In an example, the type is either a key-block type or a value-block type.

In an example, the notification includes a device ID for the multi-stream device. In an example, the notification includes a WLAST flag corresponding to a last write request in a sequence of write requests to write a kvset, identified by the kvset ID, to the multi-stream storage device.

At operation 310, a stream identifier (ID) is assigned to the write request based on the KVS tree scope and a stability value of the write request. In an example, assigning the stability value includes: maintaining a set of frequencies of stability value assignments for a level ID corresponding to a tree-level, each member of the set of frequencies corresponding to a unique level ID; retrieving a frequency from the set of frequencies that corresponds to a level ID in the KVS tree scope; and selecting a stability value from a mapping of stability values to frequency ranges based on the frequency.

In an example, assigning the stream ID to the write request based on the KVS tree scope and the stability value of the write request includes creating a stream-scope value from the KVS tree scope. In an example, the stream-scope value includes a level ID for the data. In an example, the stream-scope value includes a tree ID for the data. In an example, the stream-scope value includes a level ID for the data. In an example, the stream-scope value includes a node ID for the data. In an example, the stream-scope value includes a kvset ID for the data.

In an example, assigning the stream ID to the write request based on the KVS tree scope and the stability value of the write request also includes performing a lookup in a selected-stream data structure using the stream-scope value. In an example, performing the lookup in the selected-stream data structure includes: failing to find the stream-scope value in the selected-stream data structure; performing a lookup on an available-stream data structure using the stability value; receiving a result of the lookup that includes a stream ID; and adding an entry to the selected-stream data structure that includes the stream ID, the stream-scope value, and a timestamp of a time when the entry is added. In an example, multiple entries of the available-stream data structure correspond to the stability value, and wherein the result of the lookup is at least one of a round-robin or random selection of an entry from the multiple entries. In an example, the available-stream data structure may be initialized by: obtaining a number of streams available from the multi-stream storage device; obtain a stream ID for all streams available from the multi-stream storage device, each stream ID being unique; add stream IDs to stability value groups; and creating a record in the available-stream data structure for each stream ID, the record including the stream ID, a device ID for the multi-stream storage device, and a stability value corresponding to a stability value group of the stream ID.

In an example, performing the lookup in the selected-stream data structure includes: failing to find the stream-scope value in the selected-stream data structure; locating a stream ID from either the selected-stream data structure or an available-stream data structure based on the contents of the selected stream data structure; and creating an entry to the selected-stream data structure that includes the stream ID, the stream-scope value, and a timestamp of a time when the entry is added. In an example, locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are equal; locating a group of entries from the selected-stream data structure that correspond to the stability value; and returning a stream ID of an entry in the group of entries that has the oldest timestamp. In an example, locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are not equal; performing a lookup on the available-stream data structure using the stability value and stream IDs in entries of the selected-stream data structure; receiving a result of the lookup that includes a stream ID that is not in the entries of the selected-stream data structure; and adding an entry to the selected-stream data structure that includes the stream ID, the stream-scope value, and a timestamp of a time when the entry is added.

In an example, assigning the stream ID to the write request based on the KVS tree scope and the stability value of the write request also includes returning a stream ID corresponding to the stream-scope from the selected-stream data structure. In an example, returning the stream ID corresponding to the stream-scope from the selected-stream data structure includes updating a timestamp for an entry in the selected-stream data structure corresponding to the stream ID. In an example, the write request includes a WLAST flag, and wherein returning the stream ID corresponding to the stream-scope from the selected-stream data structure includes removing an entry from the selected-stream data structure corresponding to the stream ID.

In an example, the method 300 may be extended to include removing entries from the selected-stream data structure with a timestamp beyond a threshold.

At operation 315, the stream ID is returned to govern stream assignment to the write request, with the stream assignment modifying a write operation of the multi-stream storage device.

In an example, the method 300 may be optionally extended to include assigning the stability value based on the KVS tree scope. In an example, the stability value is one of a predefined set of stability values. In an example, the predefined set of stability values includes HOT, WARM, and COLD, wherein HOT indicates a lowest expected lifetime of the data on the multi-stream storage device and COLD indicates a highest expected lifetime of the data on the multi-stream storage device.

In an example, assigning the stability value includes locating the stability value from a data structure using a portion of the KVS tree scope. In an example, the portion of the KVS tree scope includes a level ID for the data. In an example, the portion of the KVS tree scope includes a type for the data.

In an example, the portion of the KVS tree scope includes a tree ID for the data. In an example, the portion of the KVS tree scope includes a level ID for the data. In an example, the portion of the KVS tree scope includes a node ID for the data.

Figure 4:
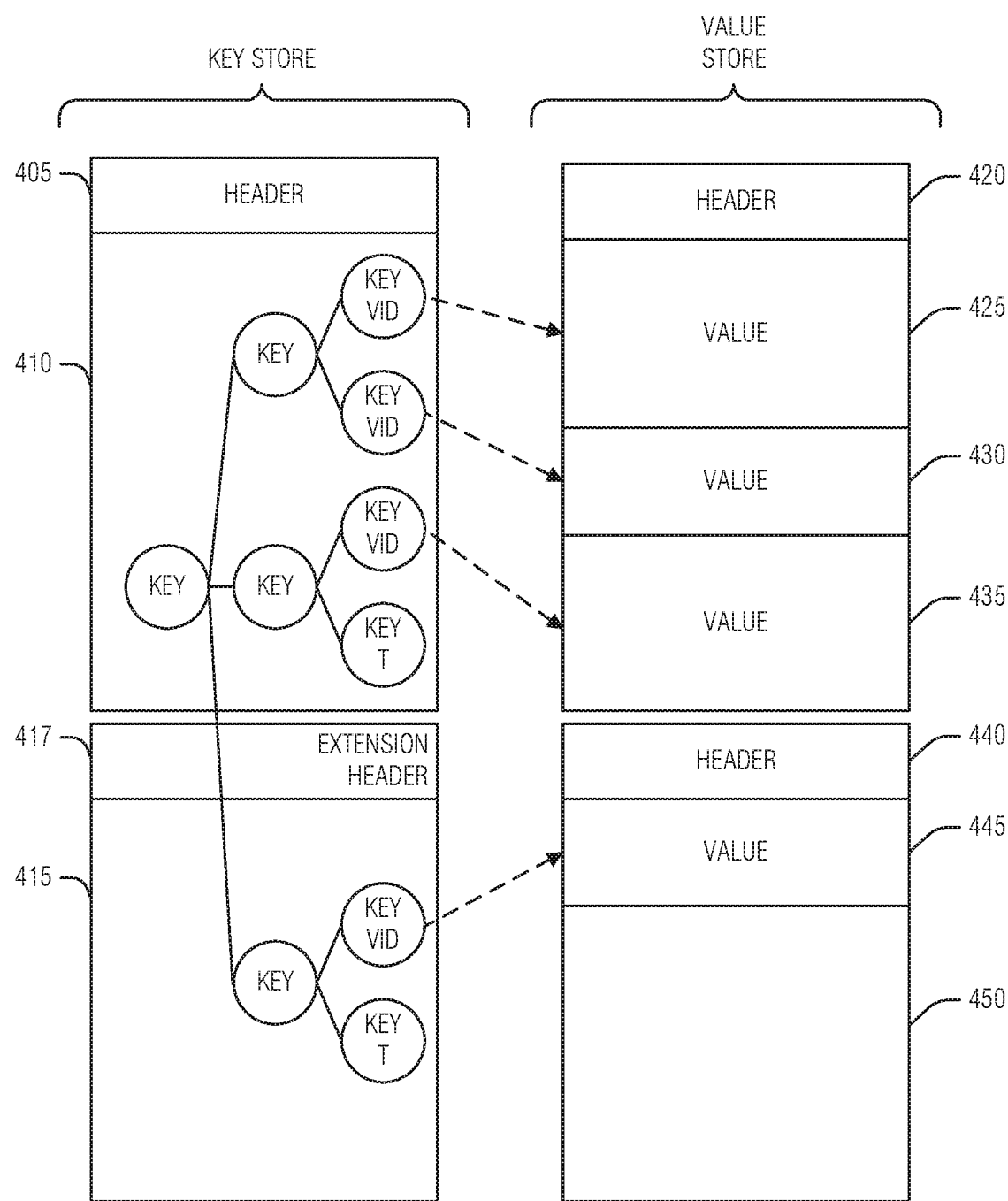
FIG. 4 is a block diagram illustrating an example of a storage organization for keys and values, according to an embodiment.

FIG. 4 is a block diagram illustrating an example of a storage organization for keys and values, according to an embodiment. A kvset may be stored using key-blocks to hold keys (along with tombstones as needed) and value-blocks to hold values. For a given kvset, the key-blocks may also contain indexes and other information (such as bloom filters) for efficiently locating a single key, locating a range of keys, or generating the total ordering of all keys in the kvset, including key tombstones, and for obtaining the values associated with those keys, if any.

A single kvset is represented in FIG. 4. The key-blocks include a primary key block 410 that includes header 405 and an extension key-block 415 that includes an extension header 417. The value blocks include headers 420 and 440 respectively as well as values 425, 430, 435, and 445. The second value block also includes free space 450.

A tree representation for the kvset is illustrated to span the key-blocks 410 and 415. In this illustration, the leaf nodes contain value references (VID) to the values 425, 430, 435, and 445, and two keys with tombstones. This illustrates that, in an example, the tombstone does not have a corresponding value in a value block, even though it may be referred to as a type of key-value pair.

The illustration of the value blocks demonstrates that each may have a header and values that run next to each other without delineation. The reference to particular bits in the value block for a value, such as value 425, are generally stored in the corresponding key entry, for example, in an offset and extent format.

Figure 5:
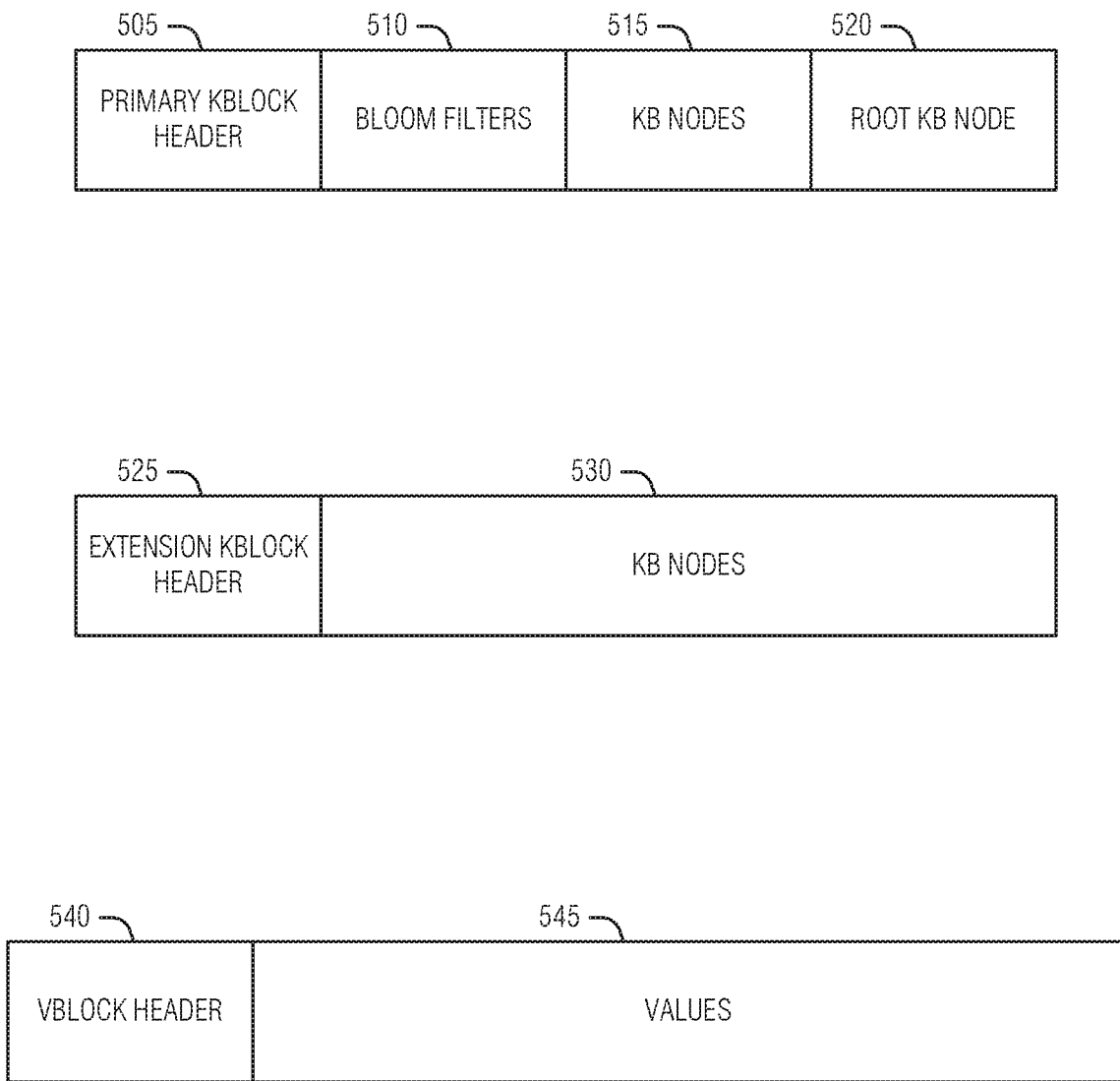
FIG. 5 is a block diagram illustrating an example of a configuration for key-blocks and value-blocks, according to an embodiment.

FIG. 5 is a block diagram illustrating an example of a configuration for key-blocks and value-blocks, according to an embodiment. The key-block and value block organization of FIG. 5 illustrates the generally simple nature of the extension key-block and the value-blocks. Specifically, each are generally a simple storage container with a header to identify its type (e.g., key-block or value-block) and perhaps a size, location on storage, or other meta data. In an example, the value-block includes a header 540 with a magic number indicating that it is a value-block and storage 545 to store bits of values. The key-extension block includes a header 525 indicating that it is an extension block and stores a portion of the key structure 530, such as a KB tree, B-tree, or the like.

The primary key-block provides a location for many kvset meta data in addition to simply storing the key structure. The primary key-block includes a root of the key structure 520. The primary key block may also include a header 505, bloom filters 510, or a portion of the key structure 515.

Reference to the components of the primary key-block are included in the header 505, such as the blocks of the bloom filter 510, or the root node 520. Metrics, such as kvset size, value-block addresses, compaction performance, or use may also be contained in the header 505.

The bloom filters 510 are computed when the kvset is created and provide a ready mechanism to ascertain whether a key is not in the kvset without performing a search on the key structure. This advance permits greater efficiency in scanning operations as noted below.

Figure 6:
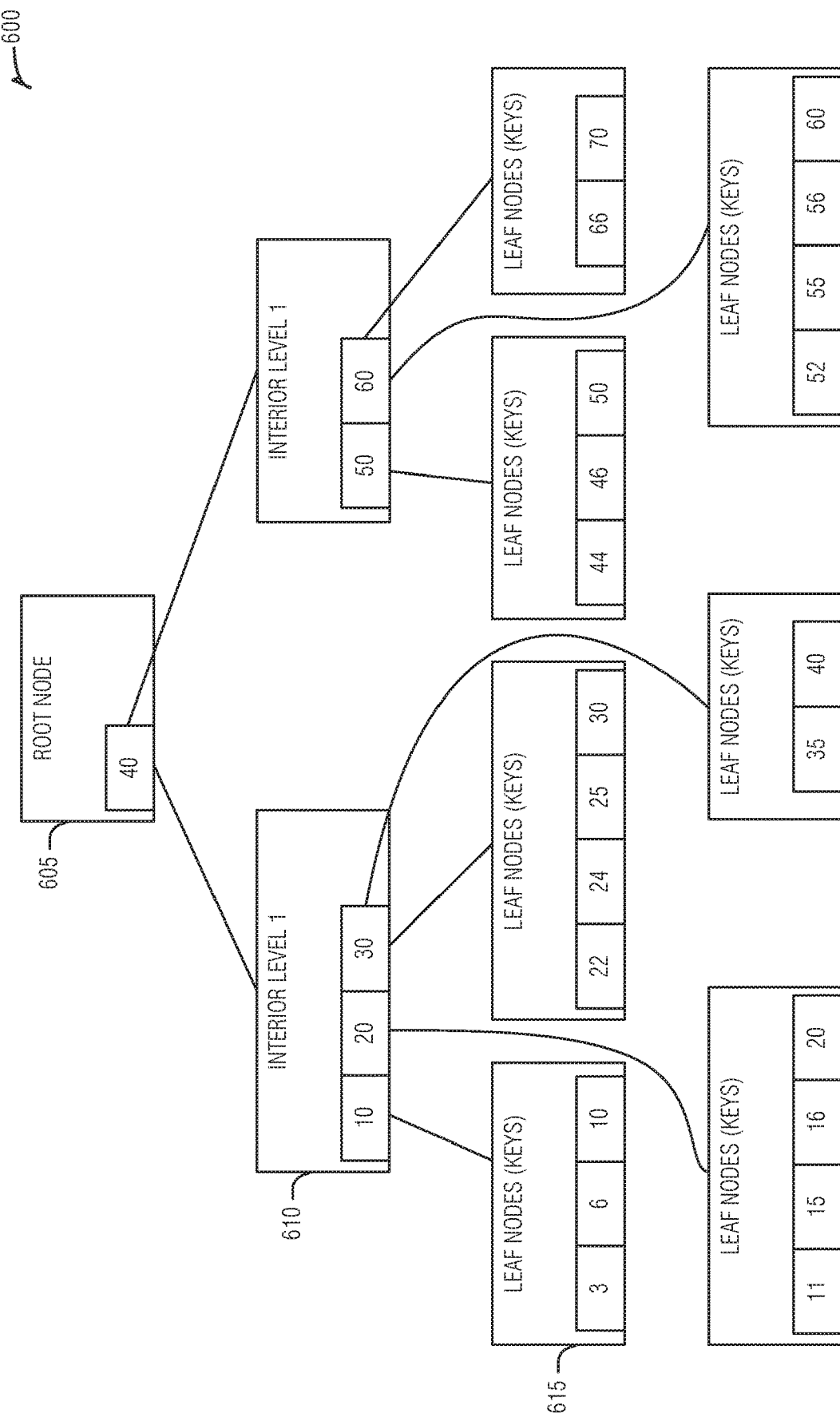
FIG. 6 illustrates an example of a KB tree, according to an embodiment.

FIG. 6 illustrates an example of a KB tree 600, according to an embodiment. An example key structure to use in a kvset's key-blocks is the KB tree. The KB tree 600 has structural similarities to B+ trees. In an example, the KB tree 600 has 4096-byte nodes (e.g., node 605, 610, and 615). All keys of the KB tree reside in leaf nodes (e.g., node 615). Internal nodes (e.g., node 610) have copies of selected leaf-node keys to navigate the tree 600. The result of a key lookup is a value reference, which may be, in an example, to a value-block ID, an offset and a length.

The KB tree 600 has the following properties:
A) All keys in the subtree rooted at an edge key K's child node are less than or equal to K.
B) The maximum key in any tree or subtree is the right-most entry in the right-most leaf node.
C) Given a node N with a right-most edge that points to child R, all keys in the subtree rooted at node R are greater than all keys in node N.

The KB tree 600 may be searched via a binary search among the keys in the root node 605 to find the appropriate "edge" key. The link to the edge key's child may be followed. This procedure is then repeated until a match is found in a leaf node 615 or no match is found.

Because kvsets are created once and not changed, creating the KB tree 600 may be different than other tree structures that mutate over time. The KB tree 600 may be created in a bottom-up fashion. In an example, the leaf nodes 615 are created first, followed by their parents 610, and so on until there is one node left—the root node 605. In an example, creation starts with a single empty leaf node, the current node. Each new key is added to the current node. When the current node becomes full, a new leaf node is created and it becomes the current node. When the last key is added, all leaf nodes are complete. At this point, nodes at the next level up (i.e., the parents of the leaf nodes) are created in a similar fashion, using the maximum key from each leaf node as the input stream. When those keys are exhausted, that level is complete. This process repeats until the most recently created level consists of a single node, the root node 605.

If, during creation, the current key-block becomes full, new nodes may be written to an extension key-block. In an example, an edge that crosses from a first key-block to a second key-block includes a reference to the second key-block.

Figure 7:
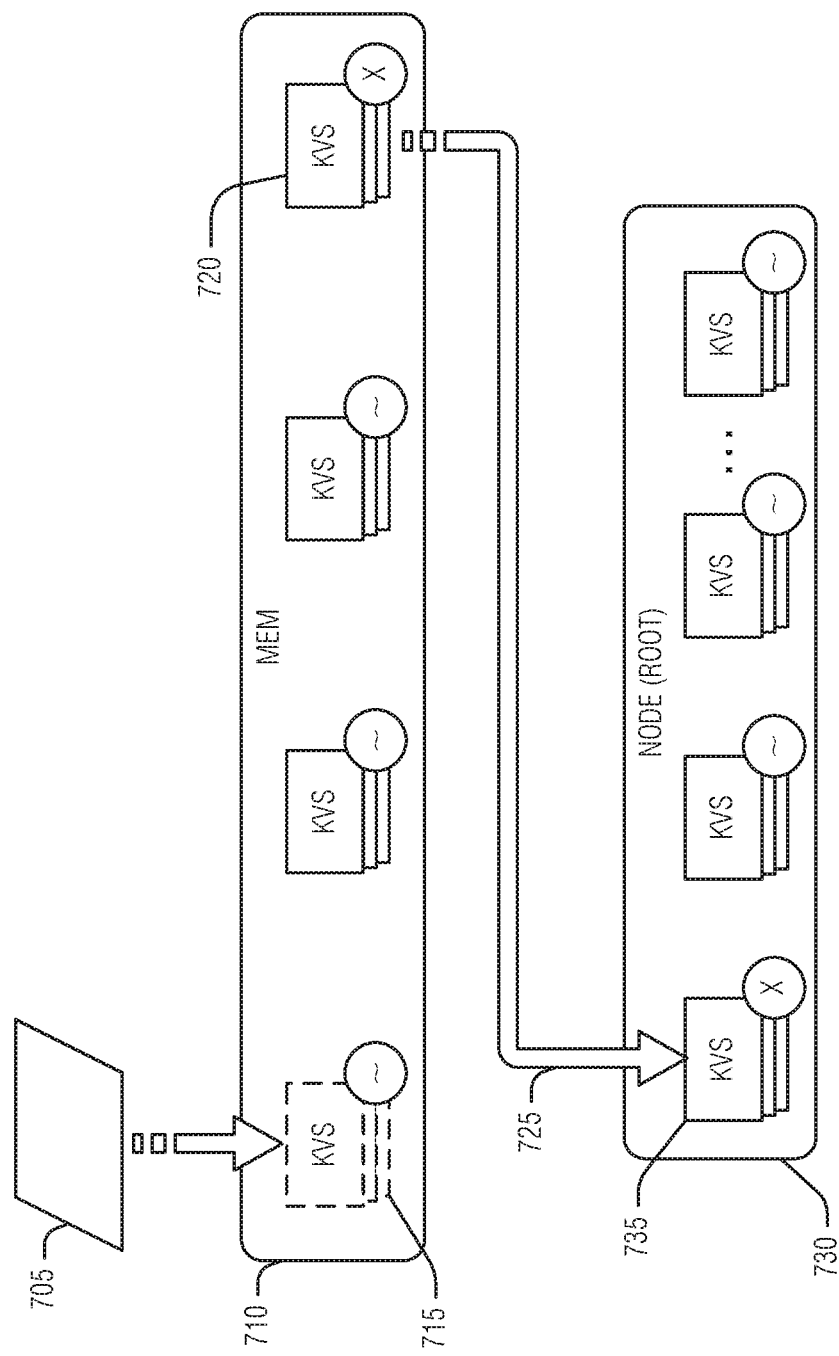
FIG. 7 is a block diagram illustrating KVS tree ingestion, according to an embodiment.

FIG. 7 is a block diagram illustrating KVS tree ingestion, according to an embodiment. In a KVS tree, the process of writing a new kvset to the root node 730 is referred to as an ingest. Key-value pairs 705 (including tombstones) are accumulated in-memory 710 of the KVS tree, and are organized into kvsets ordered from newest 715 to oldest 720. In an example, the kvset 715 may be mutable to accept key-value pairs synchronously. This is the only mutable kvset variation in the KVS tree.

The ingest 725 writes the key-value pairs and tombstones in the oldest kvset 720 in main memory 710 to a new (and the newest) kvset 735 in the root node 730 of the KVS tree, and then deletes that kvset 720 from main memory 710.

Figure 8:
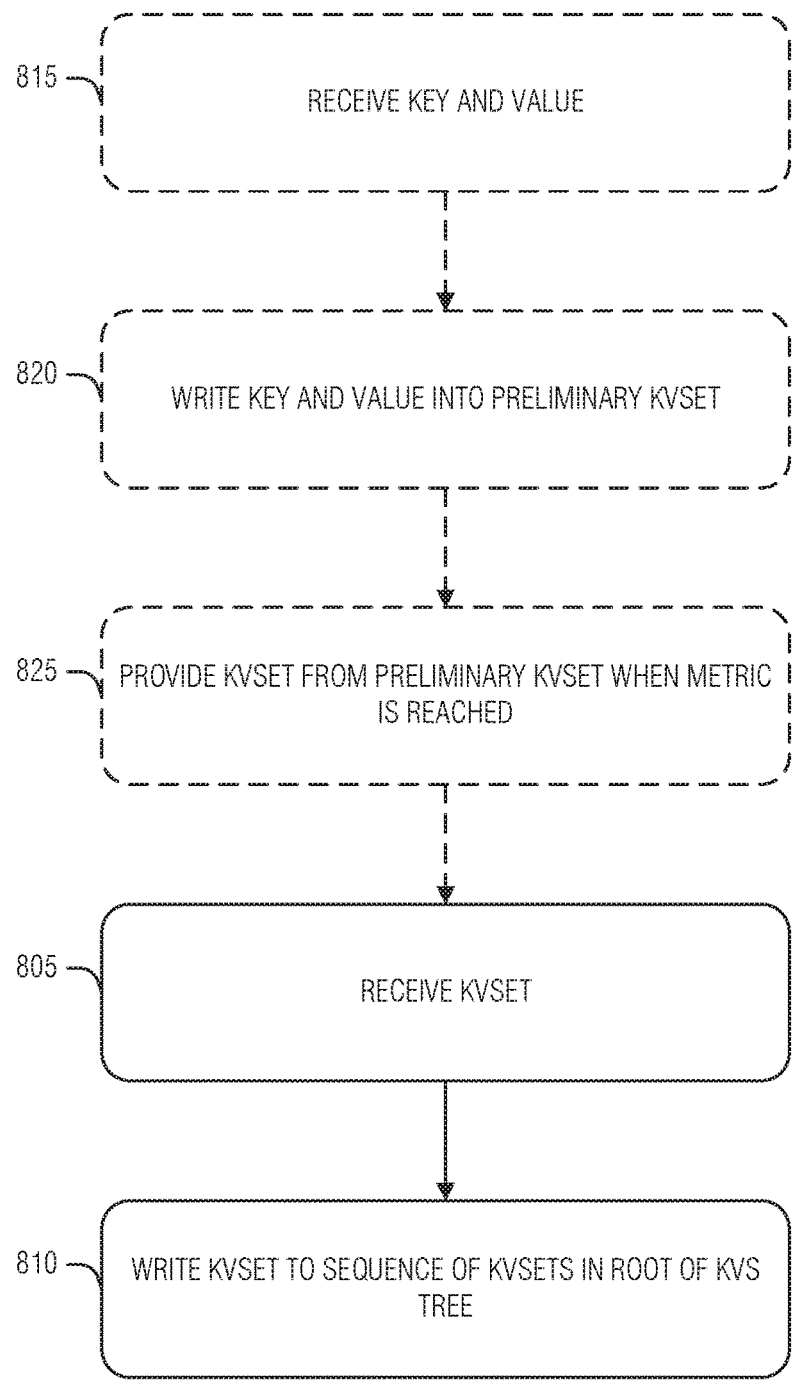
FIG. 8 illustrates an example of a method for KVS tree ingestion, according to an embodiment.

FIG. 8 illustrates an example of a method 800 for KVS tree ingestion, according to an embodiment. The operations of the method 800 are implemented with electronic hardware, such as that described throughout at this application, including below with respect to FIG. 26 (e.g., circuits).

At operation 805, a key-value set (kvset) is received to store in a key-value data structure. Here, the key-value data structure is organized as a tree and the kvset includes a mapping of unique keys to values. The keys and the values of the kvset are immutable and nodes of the tree have a temporally ordered sequence of kvsets.

In an example, when a kvset is written to the at least one storage medium, the kvset is immutable. In an example, wherein key entries of the kvset are stored in a set of key-blocks including a primary key-block and zero or more extension key-blocks. Here, members of the set of key-blocks correspond to media blocks for the at least one storage medium with each key-block including a header to identify it as a key-block.

In an example, the primary key-block includes a list of media block identifications for the one or more extension key-blocks of the kvset. In an example, the primary key-block includes a list of media block identifications for value-blocks in the set of value blocks. In an example, the primary key-block includes a copy of a lowest key in a key-tree of the kvset, the lowest key determined by a pre-set sort-order of the tree. In an example, the primary key-block includes a copy of a highest key in a key-tree of the kvset, the highest key determined by a pre-set sort-order of the tree. In an example, the primary key-block includes a header to a key-tree of the kvset. In an example, the primary key-block includes a list of media block identifications for a key-tree of the kvset. In an example, the primary key-block includes a bloom filter header for a bloom filter of the kvset. In an example, the primary key-block includes a list of media block identifications for a bloom filter of the kvset.

In an example, values are stored in a set of value-blocks operation 805. Here, members of the set of value-blocks corresponding to media blocks for the at least one storage medium with each value-block including a header to identify it as a value-block. In an example, a value block includes storage section to one or more values without separation between values.

In an example, the primary key-block includes a set of metrics for the kvset. In an example, the set of metrics include a total number of keys stored in the kvset. In an example, the set of metrics include a number of keys with tombstone values stored in the kvset. In an example, the set of metrics include a sum of all key lengths for keys stored in the kvset. In an example, the set of metrics include a sum of all value lengths for keys stored in the kvset. In an example, the set of metrics include an amount of unreferenced data in value-blocks of the kvset.

At operation 810, the kvset is written to a sequence of kvsets of a root-node of the tree.

The method 800 may be extended to include operations 815-825.

At operation 815, a key and a corresponding value to store in the key-value data structure are received.

At operation 820, the key and the value are placed in a preliminary kvset, the preliminary kvset being mutable. In an example, a rate of writing to the preliminary root node is beyond a threshold. In this example, the method 800 may be extended to throttle write requests to the key-value data structure.

At operation 825, the kvset is written to the key-value data structure when a metric is reached. In an example, the metric is a size of a preliminary root node. In an example, the metric is an elapsed time.

Once ingestion has occurred, a variety of maintenance operations may be employed to maintain the KVS tree. For example, if a key is written at one time with a first value and at a later time with a second value, removing the first key-value pair will free up space or reduce search times. To address some of these issues, KVS trees may use compaction. Details of several compaction operations are discussed below with respect to FIGS. 9-18. The illustrated compaction operations are forms of garbage collection because they may remove obsolete data, such as keys or key-value pairs during the merge.

Compaction occurs under a variety of triggering conditions, such as when the kvsets in a node meet specified or computed criteria. Examples of such compaction criteria include the total size of the kvsets or the amount of garbage in the kvsets. One example of garbage in kvsets is key-value pairs or tombstones in one kvset rendered obsolete, for example, by a key-value pair or tombstone in a newer kvset, or a key-value pair that has violated a time-to-live constraint, among others. Another example of garbage in kvsets is unreferenced data in value-blocks (unreferenced values) resulting from key compactions.

Generally, the inputs to a compaction operation are some or all of the kvsets in a node at the time the compaction criteria are met. These kvsets are called a merge set and comprise a temporally consecutive sequence of two or more kvsets.

As compaction is generally triggered when new data is ingested, the method 800 may be extended to support compaction, however, the following operations may also be triggered when, for example, there are free processing resources, or other convenient scenarios to perform the maintenance.

Thus, the KVS tree may be compacted. In an example, the compacting is performed in response to a trigger. In an example, the trigger is an expiration of a time period.

In an example, the trigger is a metric of the node. In an example, the metric is a total size of kvsets of the node. In an example, the metric is a number of kvsets of the node. In an example, the metric is a total size of unreferenced values of the node. In an example, the metric is a number of unreferenced values.

Figure 9:
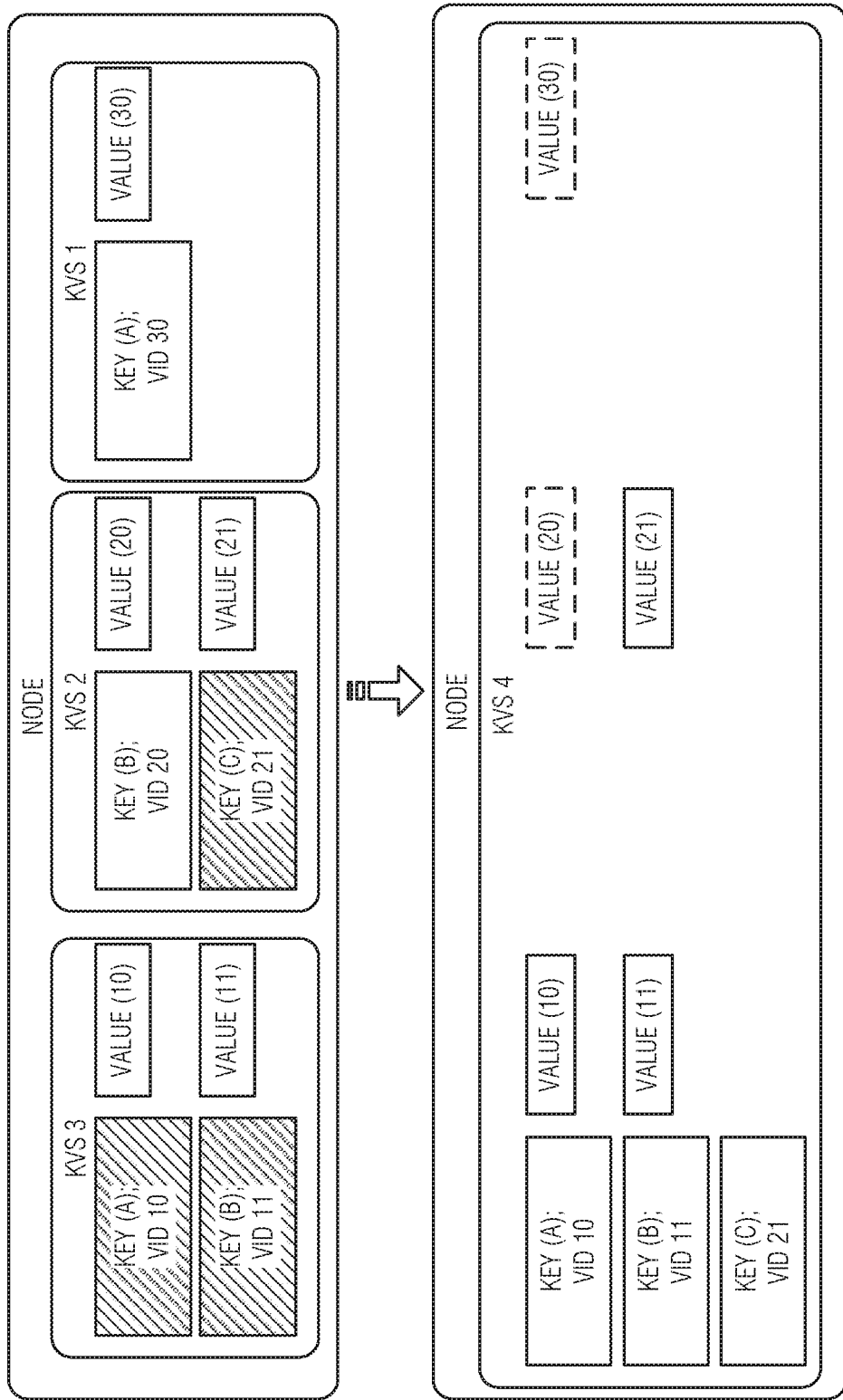
FIG. 9 is a block diagram illustrating key compaction, according to an embodiment.

FIG. 9 is a block diagram illustrating key compaction, according to an embodiment. Key compaction reads the keys and tombstones, but not values, from the merge set, removes all obsolete keys or tombstones, writes the resulting keys and tombstones into one or more new kvsets (e.g., by writing into new key-blocks), deletes the key-stores, but not the values, from the node. The new kvsets atomically replace, and are logically equivalent to, the merge set both in content and in placement within the logical ordering of kvsets from newest to oldest in the node.

As illustrated, the kvsets KVS3 (the newest), KVS2, and KVS1 (the oldest) undergo key compaction for the node. As the key-stores for these kvsets are merged, collisions on keys A and B occur. As the new kvset, KVS4 (illustrated below), may only contain one of each merged key, the collisions are resolved in favor of the most recent (the leftmost as illustrated) keys, referring to value ID 10 and value ID 11 for keys A and B respectively. Key C has no collision and so will be included in the new kvset. Thus, the key entries that will be part of the new kvset, KVS4, are shaded in the top node.

For illustrative purposes, KVS4 is drawn to span KVS1, KVS2, and KVS3 in the node and the value entries are drawn in a similar location in the node. The purpose of these positions demonstrates that the values are not changed in a key compaction, but rather only the keys are changed. As explained below, this provides a more efficient search by reducing the number of kvsets searched in any given node and may also provide valuable insights to direct maintenance operations. Also note that the values 20 and 30 are illustrated with dashed lines, denoting that they persist in the node but are no longer referenced by a key entry as their respective key entries were removed in the compaction.

Key compaction is non-blocking as a new kvset (e.g., KVS5) may be placed in the newest position (e.g., to the left) of KVS3 or KVS4 during the compaction because, by definition, the added kvset will be logically newer than the kvset resulting from the key compaction (e.g., KVS4).

Figure 10:
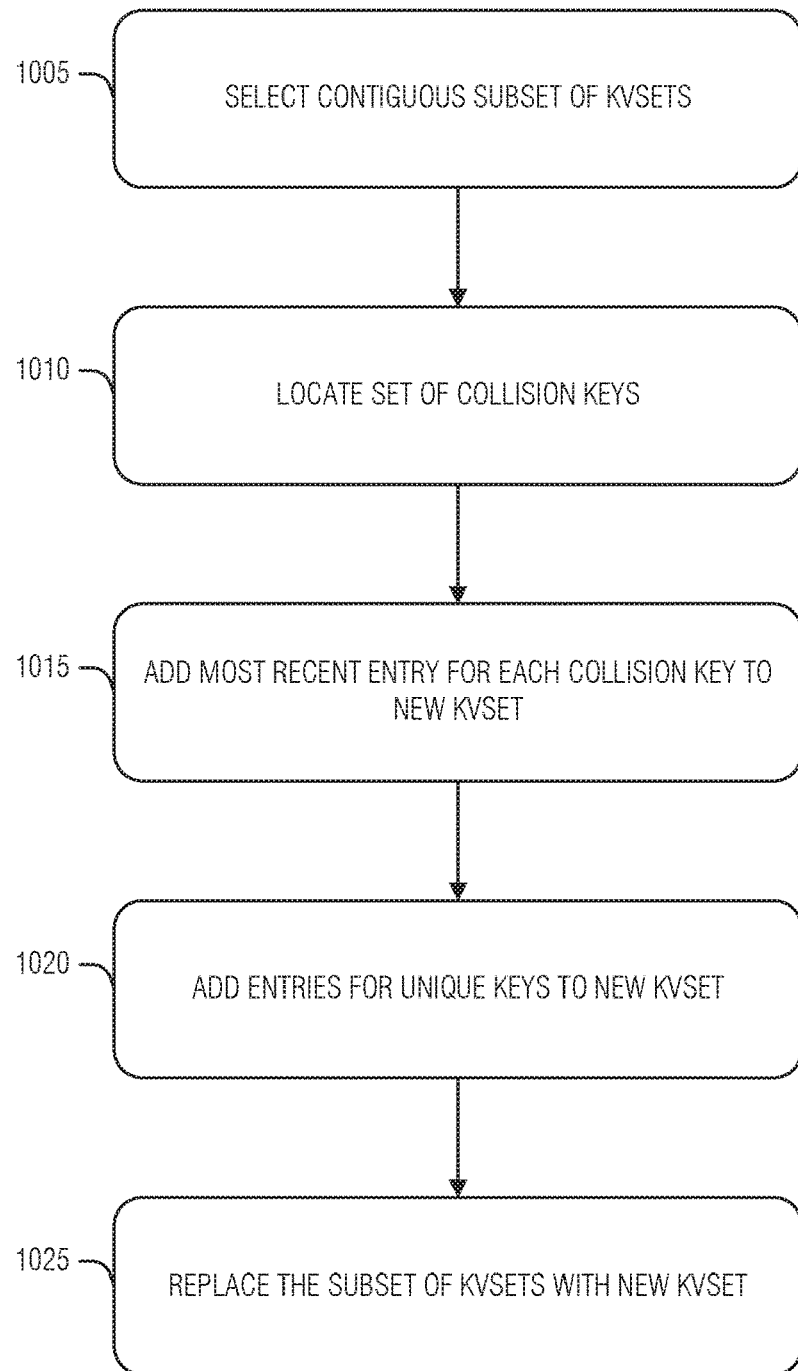
FIG. 10 illustrates an example of a method for key compaction, according to an embodiment.

FIG. 10 illustrates an example of a method 1000 for key compaction, according to an embodiment. The operations of the method 1000 are implemented with electronic hardware, such as that described throughout at this application, including below with respect to FIG. 26 (e.g., circuits).

At operation 1005, a subset of kvsets from a sequence of kvsets for the node is selected. In an example, the subset of kvsets are contiguous kvsets and include an oldest kvset.

At operation 1010, a set of collision keys is located. Members of the set of collision keys including key entries in at least two kvsets in the sequence of kvsets for the node.

At operation 1015, a most recent key entry for each member of the set of collision keys is added to a new kvset. In an example, where the node has no children, and where the subset of kvsets includes the oldest kvset, writing the most recent key entry for each member of the set of collision keys to the new kvset and writing entries for each key in members of the subset of kvsets that are not in the set of collision keys to the new kvset includes omitting any key entries that include a tombstone. In an example, where the node has no children, and where the subset of kvsets includes the oldest kvset, writing the most recent key entry for each member of the set of collision keys to the new kvset and writing entries for each key in members of the subset of kvsets that are not in the set of collision keys to the new kvset includes omitting any key entries that are expired.

At operation 1020, entries for each key in members of the subset of kvsets that are not in the set of collision keys are added to the new kvset. In an example, operation 1020 and 1015 may operate concurrently to add entries to the new kvset.

At operation 1025, the subset of kvsets is replaced with the new kvset by writing the new kvset and removing (e.g., deleting, marking for deletion, etc.) the subset of kvsets.

Figure 11:
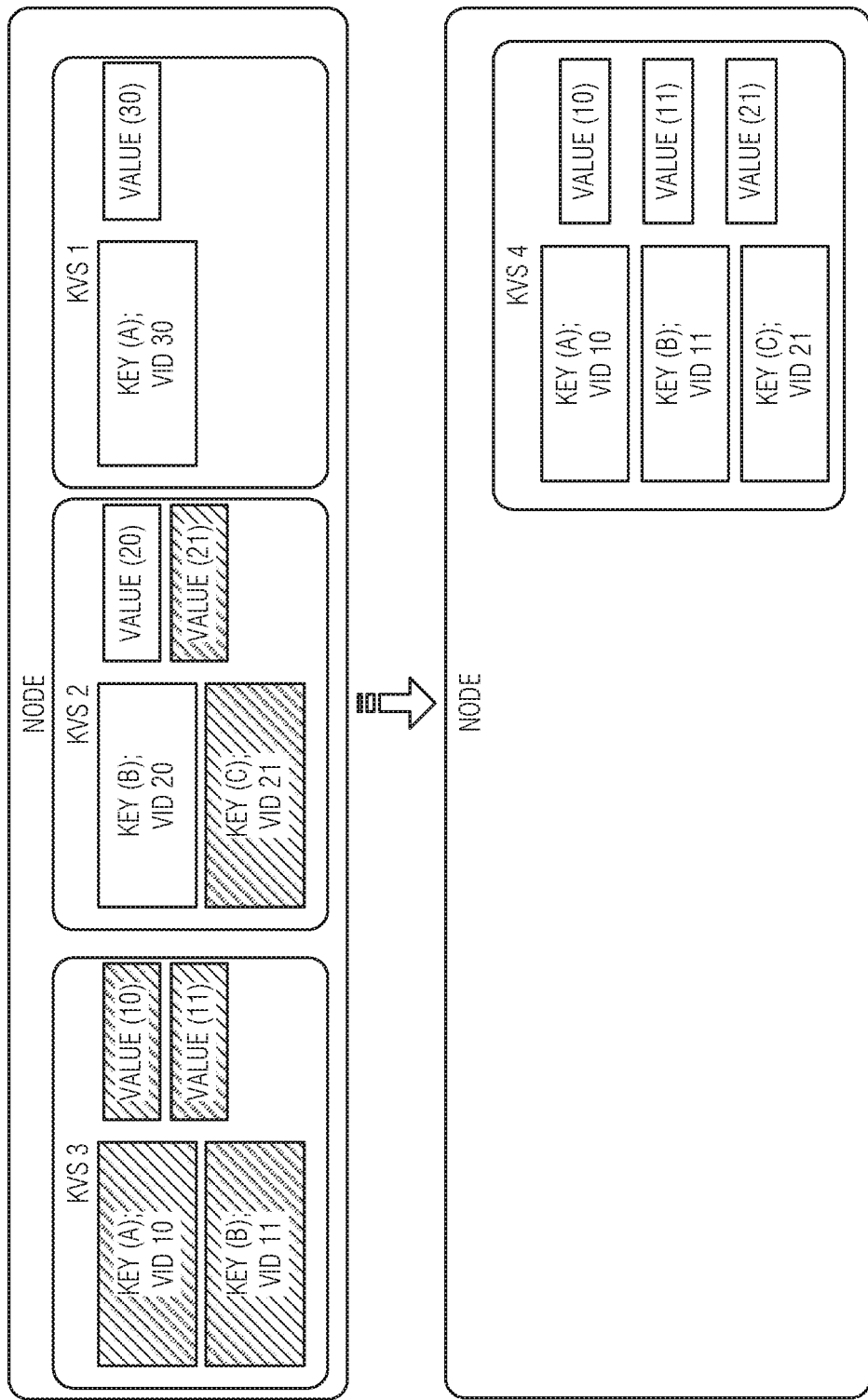
FIG. 11 is a block diagram illustrating key-value compaction, according to an embodiment.

FIG. 11 is a block diagram illustrating key-value compaction, according to an embodiment. Key value compaction differs from key compaction in its treatment of values. Key-value compaction reads the key-value pairs and tombstones from the merge set, removes obsolete key-value pairs or tombstones, writes the resulting key-value pairs and tombstones to one or more new kvsets in the same node, and deletes the kvsets comprising the merge set from the node. The new kvsets atomically replace, and are logically equivalent to, the merge set both in content and in placement within the logical ordering of kvsets from newest to oldest in the node.

As illustrated, kvsets KVS3, KVS2, and KVS1 comprise the merge set. The shaded key entries and values will be kept in the merge and placed in the new KVS4, written to the node to replace KVS3, KVS2, and KVS1. Again, as illustrated above with respect to key compaction, the key collisions for keys A and B are resolved in favor of the most recent entries. What is different in key-value compaction from key compaction is the removal of the unreferenced values. Thus, here, KVS4 is illustrated to consume only the space required to hold its current keys and values.

In practice, for example, when keys and values are stored separately in key-block and value-blocks, KVS4 includes both new key-blocks (like the result of key compaction) and new value blocks (unlike the result of key compaction). Again, however, key-value compaction does not block writing additional kvsets to the node while the key-value compaction is executing because the added kvsets will be logically newer than the KVS4, the result of the key-value compaction. Accordingly, KVS4 is illustrated in the oldest position (e.g., to the right) of the node.

Figure 12:
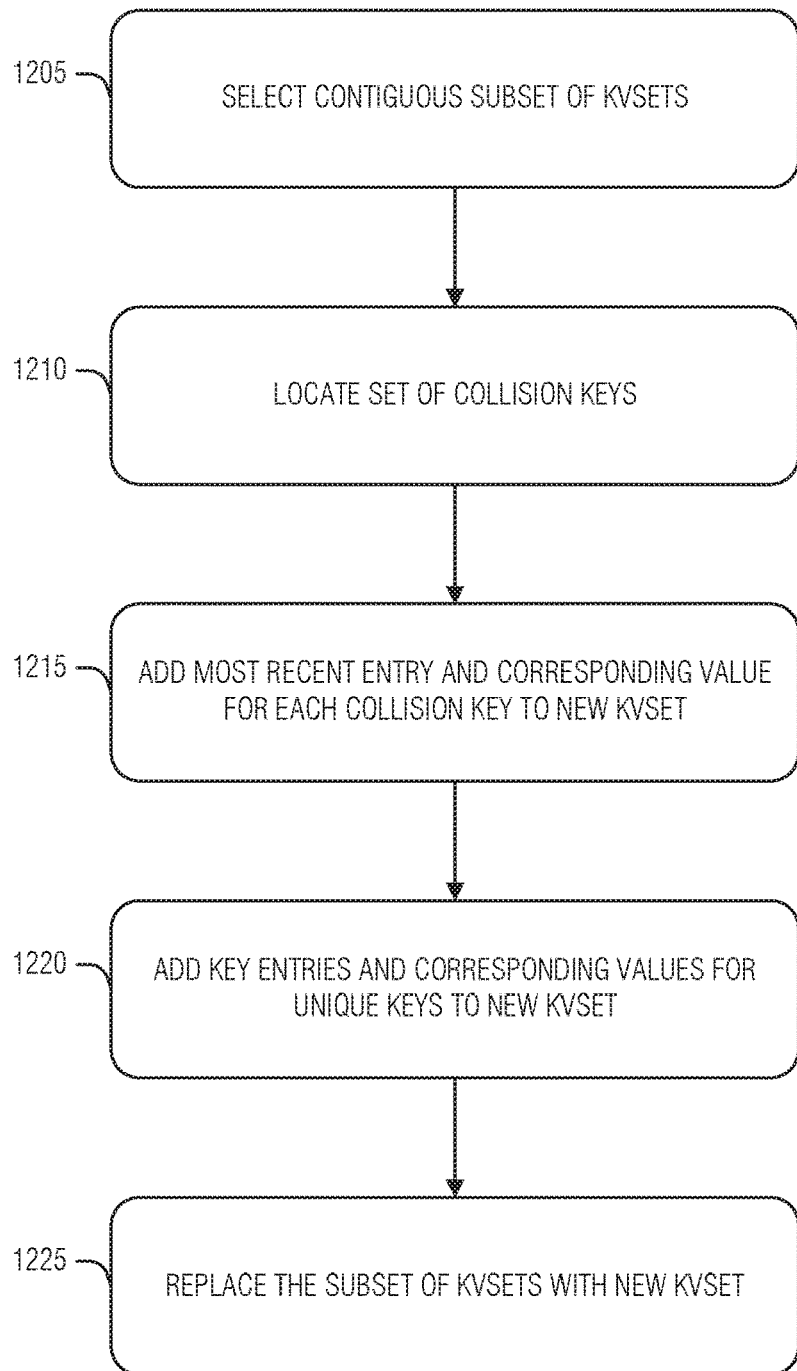
FIG. 12 illustrates an example of a method for key-value compaction, according to an embodiment.

FIG. 12 illustrates an example of a method 1200 for key-value compaction, according to an embodiment. The operations of the method 1200 are implemented with electronic hardware, such as that described throughout at this application, including below with respect to FIG. 26 (e.g., circuits).

At operation 1205, a subset of kvsets (e.g., a merge set) from a sequence of kvsets for the node is selected. In an example, the subset of kvsets are contiguous kvsets and include an oldest kvset.

At operation 1210, a set of collision keys is located. Members of the set of collision keys including key entries in at least two kvsets in the sequence of kvsets for the node.

At operation 1215, a most recent key entry, and corresponding value, for each member of the set of collision keys is added to a new kvset. In an example, where the node has no children, and where the merge set contains the oldest kvset, writing the most recent key entry for each member of the set of collision keys to the new kvset and writing entries for each key in members of the subset of kvsets that are not in the set of collision keys to the new kvset includes omitting any key entries that include a tombstone. In an example, where the node has no children, and where the merge set contains the oldest kvset, writing the most recent key entry for each member of the set of collision keys to the new kvset and writing entries for each key in members of the subset of kvsets that are not in the set of collision keys to the new kvset includes omitting any key entries that are expired.

At operation 1220, entries for each key, and value, in members of the subset of kvsets that are not in the set of collision keys are added to the new kvset.

At operation 1225, the subset of kvsets is replaced with the new kvset by writing the new kvset (e.g., to storage) and removing the subset of kvsets.

Spill and hoist compactions, discussed below with respect to FIGS. 15-18 are a form of key-value compaction where the resultant kvsets are placed in a child node or a parent node respectively. As each traverses the tree, and the KVS tree enforces a determinative mapping between parents and children, a brief discussion of this determinative mapping is here presented before discussing these other compaction operations.

Figure 13:
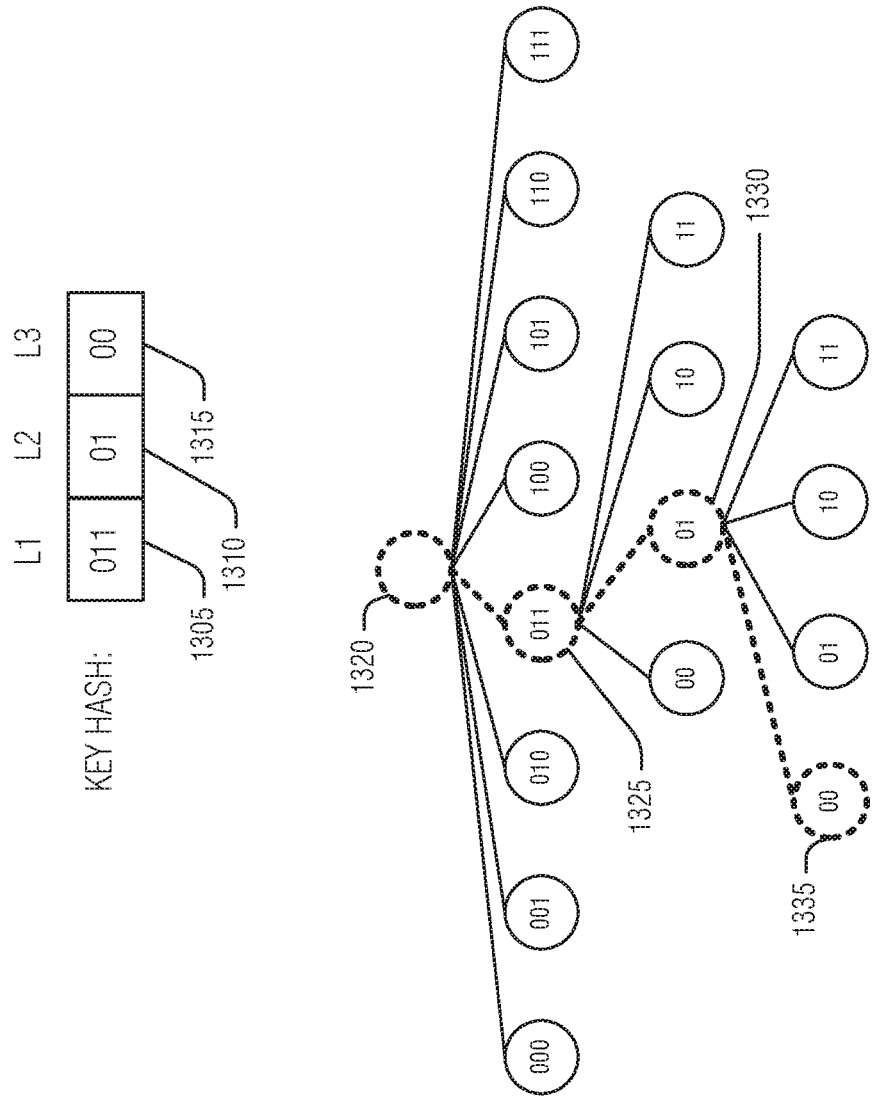
FIG. 13 illustrates an example of a spill value and its relation to a tree, according to an embodiment.

FIG. 13 illustrates an example of a spill value and its relation to a tree, according to an embodiment. The determinative mapping ensures that, given a key, one may know which child a key-value pair will be mapped to without regard to the KVS tree's contents. A spill function accepts a key and produces a spill value corresponding to the determinative mapping for the KVS tree. In an example, the spill function accepts both the key and a current tree-level and produces a spill value specific to a parent or a child node for the key at that tree-level.

By way of explanation, a simple determinative mapping (not illustrated in FIG. 13) may include, for example, an alphabetical mapping where, for keys composed of alphabet characters, each tree-level includes a child for each letter of the alphabet, and the mapping uses the characters of the keys in turn; such as the first character determines the L1 child, the second character determines the L2 child, and so one. While simple and meeting the determinative mapping of the KVS tree, this technique suffers somewhat from rigidity, poor balance in the tree, and a lack of control over tree fanning.

A better technique is to perform a hash on the keys and designate portions of the hash for each tree-level mapping. This ensures that the keys are evenly spread (assuming an adequate hash technique) as they traverse the tree and that fan-out is controlled by selecting the size of the hash portions for any given tree-level. Further, as hash techniques generally allow the size of the resultant hash to be configured, an adequate number of bits, for example, may be ensured, avoiding a problem with the simple technique discuassed above, where a short word (such as "the") has only enough characters for a three level tree.

FIG. 13 illustrates a result of the key hash with portions 1305, 1310, and 1315 respectively corresponding to L1, L2, and L3 of the tree. With the given tree hash, a traversal of the tree proceeds along the dashed lines and nodes. Specifically, starting at the root node 1320, portion 1305 directs the traversal to node 1325. Next, portion 1310 directs the traversal to node 1330. The traversal completes as portion 1315 points toward node 1335 at the deepest level of the tree possible based on the size and apportionment of the illustrated key hash.

In an example, for a given key K, a hash of the key K (or a subkey of key K) is called the spill value for key K. Note that two different keys may have the same spill value. When sub keys are employed to generate the spill values, it is often desirable for this to occur to enable prefix scanning or tombstones as discussed below.

In an example, for a given KVS tree, the spill value for a given key K is a constant, and the binary representation of the spill value comprises B bits. In this example, the B bits in a spill value are numbered zero through (B−1). Also in this example, the KVS tree is configured such that nodes at tree-level L all have the same number of child nodes, and this number of child nodes is an integer power of two greater than or equal to two. In this configuration, the bits of the spill value for a key K for key distribution may be used as illustrated below.

For a node at a level L in the KVS tree, let $2^{E(L)}$ be the number of child nodes configured for the node, where $2^{E(L)}>=2$. Then for a given node and a given key K in the KVS tree, the spill value for key K specifies the child node of the node used for spill compaction as follows:
  A) Level 0: spill value bits 0 through (E(0)−1) specify the child node number for key K;
  B) Level 1: spill value bits E(0) through (E(0)+E(1)−1) specify the child node number for key K; and
  C) Level L (L>1): spill value bits sum(E(0), . . . , E(L−1)) through (sum(E(0), . . . , E(L))−1) specify the child node number for key K.

The table below illustrates a specific example of the above radix-based key distribution technique given a KVS tree with seven (7) levels, a key K, and a 16-bit spill value for key K:

| Level | 0 | 1 | 2 | 3 | 4 | 5 |
|---|---|---|---|---|---|---|
| Child node count | 2 | 8 | 4 | 16 | 32 | 2 |
| Spill value bits | 0 | 1-3 | 4-5 | 6-9 | 10-14 | 15 |
| Key K spill value | 0 | 110 | 01 | 1110 | 10001 | 1 |
| Child node selected | 0 | 6 | 1 | 14 | 17 | 1 |

Where Level is a level number in the KVS tree; Child node count is the number of child nodes configured for all nodes at the specified level; Spill value bits is the spill value bit numbers that spill compaction uses for key distribution at the specified level; Key K spill value is the binary representation of the given 16-bit spill value for the given key K, specifically 0110011110100011—for clarity, the spill value is segmented into the bits that spill compaction uses for key distribution at the specified level; and Child node selected is the child node number that spill compaction selects for any (non-obsolete) key-value pair or tombstone with the given spill value—this includes all(non-obsolete) key-value pairs or tombstones with the given key K, as well as other keys different from key K that may have the same spill value.

In an example, for a given KVS tree, the spill value computation and spill value size (in bits) may be the same for all keys. As noted above, using an adequate hash permits controlling the number of bits in the spill value while also, for example, ensuring a spill value size sufficient to accommodate a desired number of tree-levels and a desired number of child nodes for the nodes at each level. In an example, for a given KVS tree, the spill value for a key K may be either computed as needed or stored on storage media (e.g., cached).

Figure 14:
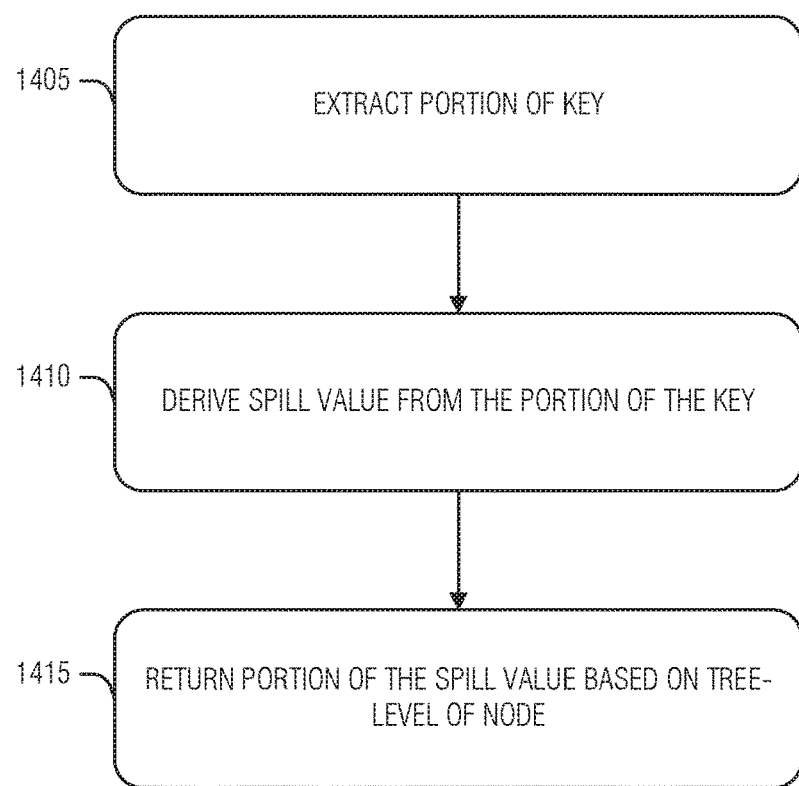
FIG. 14 illustrates an example of a method for a spill value function, according to an embodiment.

FIG. 14 illustrates an example of a method 1400 for a spill value function, according to an embodiment. The operations of the method 1400 are implemented with electronic hardware, such as that described throughout at this application, including below with respect to FIG. 26 (e.g., circuits).

At operation 1405, a portion of a key is extracted. In an example, the portion of the key is the entire key.

At operation 1410, a spill value is derived from the portion of the key. In an example, deriving the spill value from the portion of the key includes performing a hash of the portion of the key.

At operation 1415, a portion of the spill value is returned based on the tree-level of the parent node. In an example, returning the portion of the spill value based on the tree-level of the parent node includes applying a pre-set apportionment to the spill value, and returning the portion of the spill value corresponding to the pre-set apportionment and the tree-level of the parent node. Here the pre-set apportionment defines the portions of the spill value that apply to respective levels of the tree.

In an example, the pre-set apportionment defines a maximum number of child nodes for at least some of the tree-levels. In an example, the pre-set apportionment defines a maximum depth to the tree. In an example, the pre-set apportionment defines a sequence of bit-counts, each bit-count specifying a number of bits, the sequence ordered from low tree-levels to high-tree levels such that the spill value portion for the lowest tree-level is equal to a number of bits equal to the first bit-count starting at the beginning of the spill value and the spill value portion for the n-th tree-level is equal to the n-th bit-count in the sequence of bit counts with an offset into the spill value of the sum of bit counts starting at the first bit-count and ending at a n minus one bit-count.

Figure 15:
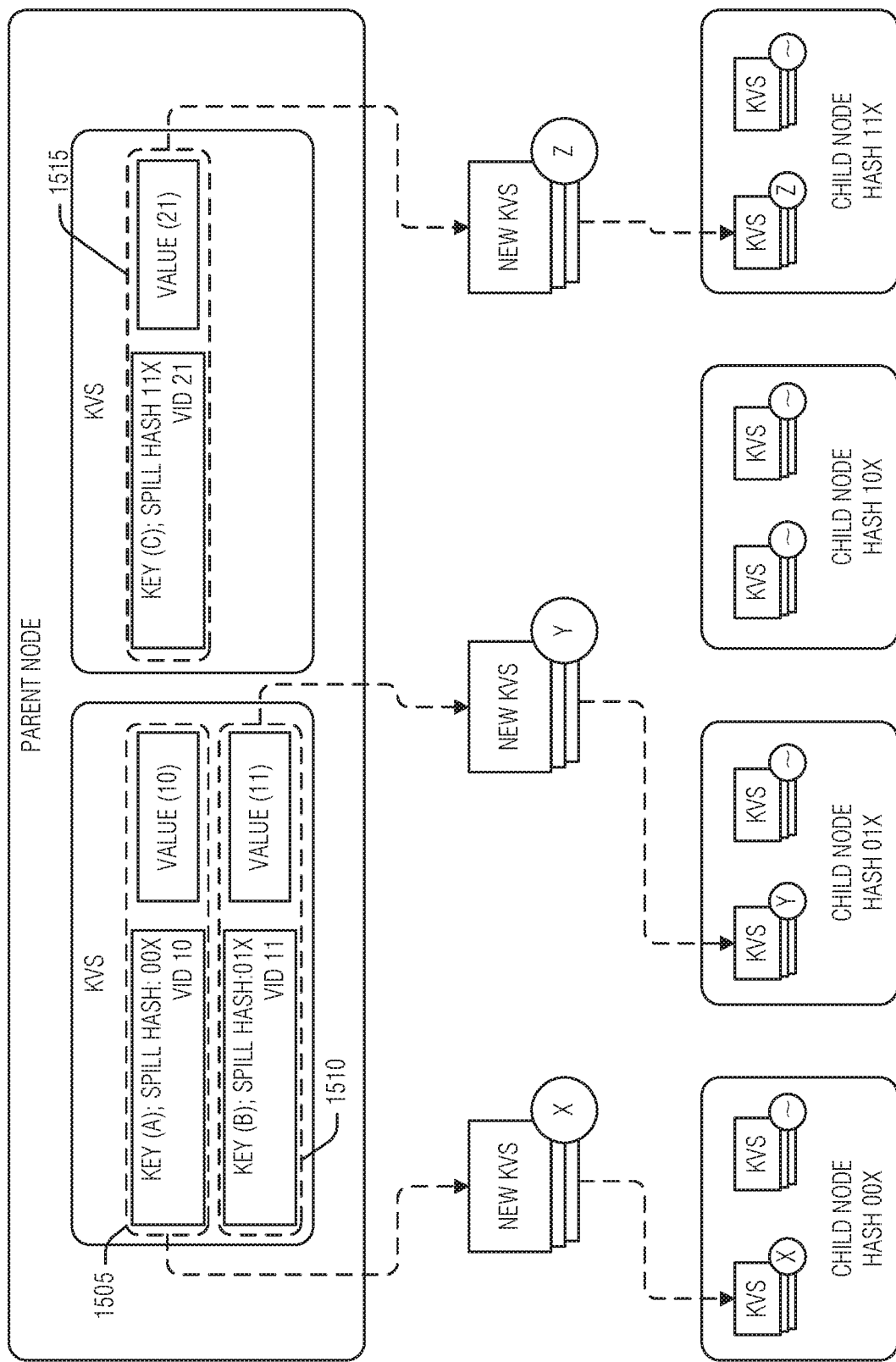
FIG. 15 is a block diagram illustrating spill compaction, according to an embodiment.

FIG. 15 is a block diagram illustrating spill compaction, according to an embodiment. As noted above, spill compaction is a combination of a key-value compaction with a tree traversal (to a child node) to place the resultant kvsets. Thus, spill compaction (or just spill) reads the key-value pairs and tombstones from the merge set, removes all obsolete key-value pairs or tombstones (garbage), writes the resulting key-value pairs and tombstones to new kvsets in some or all of the child nodes of the node containing the merge set, and deletes the kvsets comprising the merge set. These new kvsets atomically replace, and are logically equivalent to, the merge set.

Spill compaction uses a deterministic technique for distributing the key-value pairs and tombstones in a merge set to the child nodes of the node containing the merge set. Specifically, spill compaction may use any such key distribution method such that for a given node and a given key K, spill compaction always writes any (non-obsolete) key-value pair or tombstone with key K to the same child node of that node.

In a preferred embodiment, spill compaction uses a radix-based key distribution method such as the one in the example presented in detail below.

To facilitate understanding of a spill, the parent node includes two kvsets that comprise the merge set. Key-value pairs 1505, 1510, and 1515 in the two kvsets respectively have spill values of 00X, 01X, and 11X, which respectively correspond to three of the parent node's four child nodes. Thus, key-value pair 1505 is placed into the new kvset X, key-value pair 1510 is placed into the new kvset Y. and key-value pair 1515 is placed into the new kvset Z, with each new kvset being written to the child corresponding to the spill value. Also note that the new kvsets are written to the newest (e.g., left-most) position in the respective child nodes.

In an example, the merge set for a spill compaction must include the oldest kvset in the node containing the merge set. In an example, if the node containing the merge set has no child nodes at the start of a spill compaction, the configured number of child nodes is created.

As with other compactions discussed above, new kvsets may be added to the node containing the merge set for a spill compaction while the spill compaction is executing because by definition these added kvsets will not be in the merge set for the spill compaction and because these added kvsets will be logically newer than the kvsets resulting from the spill compaction.

Figure 16:
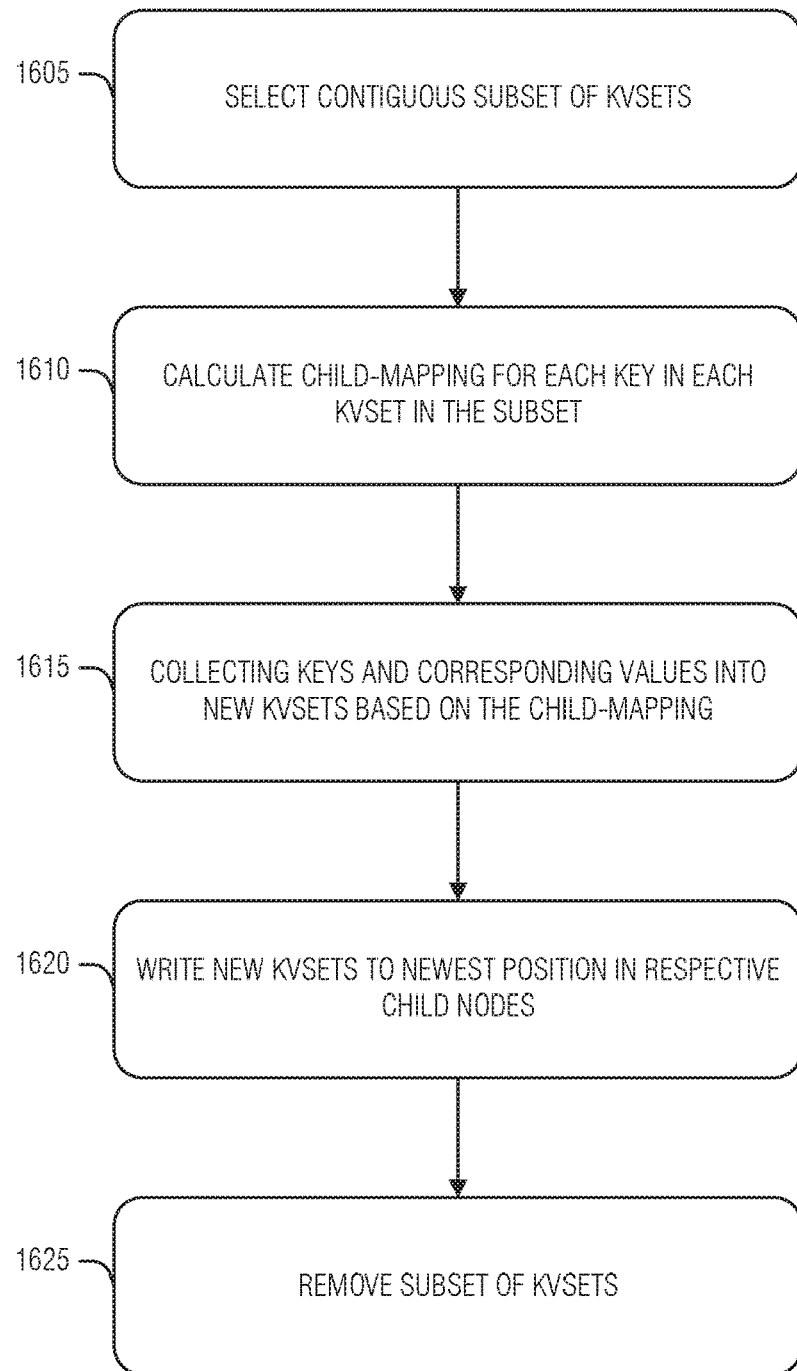
FIG. 16 illustrates an example of a method for spill compaction, according to an embodiment.

FIG. 16 illustrates an example of a method 1600 for spill compaction, according to an embodiment. The operations of the method 1600 are implemented with electronic hardware, such as that described throughout at this application, including below with respect to FIG. 26 (e.g., circuits).

At operation 1605, a subset of the sequence of kvsets is selected. In an example, the subset includes contiguous kvsets that also includes an oldest kvset.

At operation 1610, a child-mapping for each key in each kvset of the subset of kvsets is calculated. Here, the child mapping is a determinative map from a parent node to a child node based on a particular key and a tree-level of the parent node.

At operation 1615, keys and corresponding values are collected into kvsets based on the child-mapping with each kvset set mapped to exactly one child node. Key collisions may occur during this collection. As discussed above with respect to FIGS. 10 and 12, such a collision is resolved in favor of the newer key entry.

At operation 1620, the kvsets are written to a newest position in respective sequences of kvsets in respective child nodes.

At operation 1625, the subset of kvsets are removed from the root node.

The method 1600 may be extended to include performing a second spill operation on a child node in response to a metric of the child node exceeding a threshold after operation of the spill operation.

Figure 17:
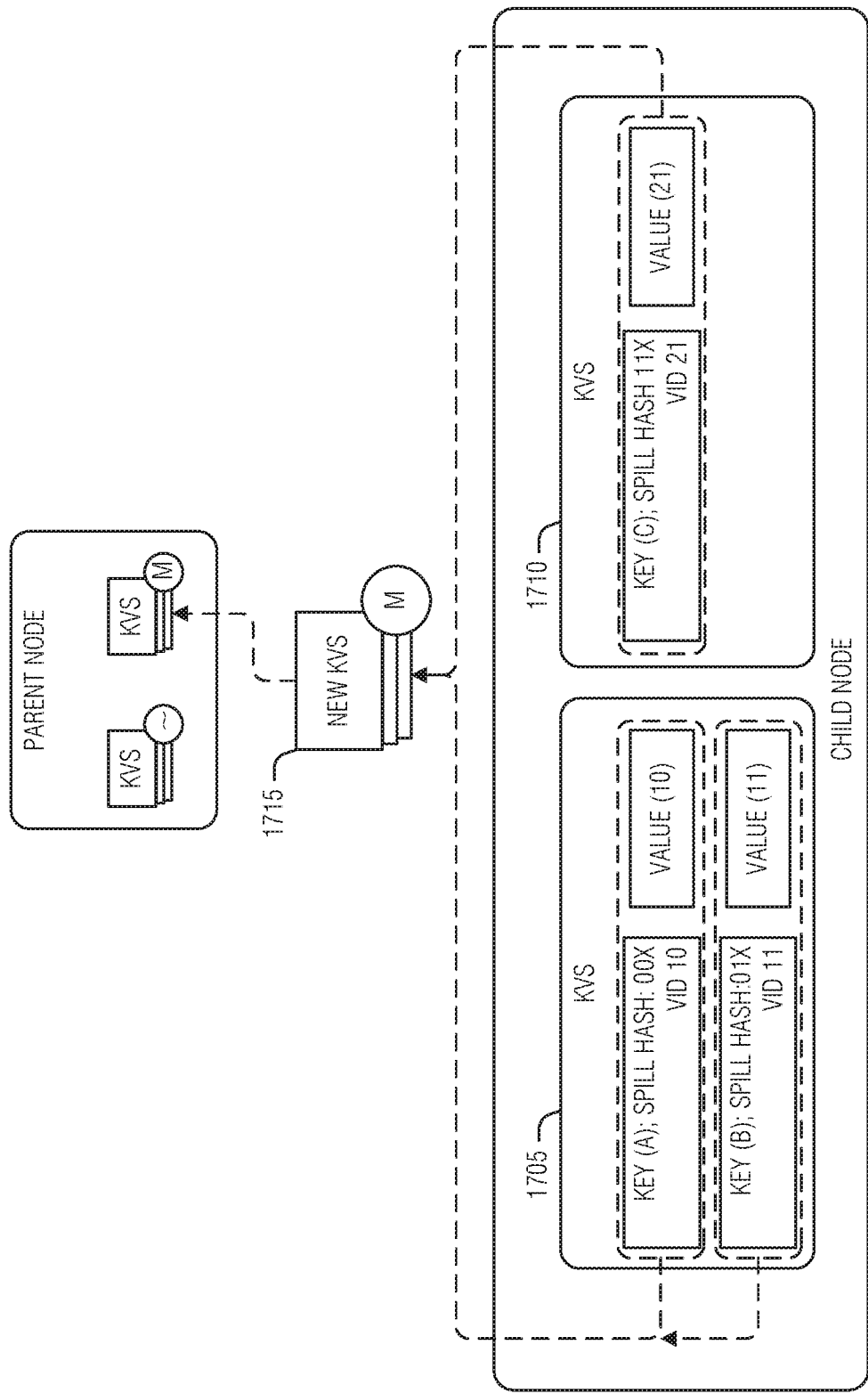
FIG. 17 is a block diagram illustrating hoist compaction, according to an embodiment.

FIG. 17 is a block diagram illustrating hoist compaction, according to an embodiment. Hoist compaction differs from spill compaction in that the new kvset is written to a parent node. Thus, hoist compaction, or just hoist, reads the key-value pairs and tombstones from the merge set, removes all obsolete key-value pairs or tombstones, writes the resulting key-value pairs and tombstones to new kvsets in the parent node of the node containing the merge set, and deletes the kvsets comprising the merge set. These new kvsets atomically replace, and are logically equivalent to, the merge set.

As the kvsets in a KVS tree are organized from newest to oldest from the root of the tree to the leaves, a hoist compaction includes the newest kvset in the node containing the merge set and the kvsets resulting from the hoist compaction are placed in the oldest position in the sequence of kvsets in the parent node of the node. Unlike the other compactions discussed above, in order to ensure that the newest kvset from the node being compacted is in the merge set, new kvsets cannot be added to the node containing the merge set while the hoist compaction is executing. Thus, the hoist compaction is a blocking compaction.

As illustrated, the key-value pairs of KVS 1705 and 1710 are merged into the new KVS M 1715 and stored in the oldest position in the parent node's sequence of kvsets. A hoist compaction may be applied to a merge set when, for example, the goal is to reduce the number of levels in a KVS tree and thereby increase the efficiency of searching for keys in the KVS tree.

Figure 18:
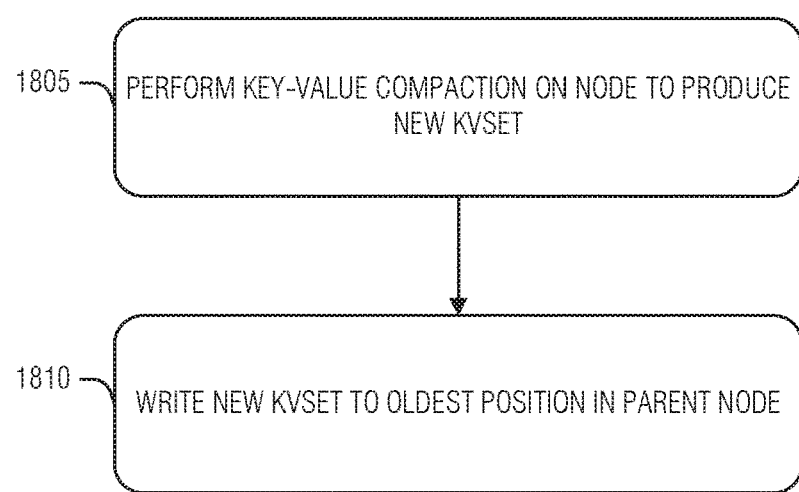
FIG. 18 illustrates an example of a method for hoist compaction, according to an embodiment.

FIG. 18 illustrates an example of a method 1800 for hoist compaction, according to an embodiment. The operations of the method 1800 are implemented with electronic hardware, such as that described throughout at this application, including below with respect to FIG. 26 (e.g., circuits). In an example.

At operation 1805, a key and value compaction is performed on the child node to produce a new kvset without writing the new kvset to the child node.

At operation 1810, the new kvset is written to the node in an oldest position for a sequence of kvsets of the node.

Key-value compaction, spill compaction, and hoist compaction operations may physically remove obsolete key-value pairs and tombstones from a merge set and may thereby reduce the amount (for example in bytes) of key-value data stored in a KVS tree. In doing do, these compaction operations read non-obsolete values from value-blocks, for example, in the merge set and write these values to value-blocks in the kvsets resulting from the compaction operation.

In contrast, a key compaction operation may physically remove keys (and tombstones) but only logically removes values from a merge set. Thus, the values physically remain in the kvsets resulting from the key compaction. Key compaction may increase the efficiency of searching for keys in the node containing the merge set by reducing the number of kvsets in that node while avoiding the additional reading and writing of value-blocks incurred by, for example, a key-value compaction operation. Further, the key compaction provides useful information for future maintenance operations. Key compaction is uniquely supported by KVS trees due to the separation of keys and values in key-blocks and value-blocks as described above.

The KVS tree maintenance techniques (e.g., compactions) described above operate when a trigger condition is met. Controlling when and where (e.g., which nodes) maintenance occurs may provide optimizations to processing, or time, spent versus increased space or searching efficiency. Some metrics gathered during maintenance, or during ingestion, may enhance the system's ability to optimize later maintenance operations. Here, these metrics are referred to either as a garbage metric or an estimated garbage metric based on how the metric was computed. Examples of such garbage metrics include the number of obsolete key-value pairs and tombstones in a node or the amount of storage capacity they consume, and the amount of storage capacity consumed by unreferenced data in value-blocks in a node. Such garbage metrics indicate how much garbage may be eliminated by performing, for example, a key-value compaction, spill compaction, or hoist compaction on the kvsets of a node.

Again, for a given KVS tree, computing or estimating garbage metrics for its nodes provides several advantages, including making it practical to:
A) Prioritize applying garbage collection operations to those nodes with the most garbage, in particular garbage collection operations that physically remove obsolete key-value pairs and tombstones such as key-value compaction, spill compaction, and hoist-compaction. Prioritizing garbage collection operations in this manner increases their efficiency and reduces associated write-amplification; or
B) Estimate the number of valid key-value pairs and number of obsolete key-value pairs in the KVS tree, and the amount of storage capacity consumed by each category. Such estimates are useful in reporting capacity utilization for the KVS tree.

In some cases it is advantageous to directly compute garbage metrics for a given node in a KVS tree, whereas in other cases it is advantageous to estimate them. Hence techniques for both computing and estimating garbage metrics are described below.

To facilitate the collection of the garbage metrics, some kvset statistics may be gathered or maintained. In an example, these statistics are maintained within the kvset set itself, such as in a primary key-block header for the kvset. Below is a non-exhaustive list of kvset statistics that may be maintained:
A) Number of key-value pairs
B) Number of key tombstones
C) Capacity needed to store all keys for key-value pairs and tombstones
D) Capacity needed to store all values for key-value pairs
E) Key size statistics including minimum, maximum, median, and mean
F) Value size statistics including minimum, maximum, median, and mean
G) Count of, and capacity consumed by, unreferenced values if the kvset is the result of a key compaction.
H) Minimum and maximum time-to-live (TTL) value for any key-value pair. A KVS tree may allow the user to specify a TTL value when storing a key-value pair, and the key-value pair will be removed during a compaction operation if its lifetime is exceeded.

Computed garbage metrics involve the computation of known quantities to produce a known result. For example, if it is known that there are n-bits that are obsolete in a kvset, key-value compacting the kvset will result in freeing those n-bits. A source of metrics for computed garbage metrics are key compactions. Key compactions logically remove obsolete key-value pairs and tombstones, and physically remove redundant keys, from a merge set. However, unreferenced data may remain in the value-blocks of the kvsets resulting from key compactions. Thus, key compaction results in knowing which values are unreferenced in the new kvset and their size. Knowing the size of those values permits an accurate count of storage that will be freed under other compactions. Thus, when executing a key compaction on a merge set in a KVS tree, garbage metrics for each of the resulting kvsets may be recorded in the respective kvsets. Example garbage metrics that may be maintained from a key compaction include:
A) The count of unreferenced values in the kvset
B) The bytes of unreferenced values in the kvset In an example, given a first key compaction on a merge set, and given a second key compaction in the same node as the first key compaction where the merge set for the second key compaction includes the kvsets resulting from the first key compaction, then garbage metrics recorded from the first key compaction may be added to like garbage metrics recorded from the second key compaction. For example, if the first key compaction operation resulted in a single kvset S with associated key compaction garbage metrics specifying Ucnt count of unreferenced values, then Ucnt may be included in the count of unreferenced values in the key compaction garbage metrics resulting from the second key compaction operation.

In an example, for a given node in a KVS tree, if the merge set for a key compaction operation includes all of the kvsets in the node, then the key compaction garbage metrics recorded may include:
A) The count of unreferenced values in the node
B) The bytes of unreferenced values in the node It is clear that, if every kvset in a given node is the result of a key compaction operation, then the key compaction garbage metrics for the node are the sum of the like key compaction garbage metrics from each of the individual kvsets in the node.

Estimated garbage metrics provide a value that estimates the gain from performing a compaction on a node. Generally, estimated garbage metrics are gathered without performing a key compaction. The following terms are used in the discussion below. Let:
A) T=the number of kvsets in the given node
B) S(j)=a kvset in the given node, where S(1) is the oldest kvset and S(T) is the newest
C) KVcnt(S(j))=number of key-value pairs in S(j)
D) NKVcnt=sum(KVcnt(S(j))) for j in range one through T
E) Kcap(S(j))=capacity needed to store all keys for S(j) in bytes
F) NKcap=sum(Kcap(S(j))) for j in range one through T
G) Vcap(S(j))=capacity needed to store all values for S(j) in bytes
H) NVcap=sum(Vcap(S(j))) for j in range one through T
I) NKVcap=NKcap+NVcap A form of estimated garbage metrics are historical garbage metrics. Historical garbage collection information may be used to estimate garbage metrics for a given node in a KVS tree. Examples of such historical garbage collection information include, but are not limited to:

A) Simple, cumulative, or weighted moving averages of the fraction of obsolete key-value pairs in prior executions of garbage collection operations in the given node; or
B) Simple, cumulative, or weighted moving averages of the fraction of obsolete key-value pairs in prior executions of garbage collection operations in any node at the same level of the KVS tree as the given node.

In the above examples, garbage collection operations include, but are not limited to, key compaction, key-value compaction, spill compaction, or hoist compaction. Given a node in a KVS tree, historical garbage collection information and kvset statistics provide the information to generate estimated garbage metrics for the node.

In an example, a Node Simple Moving Average (NodeSMA) may be performed to create the historical garbage metrics. Here, let NSMA(E)=mean of fractions of obsolete key-value pairs in the most recent E executions of garbage collection operations in the given node, where E is configurable. In this example, the NodeSMA estimated garbage metrics for the given node may include the following:
A) NKVcnt*NSMA(E) count of obsolete key-value pairs in the node;
B) NKVcap*NSMA(E) bytes of obsolete key-value data in the node;
C) NKVcnt−(NKVcnt*NSMA(E)) count of valid key-value pairs in the node; or
D) NKVcap−(NKVcap*NSMA(E)) bytes of valid key-value data in the node.

Another variation on historical garbage metrics include Level Simple Moving Average (LevelSMA) garbage metrics. In this example, let LSMA(E)=mean of fractions of obsolete key-value pairs in the most recent E executions of garbage collection operations in any node at the same level of the KVS tree as the given node, where E is configurable. In this example, the LevelSMA estimated garbage metrics for the given node may include:
A) NKVcnt*LSMA(E) count of obsolete key-value pairs in the node;
B) NKVcap*LSMA(E) bytes of obsolete key-value data in the node;
C) NKVcnt−(NKVcnt*LSMA(E)) count of valid key-value pairs in the node; or
D) NKVcap−(NKVcap*LSMA(E)) bytes of valid key-value data in the node.

The above examples of historical garbage metrics are not exhaustive, but rather illustrate the types of metrics being gathered. Other example historical garbage metrics may include Node Cumulative Moving Average (NodeCMA) garbage metrics, Node Weighted Moving Average (NodeWMA) garbage metrics, Level Cumulative Moving Average (LevelCMA) garbage metrics, or Level Weighted Moving Average (LevelWMA) garbage metrics.

Another variation on estimated garbage metrics available to KVS trees that maintain bloom filters in kvsets for keys are bloom filter garbage metrics. As noted above, in an example of a KVS tree, a given kvset includes a bloom filter to efficiently determine if the kvset might contain a given key, where there is one entry in the bloom filter for the kvset for each key in the kvset. These bloom filters may be used to estimate garbage metrics for a given node in a KVS tree. For a given node in a KVS tree, techniques—such as that discussed in Papapetrou, Odysseas, et al., Cardinality Estimation and Dynamic Length Adaptation for Bloom Filters, Distributed and Parallel Databases, 201—may be used to approximate the cardinality of the intersection of the sets of keys represented by the bloom filters in the kvsets comprising the node. This approximated value is here referred to as the bloom-estimated cardinality of the node.

Given a node in a KVS tree, the bloom-estimated cardinality of the node and kvset statistics permit estimated garbage metrics for the node to be generated in several ways. An example bloom filter garbage metric includes Bloom-Delta garbage metrics. Let NBEC=the bloom-estimated cardinality of the T kvsets in the given node, and Fobs= (NKVcnt−NBEC)/NKVcnt, which is an estimate of the fraction of obsolete key-value pairs in the given node. In this example, the BloomDelta garbage metrics for the given node may include:
A) NKVcnt−NBEC count of obsolete key-value pairs in the node;
B) NKVcap*Fobs bytes of obsolete key-value data in the node;
C) NBEC count of valid key-value pairs in the node; or
D) NKVcap−(NKVcap*Fobs) bytes of valid key-value data in the node.

Probabilistic filters different than bloom filters, for which it is possible to approximate the cardinality of the intersection of sets of keys represented by two or more such filters, may be used as a substitute for bloom filters in the estimated garbage metrics.

Computed and estimated garbage metrics may be combined to produce hybrid garbage metrics, another form of estimated garbage metrics due to the inclusion of another form of estimated garbage metrics. For example, given a node comprising T kvsets, if key compaction garbage metrics are available for W of these kvsets and W<T, then hybrid garbage metrics for the node may be generated as follows. For the W kvsets in the node for which key compaction garbage metrics are available, let:
A) KGMOcnt=an estimate of the count of obsolete key-value pairs in the W kvsets+the sum of the count of unreferenced values from each of the W kvsets;
B) KGMOcap=an estimate of the bytes of obsolete key-value data in the W kvsets+the sum of the bytes of unreferenced values from each of the W kvsets;
C) KGMVcnt=an estimate of the count of valid key-value pairs in the W kvsets; and
D) KGMVcap=an estimate of the bytes of valid key-value data in the W kvsets.

Where the estimated garbage metrics may be generated using one of the techniques discussed above under the assumption that the W kvsets are the only kvsets in the node.

For the (T−W) kvsets in the node for which key compaction garbage metrics are not available, let:
A) EGMOcnt=an estimate of the count of obsolete (garbage) key-value pairs in the (T−W) kvsets;
B) EGMOcap=an estimate of the bytes of obsolete (garbage) key-value data in the (T−W) kvsets;
C) EGMVcnt=an estimate of the count of valid key-value pairs in the (T−W) kvsets; and
D) EGMVcap=an estimate of the bytes of valid key-value data in the (T−W) kvsets.

Where these estimated garbage metrics may be generated using one of the techniques discussed above under the assumption that the (T−W) kvsets are the only kvsets in the node. Given these parameters, the hybrid garbage metrics for the given node may include:
A) KGMOcnt+EGMOcnt count of obsolete key-value pairs in the node;
B) KGMOcap+EGMOcap bytes of obsolete key-value data in the node;

C) KGMVcnt+EGMVcnt count of valid key-value pairs in the node; or

D) KGMVcap+EGMVcap bytes of valid key-value data in the node.

Garbage metrics allow the prioritization of garbage collection operations to the tree-levels or nodes with a sufficient amount of garbage to justify the overhead of a garbage collection operation. Prioritizing garbage collection operations in this manner increases their efficiency and reduces associated write-amplification. In addition, estimating the number of valid key-value pairs and number of obsolete key-value pairs in the tree, and the amount of storage capacity consumed by each category, is useful in reporting capacity utilization for the tree.

Figure 19:
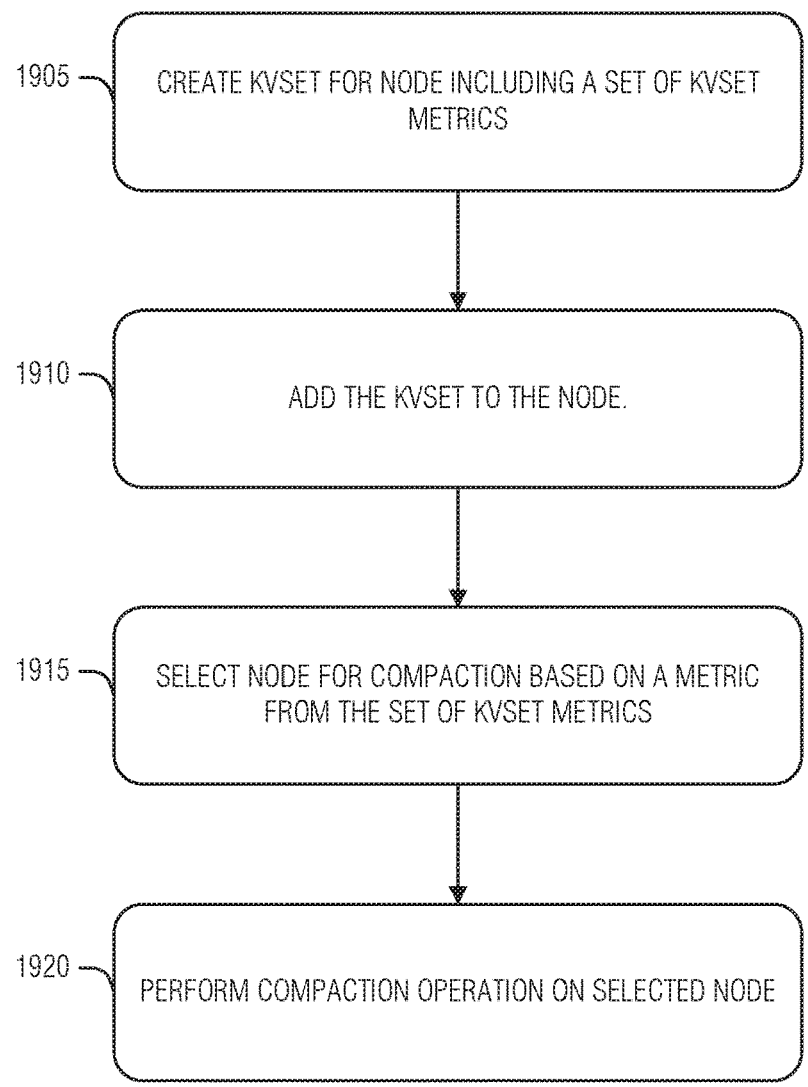
FIG. 19 illustrates an example of a method for performing maintenance on a KVS tree, according to an embodiment.

FIG. 19 illustrates an example of a method 1900 for performing maintenance on a KVS tree, according to an embodiment. The operations of the method 1900 are implemented with electronic hardware, such as that described throughout at this application, including below with respect to FIG. 26 (e.g., circuits).

At operation 1905, a kvset is created for a node in a KVS tree. As part of the kvset creation, a set of kvset metrics is computed for the kvset. In an example, the set of kvset metrics include a number of key-value pairs in the kvset. In an example, the set of kvset metrics include a number of tombstones in the kvset. In an example, the set of kvset metrics include a storage capacity to store all key entries for key-value pairs and tombstones in the kvset. In an example, the set of kvset metrics include a storage capacity for all values of key-value pairs in the kvset.

In an example, the set of kvset metrics include key size statistics for keys in the kvset. In an example, the key size statistics include at least one of maximum, minimum, median, or mean. In an example, the set of kvset metrics include value size statistics for keys in the kvset. In an example, the value size statistics include at least one of maximum, minimum, median, or mean.

In an example, the set of kvset metrics include a minimum or a maximum time-to-live (TTL) value for a key-value pair in the kvset. TTL may be useful when a an ingest operation specifies a period for which a key-value pair will be valid. Thus, after the key-value pair's expiration, it is a prime target for reclamation via a compaction operation.

In an example, the kvset is created in response to a compaction operation. Here, the compaction operation is at least one of a key compaction, a key-value compaction, a spill compaction, or a hoist compaction. In an example, the compaction operation is a key compaction. In this example, the set of kvset metrics may include metrics of unreferenced values in the kvset as a result of the key compaction. In an example, the unreferenced value metrics include at least one of a count of unreferenced values or a storage capacity consumed by unreferenced values. As used herein, the storage capacity consumed is measured in bits, bytes, blocks, or the like used by an underlying storage device to hold key entries or values as the case may be.

In an example, where the kvset was created by a compaction operation, the set of kvset metrics may include an estimate of obsolete key-value pairs in the kvset. As used herein, the estimate is such because the compaction only gains insight into obsolete (e.g., superseded) key-value pairs in the merge set subject to the compaction and thus does not know whether a seemingly current key-value pair is made obsolete by an entry in a newer kvset that is not part of the compaction. In an example, the estimate of obsolete key-value pairs may be calculated by summing a number of key entries from pre-compaction kvsets that were not included in the kvset. Thus, as part of a compaction, a number of obsolete pairs, with respect to the merge set, will be known and may be used as an estimate of obsolete data in the created kvset. Similarly, an estimate of valid key-value pairs in the kvset may be calculated by summing a number of key entries from pre-compaction kvsets that were included in the kvset and be a part of the set of kvset metrics. In an example, the set of kvset metrics include an estimated storage size of obsolete key-value pairs in the kvset. In an example, include an estimated storage size of valid key-value pairs in the kvset, the estimated storage size of valid key-value pairs calculated by summing storage sizes of key entries and corresponding values from pre-compaction kvsets that were included in the kvset. These estimates may be used for historical metrics as, unless a key-compaction is performed, the estimated obsolete values will be removed in the compaction. However, if a node has a regular (e.g., historical) performance in a compaction, one may assume that this performance continues in the future.

In an example, the set of kvset metrics are stored in the kvset (e.g., in a primary key block header). In an example, the set of kvset metrics are stored in the node and not in the kvset. In an example, a subset of the kvset metrics are stored in the kvset and a second subset of the kvset metrics are stored in the node.

At operation 1910, the kvset is added to the node. Generally, once added to the node, the kvset is also written (e.g., to on-disk storage).

At operation 1915, the node is selected for a compaction operation based on a metric in the set of kvset metrics. Thus, the kvset metrics, or the node metrics discussed below, or both, may contribute to a decision by a garbage collector or similar tree maintenance process. In an example, selecting the node for the compaction operation includes collecting sets of kvset metrics for a multiple of nodes, sorting the multiple of nodes based on the sets of kvset metrics, and selecting a subset of the multiple of nodes based on a sort order from the sorting. In this example, operation 1920 may be implemented such that performing the compaction operation on the node includes performing the compaction operation on each node in the subset of the multiple of nodes (including the node). In an example, a cardinality of the subset of the multiple of nodes is set by a performance value. In an example, the performance value is an efficiency of performing the compaction as measured by space recovered. This may often be implemented as a threshold. In an example, a threshold function may be used that accepts a number of parameters, such as the amount of unused storage capacity left on the underlying storage device and an estimate of capacity to be reclaimed in the compaction operation to arrive at a decision as to whether or not to perform a given compaction operation.

At operation 1920, the compaction operation is performed on the node. In an example, a type of compaction operation (e.g., key compaction key-value compaction, spill compaction, or hoist compaction) is selected based on a metric in the set of kvset metrics.

The operations of the method 1900 may be extended to include modifying node metrics in response to adding the kvset to the node. In an example, the node metrics include a value of a fraction of estimated obsolete key-value pairs in kvsets subject to prior compactions performed on a node group including the node. In an example, the value is a simple average. In an example, the value is a moving average. In an example, the value is a weighted average. In an example, the value is a mean of the fraction of estimated obsolete key-value pairs in kvsets subject to a set number of most recent prior compactions for the node. In an example, the value is a mean of the fraction of estimated obsolete key-value pairs in kvsets subject to a set number of most recent prior compactions for all nodes at a tree-level of the node.

In an example, node group includes only the node. In an example, the node group includes all nodes on a tree-level of the node. In an example, the node metrics include a summation of like metrics in the set of kvset metrics resulting from a compaction operation and previous kvset metrics from compaction operations performed on the node.

In an example, the node metrics include an estimated number of keys that are the same in the kvset and a different kvset of the node. In an example, the estimated number of keys are calculated by obtaining a first key bloom filter from the kvset, obtaining a second key bloom filter from the different kvset, and intersecting the first key bloom filter and the second key bloom filter to produce a node bloom filter estimated cardinality (NBEC). Although this example is written as between two kvsets (e.g., the intersection of only two bloom filters from two kvsets), any number of kvset bloom filters may be intersected to arrive at the NBEC that represents the estimate of the number of keys common to all kvsets whose bloom filter was part of the intersection.

In an example, the node metrics include subtracting the NBEC from a NKVcnt value to estimate a number of obsolete key-value pairs in the node. Here, the NKVcnt value is a total count of key value pairs in each kvset of the node for which a bloom filter was intersected to produce the NBEC. In an example, the node metrics include multiplying a NKVcap value by a Fobs value. Here, the NKVcap value is a total storage capacity used by keys and values in each kvset in the node for which a bloom filter was intersected to produce the NBEC, and the Fobs value is the result of subtracting the NBEC from an NKVcnt value and dividing by NKVcnt, where the NKVcnt value is a total count of key value pairs in each kvset of the node for which a bloom filter was intersected to produce the NBEC.

In an example, the node metrics are stored in the node. Here, the node metrics are stored along with node metrics from other nodes. In an example, the node metrics are stored in a tree-level, the tree-level being common to all nodes in a level of the KVS tree.

The garbage collection metrics and their use described above to improve KVS tree performance may be aided in a number of ways by modifying the vanilla operation of the KVS tree or elements therein (e.g., tombstones) under certain circumstances. Examples may include tombstone acceleration, update tombstones, prefix tombstones, or immutable data KVS trees.

A tombstone represents a deleted key-value in a KVS tree. When a tombstone is compacted in a leaf of the KVS tree, and the compaction includes the oldest kvset in the leaf, it is actually removed, but otherwise remains to prevent a possibly obsolete value for the key being returned in a search. In a key compaction or key-value compaction resulting in a tombstone in the merge set on a node that has child nodes, tombstone acceleration includes writing non-obsolete tombstones to one or more new kvsets in some or all of these child nodes following the key distribution method used for spill compaction in the KVS tree.

If the merge set for a key compaction or key-value compaction operation includes the oldest kvset in the node containing the merge set, then accelerated tombstones (if any) need not be included in the new kvsets created by the compaction operation in that node. Otherwise, if the merge set for a key compaction or key-value compaction operation does not include the oldest kvset in the node containing the merge set, then accelerated tombstones (if any) are also included in the new kvsets created by the compaction operation in that node. The distribution of the accelerated tombstones into older areas of the KVS tree facilitates garbage collection by allowing the removal of key-value pairs in child nodes without waiting for the original tombstones to be pushed to the child nodes.

A key compaction or key-value compaction operation may apply specified or computed criteria to determine whether or not to also perform tombstone acceleration. Examples of such tombstone acceleration criteria include, but are not limited to, the number of non-obsolete tombstones in a merge set and the amount (for example in bytes) of key-value data logically deleted by the tombstones in a merge set which may be known or an estimate.

Update tombstones operate similarly to accelerated tombstones though the original ingest value is not a tombstone. Essentially, when a new value is added to the KVS tree, all older values for that key may be garbage collected. Pushing a tombstone, akin to an accelerated tombstone, down the tree will allow compactions on these child nodes to remove the obsolete values.

In an example, in a KVS tree, an ingest operation adds a new kvset to the root node and a key-value pair with key K in this new kvset includes a flag or other indicator that it is an update key-value pair that is replacing a key-value pair with key K that was included in an earlier ingest operation. It is an expectation, but not a requirement, that this indicator is accurate. If an update key-value pair with key K is included with an ingest operation, and if the root node has child nodes, then the ingest operation may also write a key tombstone for key K, the update tombstone, to a new kvset in a child node of the root node following the key distribution method used for spill compaction in the KVS tree.

In an example, alternatively, a key compaction or key-value compaction operation on a merge set in the root node may, in response to processing an update key-value pair with key K, also write a key tombstone for key K, again referred to as an update tombstone, to a new kvset in a child node of the root node following the key distribution method used for spill compaction in the KVS tree. In an example, for a given update key-value pair with key K, at most one corresponding update tombstone is written for key K.

While KVS tree prefix operations are discussed below with respect to FIG. 25, the concept may be used in tombstones as well. In prefix operations, a portion of the key, the prefix, is used for matches. Generally, the prefix portion of the key is used in its entirety to create the spill value, although a smaller portion may be used with deeper tree determinations fanning out to all children after the prefix path is consumed. Prefix tombstones use the power of the prefix matching multiple values to have a single entry represent the deletion of many key-value pairs.

In an example, spill compaction uses a key distribution method based on a spill value of the first sub key of the keys, the first sub key being the key prefix. The prefix tombstone is a logical record comprising the key prefix and indicates that all keys starting with the prefix and their associated values, if any, have been logically deleted from the KVS tree at a particular point in time. A prefix tombstone serves the same purpose in a KVS tree as a key tombstone, except that a prefix tombstone may logically delete more than one valid key-value pair whereas a key tombstone may logically delete exactly one valid key-value pair. In this example, because spill compaction generates a spill value for a prefix tombstone using the first sub key value specified by the prefix, every key-value pair, key tombstone, or prefix tombstone having equivalent first sub key values will take the same path through the levels of the KVS tree because they will have equivalent spill value values.

In an example, tombstone acceleration may be applied to prefix tombstones as well as key tombstones. Prefix tombstones may be treated differently than key tombstones in applying tombstone acceleration criteria because prefix tombstones may result in the physical removal of a large number of obsolete key-value pairs or tombstones in subsequent garbage collection operations.

The tombstone acceleration techniques discussed above result in a greater number of kvsets being created and thus may be inefficient. As an application writing data may be aware of the size of previously written data, a tombstone may include a size of the data it is replacing from the application. This information may be used by the system to determine whether or not to perform the tombstone acceleration (or generate update tombstones) discussed above.

Some data may be immutable. Some examples of immutable key-value data include time series data, log data, sensor data, machine-generated data, and the output of database extract, transform, and load (ETL) processes, among others. In an example, a KVS tree may be configured to store immutable key-value data. In such a configuration the expectation, but not requirement, is that kvsets added to the KVS tree by an ingest operation do not contain tombstones.

In an example, a KVS tree may be configured to store an amount of immutable data that is only restricted by the capacity of the storage media containing the KVS tree. In such a configuration of a KVS tree, the only garbage collection operation executed is key compaction. Here, key compaction is performed to increase the efficiency of searching for keys in the KVS tree by reducing the number of kvsets in the root node. Note, without spill compaction, the root node will be the only node in the KVS tree. In an example, the compaction criteria may include the number of kvsets in the root node, or key search time statistics, such as the minimum, maximum, average and mean time to search. These statistics may be reset at certain events such as after a key compaction, after an ingest operation, at the expiration of a configured time interval, or after performing a configured number of key searches. In an example, the merge set for a key compaction may include some or all of the kvsets in the root node.

In an example, the KVS tree may be configured to store an amount of immutable data that is restricted by a retention criterion that may be enforced by removing key-value pairs from the KVS tree in a first-in first-out (FIFO) manner. Examples of such retention criterion include: the maximum count of key-value pairs in the KVS tree; the maximum bytes of key-value data in the KVS tree; or the maximum age of a key-value pair in the KVS tree.

In such a configuration of a KVS tree, the only garbage collection operation executed is key compaction. Here, the key compaction is performed both to increase the efficiency of searching for keys in the KVS tree—by reducing the number of kvsets in the root node—and to facilitate removing key-value pairs from the KVS tree in a FIFO manner to enforce the retention criterion. In an example, the compaction criteria may specify that a key compaction is executed whenever two or more consecutive kvsets in the root node, comprising the merge set for the key compaction, meet a configured fraction of the retention criterion, referred to as the retention increment. The following are some examples of retention requirements:

A) If the retention criterion is W key-value pairs in the KVS tree, and the retention increment is 0.10*W key-value pairs, then key compaction is executed if two or more consecutive kvsets (the merge set) have a combined 0.10*W count of key-value pairs;
B) If the retention criterion is X bytes of key-value data in the KVS tree, and the retention increment is 0.20*X bytes of key-value data, then key compaction is executed if two or more consecutive kvsets (the merge set) have a combined 0.20*X bytes of key-value data; or
C) If the retention criterion is Y days of key-value data in the KVS tree, and the retention increment is 0.15*Y days of key-value data, then key compaction is executed if two or more consecutive kvsets (the merge set) have a combined 0.15*Y days of key-value data.

There may be cases where it is impractical to require that the merge set for a key compaction precisely meet the configured retention increment. Thus, in an example, an approximation of the retention increment may be used.

Given a KVS tree and a sequence of ingest operations of kvsets that are each below the configured retention increment, executing key compaction operations as described above results in kvsets in the root node that each meet or approximate the retention increment. An exception to this result may be the newest kvsets, which combined may be below the retention increment. In spite of this possible outcome, whenever the KVS tree exceeds the retention criterion by at least the retention increment, the oldest kvset in the KVS tree may be deleted. For example, if the retention criterion is W key-value pairs in a KVS tree, and the configured retention increment is 0.10*W key-value pairs, then the kvsets in the root node of the KVS tree will each have approximately 0.10*W key-value pairs, with the possible exception of the newest kvsets which combined may have fewer than 0.10*W key-value pairs. As a result, whenever the KVS tree exceeds W key-value pairs by at least 0.10*W key-value pairs, the oldest kvset in the KVS tree may be deleted.

The garbage collection facilitators of tombstone acceleration, update acceleration, or prefix tombstones, may be applied to other key-value stores than KVS trees. For example, tombstone acceleration or update tombstones may be applied in an LSM Tree variant with one or more garbage collection operations that write key-value data to the same tree-level from which it is read and operate similarly to key compaction or key-value compaction in a KVS tree. Update tombstones may also be applied to an LSM Tree variant for which it is permitted to ingest tombstones into the child nodes of the root node. In another example, prefix tombstones may be used in an LSM Tree variant that either has only one node per level (which is common), or that implements a key distribution method for selecting child nodes based on a portion of a key, such as a sub key. In another example, tombstone delete size may be applied in an LSM Tree variant using tombstone acceleration. Further, the techniques for optimizing garbage collection for immutable key-value data may be applied to an LSM Tree variant with a garbage collection operation that does not read or write values in key-value data, similar to key compaction in a KVS tree.

Implementing these garbage collection facilitators improves the efficiency of garbage collection in a KVS tree, or data structures. For example, tombstone acceleration results in tombstones being written to lower levels of the tree sooner than would occur otherwise when applying key compaction, key-value compaction, or a similar operation, thereby making it possible to eliminate garbage more quickly at all levels of the tree. Tombstone acceleration used in conjunction with key compaction, or a similar operation, achieves these results with far less write-amplification than would result from spill compaction. In other examples, prefix tombstones allow a single tombstone record to logically delete large numbers of related key-value pairs, update tombstones bring the benefits of tombstone acceleration to update key-value pairs, tombstone delete size improves accuracy when evaluating tombstone acceleration criteria, and techniques for optimizing garbage collection for immutable key-value data result in a write-amplification of one (1) for the values in key-value data.

Figure 20:
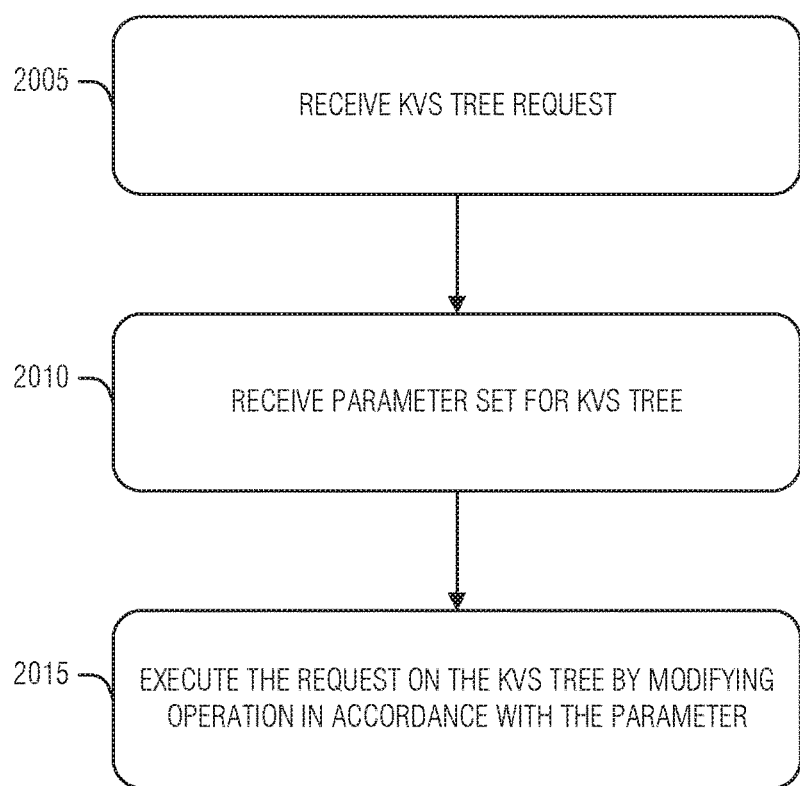
FIG. 20 illustrates an example of a method for modifying KVS tree operation, according to an embodiment.

FIG. 20 illustrates an example of a method 2000 for modifying KVS tree operation, according to an embodiment. The operations of the method 2000 are implemented with electronic hardware, such as that described throughout at this application, including below with respect to FIG. 26 (e.g., circuits). The method 2000 covers operations to implement a number of the features discussed above regarding tombstone acceleration, update acceleration (e.g., update tombstones), prefix tombstones, and immutable key-value data in KVS trees.

At operation 2005, a request for a KVS tree is received. In an example, the request includes a key prefix and a tombstone, the parameter set has a member in the request that defines the tombstone as a prefix-tombstone, and executing the request on the KVS tree includes writing the prefix-tombstone to a kvset of the KVS tree. In an example, a prefix-tombstone matches any key with the same prefix as the key prefix of the prefix-tombstone on a KVS tree operation comparing keys.

In an example, the request includes a key, the parameter set includes a member that specifies tombstone acceleration, and executing the request on the KVS tree includes writing a tombstone in at least one child node specified by performing a spill function on the key. The spill function is a function that takes a key (or part of a key) as input and produces a spill value, as mentioned above with respect to FIG. 13. In an example, the tombstone is written to all extant child nodes specified by performing the spill function on the key. In an example, the request includes a tombstone. In an example, the request includes a value.

At operation 2010, a parameter set for the KVS tree is received.

At operation 2015, the request is executed on the KVS tree by modifying operation of the KVS tree in accordance with the parameter.

In an example, the request includes a key, a tombstone, and a storage size of a value in the KVS tree corresponding to the key. Here, the parameter set has a member that specifies garbage collection statistics storage and executing the request on the KVS tree includes storing the key and the storage size in a data structure for the KVS tree. In an example, the tombstone is a prefix-tombstone.

In an example, the parameter set includes a member that specifies that the KVS tree is immutable, and executing the request on the KVS tree includes writing the request to a root node of the KVS tree. Here, the root node is the only node in the KVS tree when the KVS tree is immutable.

In an example, the KVS tree uses key compaction exclusively when the KVS tree is immutable. In an example, the method 2000 may be extended to store key search statistics in response to the KVS tree being immutable. In an example, the key search statistics are at least one of a minimum, maximum, average, or mean time to search. In an example, the key search statistics are a number of kvsets in the root node.

In an example, when the KVS tree is immutable, the method 2000 may be extended to perform key compaction in response to the key search statistics meeting a threshold. In an example, the key compaction may include resetting the key search statistics in response to at least one of a compaction, an ingest, after a specified number of searches, or after a specified time interval.

In an example, wherein a second member of the parameter set specifies that the KVS tree removes elements on a first-in-first-out basis, a third member of the parameter set specifies a retention constraint of the KVS tree, the KVS tree performs key compactions on kvsets based on the retention constraint, and the KVS tree removes an oldest kvset when the retention constraint is violated. In an example, the retention constraint is a maximum number of key-value pairs. In an example, the retention constraint is a maximum age of a key-value pair. In an example, the retention constraint is a maximum storage value consumed by key-value pairs.

In an example, performing key compactions on kvsets based on the retention constraint includes grouping contiguous kvsets to produce a set of groups—a summed metric from each member in the set of groups approximating a fraction of the retention constraint—and performing key compaction on each member of the set of groups.

Figure 21:
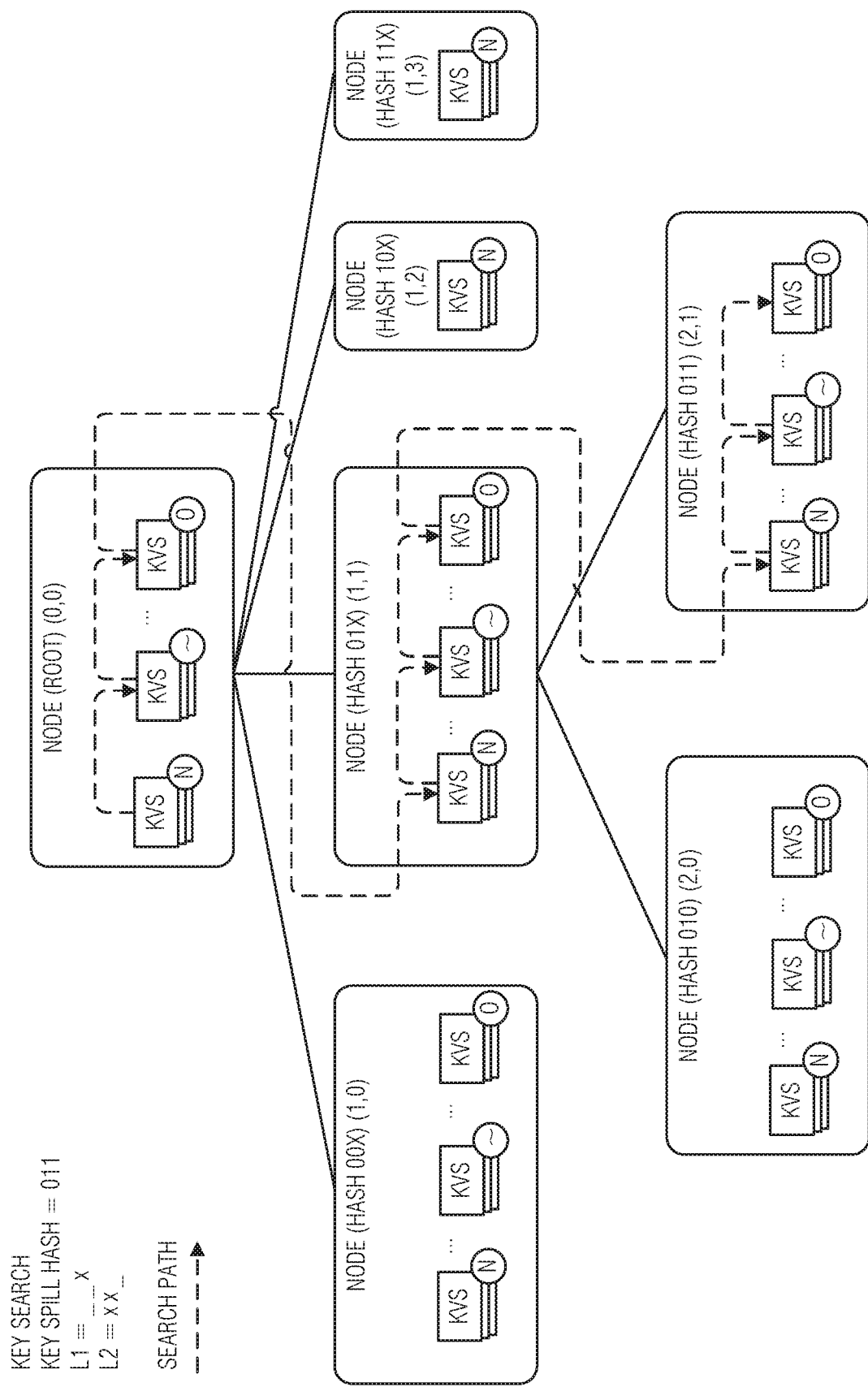
FIG. 21 is a block diagram illustrating a key search, according to an embodiment.

FIG. 21 is a block diagram illustrating a key search, according to an embodiment. The search progresses by starting at the newest kvset in the root node and progressively moving to older kvsets until the key is found or the oldest kvset in the leaf node does not have the key. Due to the determinative nature of parent-to-child key mappings, there will be only one leaf searched, and the oldest kvset in that leaf will have the oldest key entries. Thus, if the illustrated search path is followed and the key is not found, then the key is not in the KVS tree.

The search stops as soon as the newest key entry for the key is found. Thus, the search path moves from newest to oldest and stops as soon as a key entry for the key is located. This behavior allows the immutability of the kvsets to remain by not requiring an obsolete key-value pair to be immediately removed from the KVS tree. Instead, the newer value, or a tombstone to indicate deletion, is placed in a newer kvset and will be found first, resulting in an accurate response to the query without regard to the older key-pair version still resident in the KVS tree.

In an example, the search for key K may be performed by setting a current node to the root node. If either a key-value pair or a tombstone with key K is found in the current node then the search is complete and either the associated value or an indication of "key not found", respectively, is returned as the result. If the key K is not found, the current node is set to the child of the node as determined by the key K and the key distribution method used for spill compaction.

If no such child node exists then the search is complete and an indication of "key not found" is the result. Otherwise, the search for the key K in the current node's kvsets is performed and the process repeats. Conceptually, a search for a key K in a KVS tree follows the same path through the KVS tree that every key-value pair or tombstone with key K takes as the result of spill compaction.

Due to the determinative mapping between parents and children based on the keys, only one node per level in the KVS tree is searched until either a key-value pair or a tombstone with key K is found, or a node in the last (e.g., largest numbered) level in the KVS tree is searched. Thus, the search is highly efficient.

Figure 22:
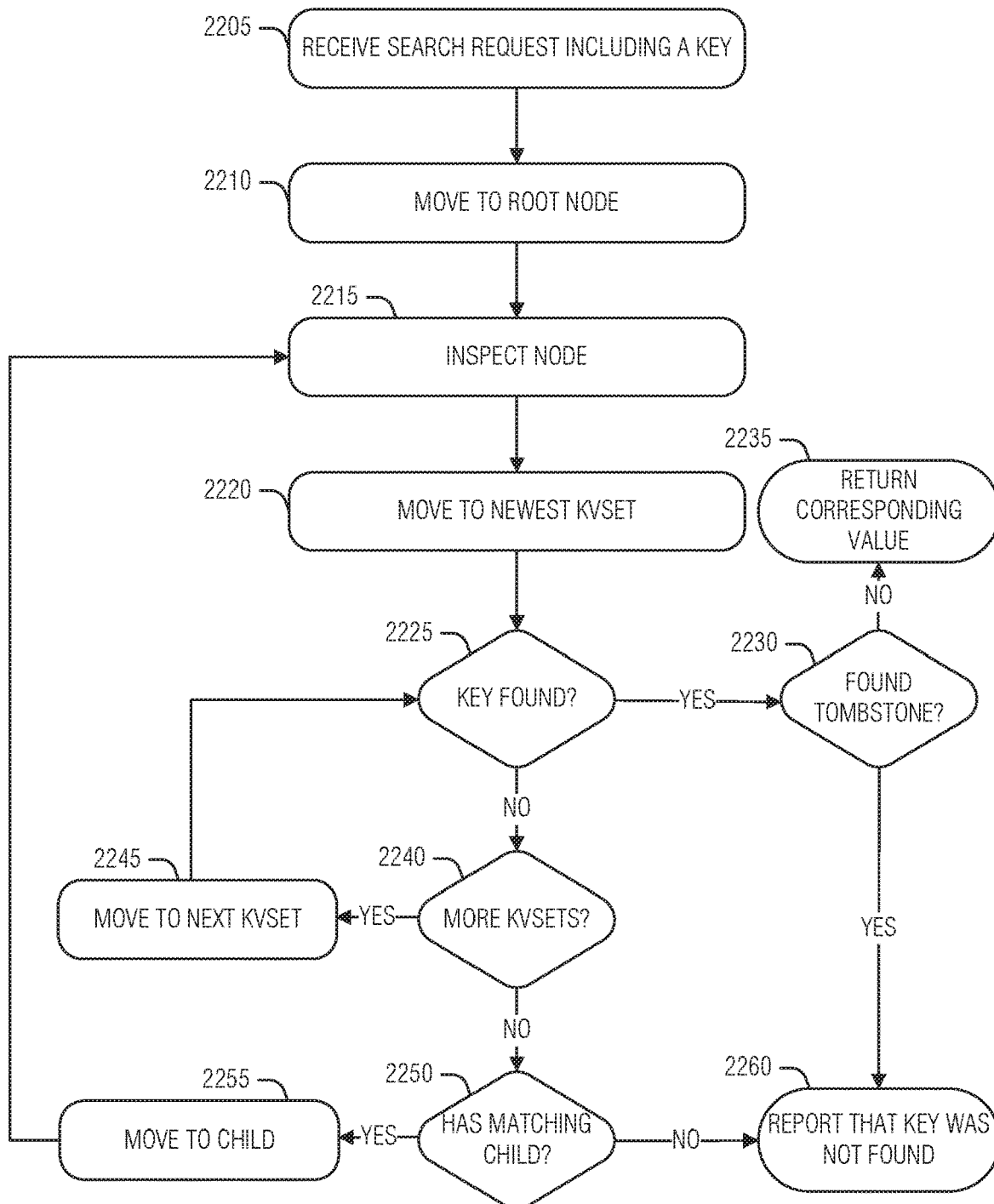
FIG. 22 illustrates an example of a method for performing a key search, according to an embodiment.

FIG. 22 illustrates an example of a method 2200 for performing a key search, according to an embodiment. The operations of the method 2200 are implemented with electronic hardware, such as that described throughout at this application, including below with respect to FIG. 26 (e.g., circuits).

At operation 2205, a search request including a key is received.

At operation 2210, the root node is selected as the current node.

At operation 2215, the current node is inspected.

At operation 2220, the inspection starts with a query to the newest kvset of the current node.

At decision 2225, if the key is not found, the method 2200 proceeds to decision 2240 and otherwise proceeds to decision 2230 if the key is found.

At decision 2230, if the key entry corresponding to the key includes, or references, a tombstone, the method 2200 proceeds to result 2260 and otherwise proceeds to result 2235.

At result 2235, a value corresponding to a newest key entry for the key is returned in answer to the search request.

At decision 2240, if there are more kvsets in the current node, the method 2200 proceeds to operation 2245 and otherwise proceeds to decision 2250.

At operation 2245, the method 2200 selects the next newest kvset in the current node to query for the key and proceeds to decision 2225.

At decision 2250, if the current node does not have any child nodes that match the spill function for the key, the method 2200 proceeds to the result 2260 and otherwise proceeds to the operation 2255 otherwise.

At operation 2255, the child node matching the spill function for the key is set as the current node and the method 2200 proceeds to operation 2215.

At result 2260, a negative indication of the search, such as "key not found," is returned in answer to the search request.

Scan operations differ from a search in the multiple keys are being sought. A typical scan operation may include search for a range of keys in which the search specifics multiple keys to bound the range. In general, the scan specifies a criterion and expects a result of all keys in the kvs tree that meet the criterion.

Figure 23:
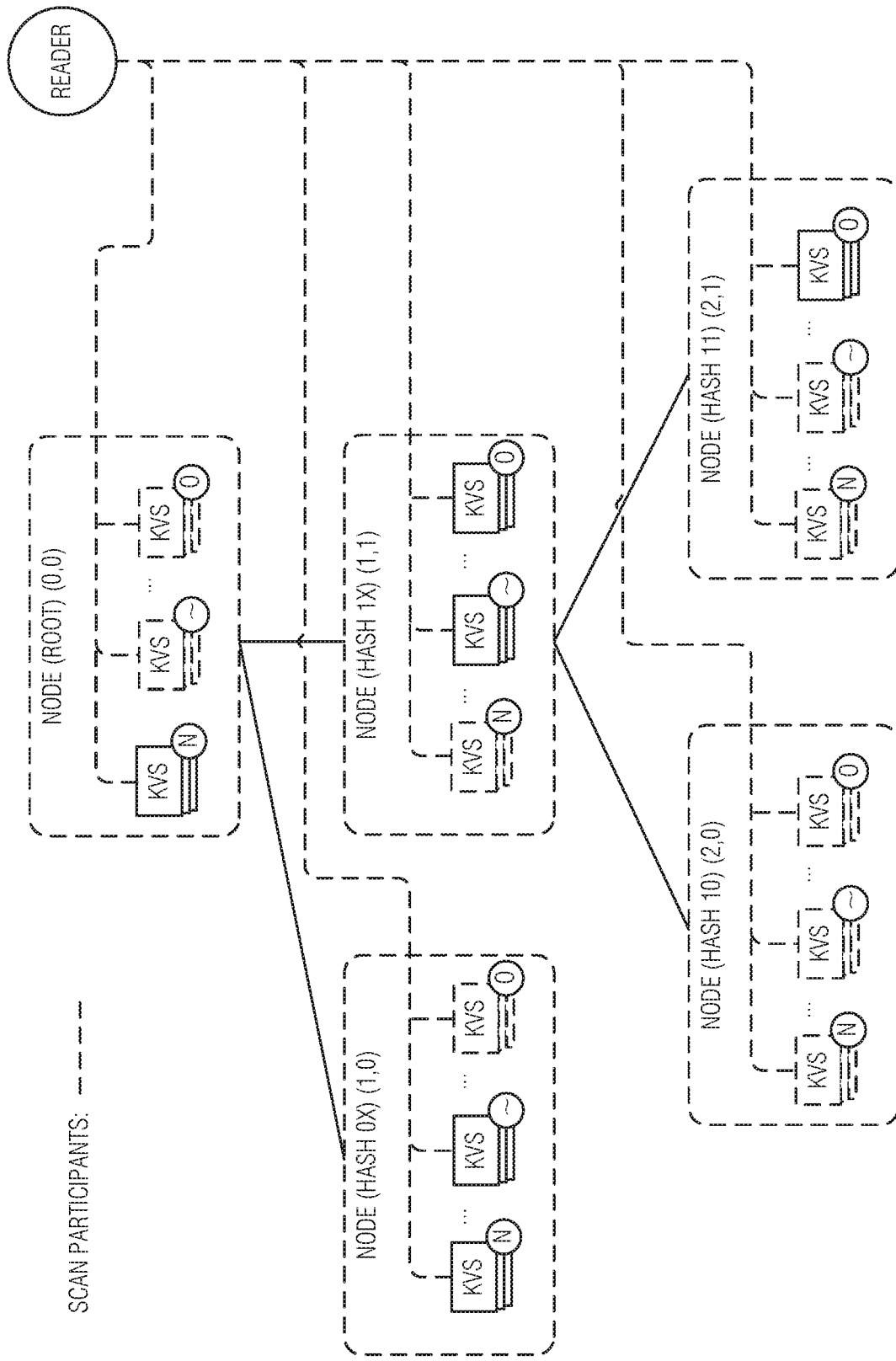
FIG. 23 is a block diagram illustrating a key scan, according to an embodiment.

FIG. 23 is a block diagram illustrating a key scan, according to an embodiment. The key scan, or pure scan, identifies every kvset in every node of the KVS tree containing a key entry that meets the scan criterion (e.g., falls within a specified range). While the keystore of kvsets permits an efficient search for a particular key, to ensure that every key meeting the scan criterion is found, results in searching every kvset. However, due the key-sorted nature of key-value storage in kvsets, the scan may quickly determine, without looking at every key. This is still better than the capabilities offered by the WB tree, for example, as the key-value pairs are not stored in a key-sorted structure, but rather keys are kept to resolve key-hash collisions. Thus, every key in a WB tree must be read to satisfy a scan.

In a KVS tree, to facilitate the scan, the keys are stored in kvsets in key-sorted order. Thus, a given key may be located in log time and keys within the range (e.g., a highest and lowest key in the range) may also be determined quickly. Further, the example kvset meta data, discussed above with respect to FIGS. 1-5 may be used to speed scanning even further. For example, if the kvset maintains a minimum and maximum key value contained within the kvset, the scan may quickly determine that no keys in the kvset meet a specified range. Similarly, maintaining a bloom filter of kvset keys may be used to quickly determine that certain keys are not in a given kvset's key store.

In an example (not illustrated), aside from the above, the scan may proceeds much like a search with the exception that every node is visited. Thus, the scan reads from the kvsets the newest record for every key that meets the criterion, where the newest record for a given key K may be either a key-value pair or key tombstone. As noted above, within a given node in the KVS tree, the kvsets are ordered from newest to oldest, and that the kvsets in a node at a level (L+1) are older than the kvsets in a node at a level L. After the keys meeting the criterion are found, they are returned in a result set to the requester.

The search-like scan described directly above may be improved when one realizes that visitation of every kvset in every node occurs in a scan. Thus, in an example, the kvsets may be read simulataneously. The simultaneous reading of all kvsets may result in a very large buffer (e.g., storage location for returned results). This, however, may be mitigated by ability to quickly determine whether a given kvset has keys that meet the scan criterion (e.g., within a range). Thus, every kvset may be visited, but only those kvsets with keys that meet the criterion are read. This example is illustrated in FIG. 23. Specifically, the reader simultaneously visits all of the kvsest (e.g., the dashed lines and dashed kvsets) and yet reads only a subset of the kvsets (dashed kvsets). This technique supports iterator style semantics where a program may ask for a next or previous key. The sorted nature of the keys in the kvsets permits a rabid identification of a next key, and if there are collisions on a key (e.g., multiple entries for the same key), which value is the newest to return to the program—unless the newest value is a tombstone in which case the iterator should skip that key and offer the newest value for the next key.

In an example, the scan may include receiving a scan request including a key range (or other criterion).

The scan proceeds by collecting keys specified by the range from each kvset of a node set from the tree into a found set. In an example, the node set includes every node in the tree.

The scan proceeds by reducing the found set to a result set by keeping key-value pairs that correspond to a most recent entry for a key that is not a tombstone.

The scan completes by returning the result set.

Figure 24:
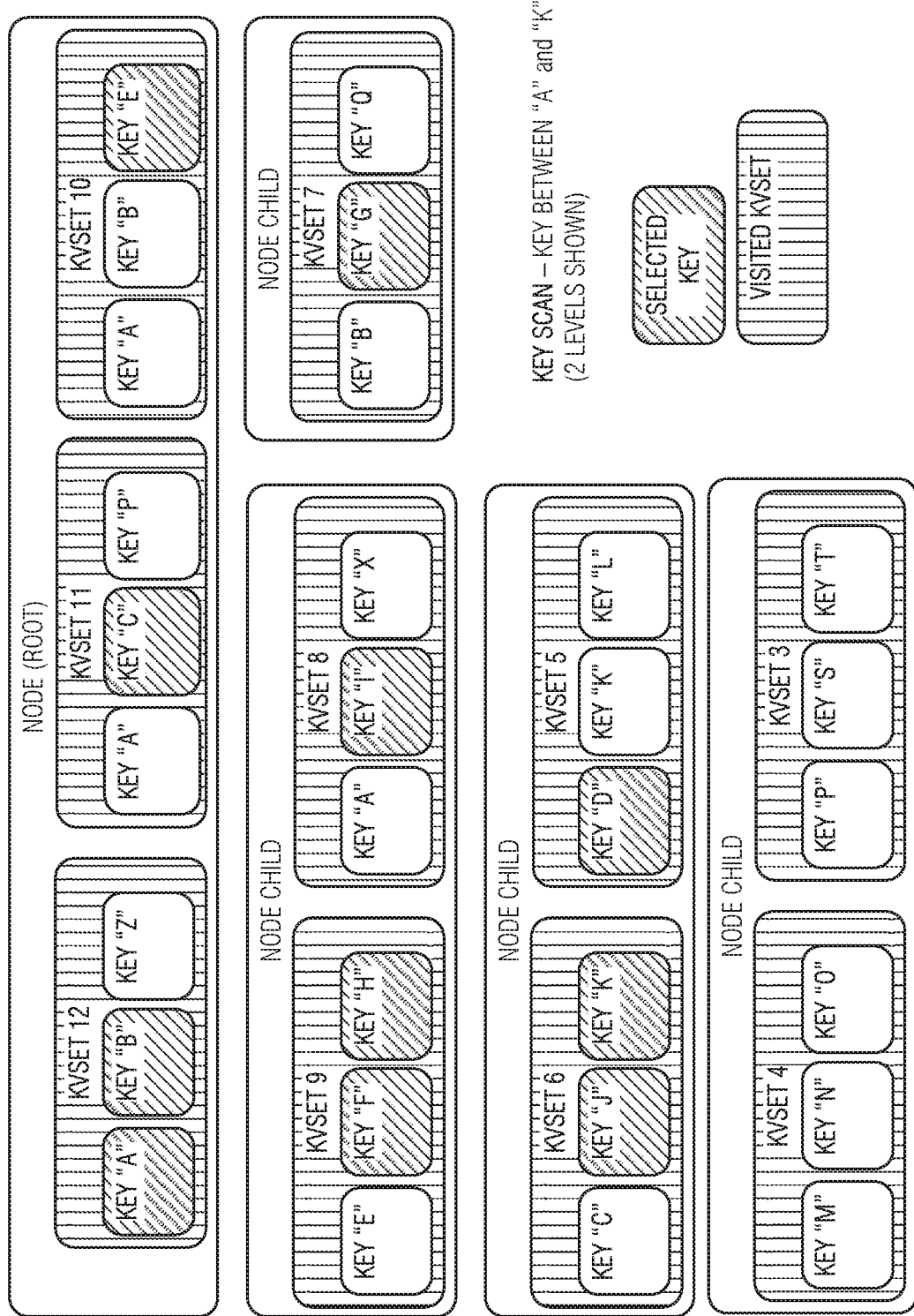
FIG. 24 is a block diagram illustrating a key scan, according to an embodiment.

FIG. 24 is a block diagram illustrating a key scan, according to an embodiment. FIG. 24 offers a different perspective to FIG. 23. The criterion for the scan are keys between A and K inclusive. The scan starts with the newest kvset of the root node, which is the newest kvset in the KVS tree, kvset 12. In an example, key metrics of kvset 12 allow a quick determination that at least some keys meet the criterion. Specifically, in this example, they are keys A and B. The scan proceeds from newest to oldest kvset in each node from top (root) to bottom (leaf) of the KVS tree. Note that the keys A, B, C, E, and K appear in multiple kvsets across the nodes. The scan will only retain the newest of each (e.g., the selected key). Thus, the result set will include the values for these keys found in kvset 12 for keys A and B, kvset 11 for key C, kvset 10 for key E, and kvset 6 for key K. If, however, the key entries in these kvsets for any of these keys include or reference a tombstone, then that key will be omitted from the result set. The uniqueness of key D in kvset 5 entails its value's inclusion in the result set assuming key D does not refer to a tombstone.

Figure 25:
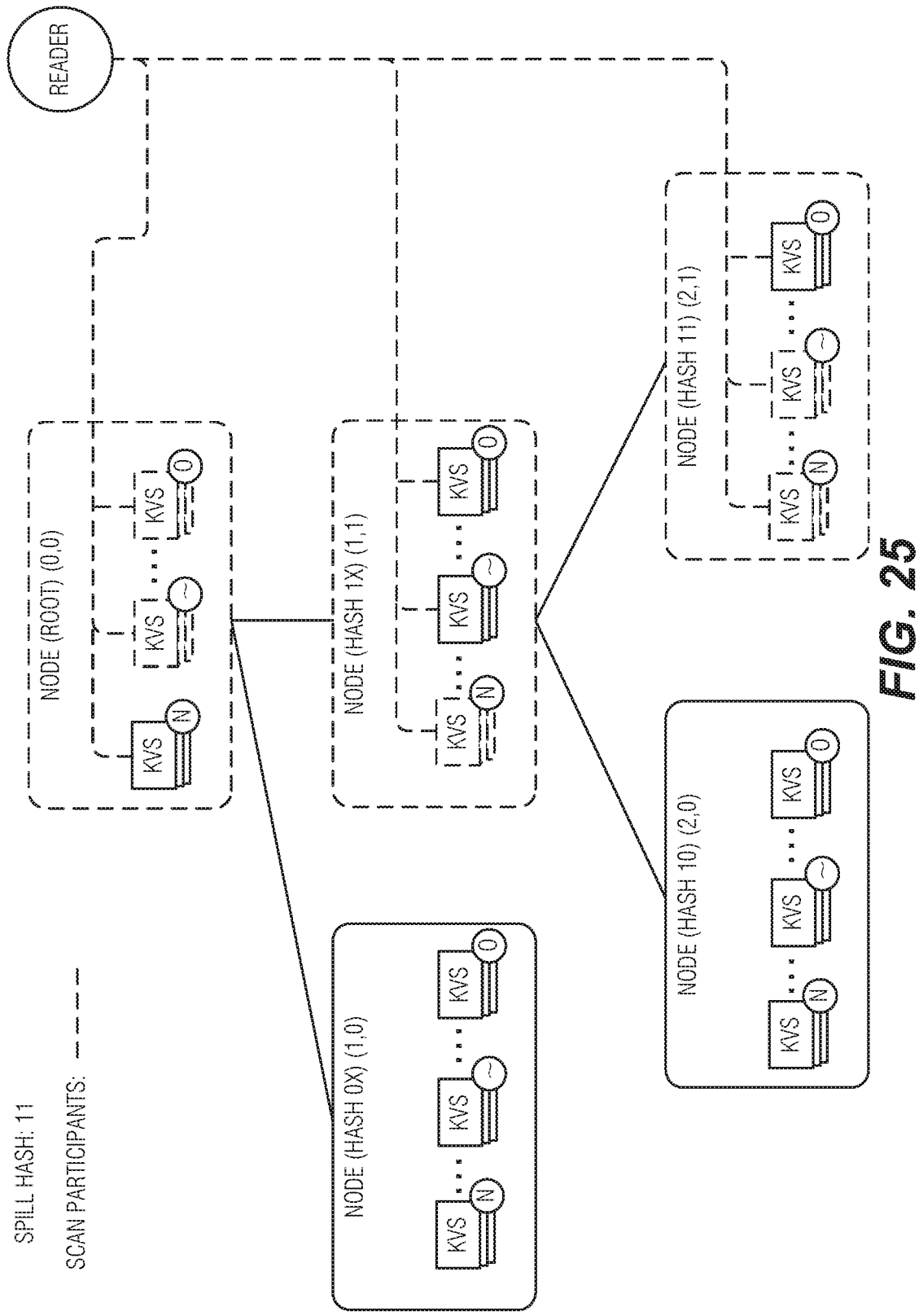
FIG. 25 is a block diagram illustrating a prefix scan, according to an embodiment.

FIG. 25 is a block diagram illustrating a prefix scan, according to an embodiment. A prefix scan locates all key-value pairs (if any) in a KVS tree where the keys all start with a specified prefix. Although the prefix is less than an entire key, and may thus match multiple keys, the prefix portion of the key is at least as large as the portion of the key used by the spill function to create the spill value. Thus, if the spill function uses the first subkey of the key, the prefix includes the first subkey (and may include additional subkeys). This requirement allows the determinative mapping to improve prefix scan performance over pure scan performance because only those nodes in the path of the prefix are visited.

In an example, the spill value is based on the first subkey of the keys. In this example, a specified prefix includes a value for the first subkey of the keys. In this example, the prefix scan may proceed by identifying every kvset in every node of the KVS tree containing a key-value pair or tombstone with a key starting with the specified prefix. In contrast to the pure scan, the prefix scan does not visit every node of the KVS tree. Rather, the inspected nodes may be confined to those along the path determined by the spill value of the first subkey value which defines the prefix. In an example, instead of a using the first subkey, a last subkey may be used for the spill value to effect a suffix scan. In this example, a specified suffix includes a value for the last subkey of the keys. Additional varieties of scan may be implemented based on the specific subkey used in the spill value calculation.

Again, similar to the pure scan, there are multiple ways to retrieve the keys, or key-value pairs, to implement the scan. In an example, as illustrated, the nodes along the spill value path given by the prefix (nodes with dashed edges) are visited (dashed lines) simultaneously, the kvsets within those nodes are tested for keys that meet the scan criterion, and kvsets that pass the test (kvsets with dashed edges) are read.

A prefix scan is extremely efficient both because the number of nodes that are examined is limited to one per level of the KVS tree, and because keys in the kvset key stores are generally stored in a structure that allows ready identification of keys that match the prefix. Additionally, the kvset metrics discussed above with respect to the key scan may also aid in speeding the search.

The prefix scan may include receiving a scan request with a key prefix. Here a node-set to be searched includes each node that corresponds to the key prefix. In an example, node correspondence to the key prefix is determined by a portion of a spill value derived from the key prefix, the portion of the spill value determined by a tree-level of a given node.

The prefix scan proceeds by collecting keys specified by the prefix from each kvset of the node set from the tree into a found set.

The prefix scan proceeds by reducing the found set to a result set by keeping key-value pairs that correspond to a most recent entry for a key that is not a tombstone and that is not deleted by a more recent tombstone.

The prefix scan completes by returning the result set.

As described above, KVS trees provide a strong structure to store key-value data on-disk, KVS trees include many of the advantages of LSM trees and WB trees without the drawbacks of these structures. For example, in regard to storage space or write-amplification due to compaction, in a KVS tree, the size of the nodes may be easily controlled to limit the maximum amount of temporary storage capacity used for compaction. Further, key compaction may be used to increase search efficiency in a node without reading and writing value-blocks, thereby reducing read-amplification and write-amplification due to compaction. In a traditional LSM Tree, the amount of temporary storage capacity required for compaction, as well as the amount of read-amplification and write-amplification, may be proportional to the amount of key-value capacity at the tree-level being compacted—which is exacerbated by the fact that the key-value capacity of tree-levels in an LSM Tree is typically configured to grow exponentially at each tree-level deeper in the tree.

With regard to key search efficiency, in a KVS tree, searching for a key K involves searching only one node per tree-level, which represents only a small fraction of the total keys in the KVS tree. In a traditional LSM Tree, searching for a key K requires searching all keys in each level.

With regard to prefix-scan efficiency, as noted above, an example of KVS trees permits finding all keys that start with a specified prefix by searching only one node per tree-level, which represents only a small fraction of the total keys in the KVS tree. In a traditional LSM Tree, finding all keys that start with a specified prefix requires searching all keys in each level.

With regard to scan efficiency, an example of a KVS tree described above permits finding all keys in a given range, or that start with a specified prefix, by leveraging the data in kvsets. In a WB Tree the keys are unordered, resulting in no efficient way to implement either of these operations. Thus, in a WB tree, every entry of the tree must be retrieved and inspected to perform these scans.

With regard to compaction performance, in a KVS tree the key, key-value, and spill compaction maintenance techniques—with the exception of hoist compaction—are non-blocking because of the temporally sorted nature of kvsets in nodes. Thus, new kvsets may be added to nodes upon which key, key-value, or spill compaction is being performed by simply placing the new kvset in a newest position. In a WB Tree, compaction is a blocking operation.

Figure 26:
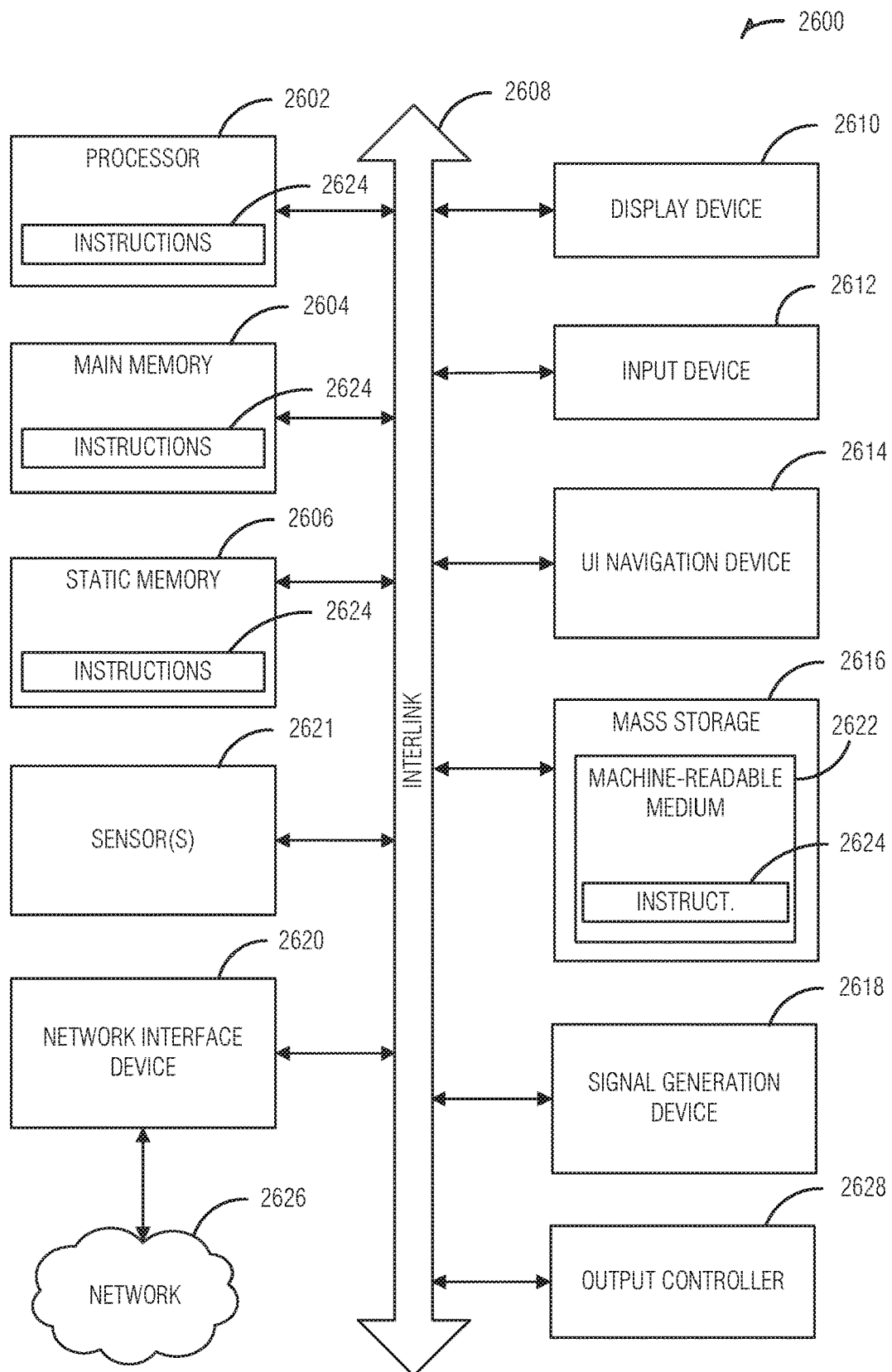
FIG. 26 is a block diagram illustrating an example of a machine upon which one or more embodiments may be implemented.

FIG. 26 illustrates a block diagram of an example machine 2600 upon which any one or more of the techniques (e.g., methodologies) discussed herein may perform. In alternative embodiments, the machine 2600 may operate as a standalone device or may be connected (e.g., networked) to other machines. In a networked deployment, the machine 2600 may operate in the capacity of a server machine, a client machine, or both in server-client network environments. In an example, the machine 2600 may act as a peer machine in peer-to-peer (P2P) (or other distributed) network environment. The machine 2600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time. Circuitries include members that may, alone or in combination, perform specified operations when operating.

In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 2600 may include a hardware processor 2602 (e.g., a central processing unit (CPU), a graphics processing unit (GPU), a hardware processor core, or any combination thereof), a main memory 2604 and a static memory 2606, some or all of which may communicate with each other via an interlink (e.g., bus) 2608. The machine 2600 may further include a display unit 2610, an alphanumeric input device 2612 (e.g., a keyboard), and a user interface (UI) navigation device 2614 (e.g., a mouse). In an example, the display unit 2610, input device 2612 and UI navigation device 2614 may be a touch screen display. The machine 2600 may additionally include a storage device (e.g., drive unit) 2616, a signal generation device 2618 (e.g., a speaker), a network interface device 2620, and one or more sensors 2621, such as a global positioning system (GPS) sensor, compass, accelerometer, or other sensor. The machine 2600 may include an output controller 2628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2616 may include a machine readable medium 2622 on which is stored one or more sets of data structures or instructions 2624 (e.g., software) embodying or utilized by any one or more of the techniques or functions described herein. The instructions 2624 may also reside, completely or at least partially, within the main memory 2604, within static memory 2606, or within the hardware processor 2602 during execution thereof by the machine 2600. In an example, one or any combination of the hardware processor 2602, the main memory 2604, the static memory 2606, or the storage device 2616 may constitute machine readable media.

While the machine readable medium 2622 is illustrated as a single medium, the term "machine readable medium" may include a single medium or multiple media (e.g., a centralized or distributed database, and/or associated caches and servers) configured to store the one or more instructions 2624.

The term "machine readable medium" may include any medium that is capable of storing, encoding, or carrying instructions for execution by the machine 2600 and that cause the machine 2600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2624 may further be transmitted or received over a communications network 2626 using a transmission medium via the network interface device 2620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2620 may include one or more physical jacks (e.g., Ethernet, coaxial, or phone jacks) or one or more antennas to connect to the communications network 2626. In an example, the network interface device 2620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2600, and includes digital or analog communications signals or other intangible medium to facilitate communication of such software.

ADDITIONAL NOTES & EXAMPLES

Example 1 is a system comprising processing circuitry configured to: receive notification of a KVS tree write request for a multi-stream storage device, the notification including a KVS tree scope corresponding to data in the write request; assign a stream identifier (ID) to the write request based on the KVS tree scope and a stability value of the write request; and return the stream ID to govern stream assignment to the write request, the stream assignment modifying a write operation of the multi-stream storage device.

In Example 2, the subject matter of Example 1, wherein the KVS tree scope includes at least one of: a kvset ID corresponding to a kvset of the data; a node ID corresponding to a node of the KVS tree corresponding to the data; a level ID corresponding to a tree-level corresponding to the data; a tree ID for the KVS tree; a forest ID corresponding to a forest to which the KVS tree belongs; or a type corresponding to the data.

In Example 3, the subject matter of Example 2, wherein the type either a key-block type or a value-block type.

In Example 4, the subject matter of any one or more of Examples 1-3, wherein the notification includes a device ID for the multi-stream device.

In Example 5, the subject matter of Example 4, wherein the notification includes a WLAST flag corresponding to a last write request in a sequence of write requests to write a kvset, identified by the kvset ID, to the multi-stream storage device.

In Example 6, the subject matter of any one or more of Examples 1-5, wherein the processing circuitry is configured to assign the stability value based on the KVS tree scope.

In Example 7, the subject matter of Example 6, wherein the stability value is one of a predefined set of stability values.

In Example 8, the subject matter of Example 7, wherein the predefined set of stability values includes HOT, WARM, and COLD, wherein HOT indicates a lowest expected lifetime of the data on the multi-stream storage device and COLD indicates a highest expected lifetime of the data on the multi-stream storage device.

In Example 9, the subject matter of any one or more of Examples 6-8, wherein, to assign the stability value, the processing circuitry is configured to locate the stability value from a data structure using a portion of the KVS tree scope.

In Example 10, the subject matter of Example 9, wherein the portion of the KVS tree scope includes a tree ID for the data.

In Example 11, the subject matter of Example 10, wherein the portion of the KVS tree scope includes a level ID for the data.

In Example 12, the subject matter of Example 11, wherein the portion of the KVS tree scope includes a node ID for the data.

In Example 13, the subject matter of any one or more of Examples 9-12, wherein the portion of the KVS tree scope includes a level ID for the data.

In Example 14, the subject matter of any one or more of Examples 9-13, wherein the portion of the KVS tree scope includes a type for the data.

In Example 15, the subject matter of any one or more of Examples 6-14, wherein, to assign the stability value, the processing circuitry is configured to: maintain a set of frequencies of stability value assignments for level IDs, each member of the set of frequencies corresponding to a unique level ID; retrieve a frequency from the set of frequencies that corresponds to a level ID in the KVS tree scope; and select a stability value from a mapping of stability values to frequency ranges based on the frequency.

In Example 16, the subject matter of any one or more of Examples 1-15, wherein, to assign the stream ID to the write request based on the KVS tree scope and the stability value of the write request, the processing circuitry is configured to: create a stream-scope value from the KVS tree scope; perform a lookup in a selected-stream data structure using the stream-scope value; and return a stream ID corresponding to the stream-scope from the selected-stream data structure.

In Example 17, the subject matter of Example 16, wherein, to perform the lookup in the selected-stream data structure, the processing circuitry is configured to: fail to find the stream-scope value in the selected-stream data structure; perform a lookup on an available-stream data structure using the stability value; receive a result of the lookup that includes a stream ID; and add an entry to the selected-stream data structure that includes the stream ID, the stream-scope value, and a timestamp of a time when the entry is added.

In Example 18, the subject matter of Example 17, wherein multiple entries of the available-stream data structure correspond to the stability value, and wherein the result of the lookup is at least one of a round-robin or random selection of an entry from the multiple entries.

In Example 19, the subject matter of any one or more of Examples 17-18, wherein the processing circuitry is further configured to initialize the available-stream data structure, including the processing circuitry configured to: obtain a number of streams available from the multi-stream storage device; obtain a stream ID for all streams available from the multi-stream storage device, each stream ID being unique; add stream IDs to stability value groups; and create a record in the available-stream data structure for each stream ID, the record including the stream ID, a device ID for the multi-stream storage device, and a stability value corresponding to a stability value group of the stream ID.

In Example 20, the subject matter of any one or more of Examples 16-19, wherein the stream-scope value includes a tree ID for the data.

In Example 21, the subject matter of Example 20, wherein the stream-scope value includes a level ID for the data.

In Example 22, the subject matter of Example 21, wherein the stream-scope value includes a node ID for the data.

In Example 23, the subject matter of any one or more of Examples 20-22, wherein the stream-scope value includes a kvset ID for the data.

In Example 24, the subject matter of any one or more of Examples 16-23, wherein the stream-scope value includes a level ID for the data.

In Example 25, the subject matter of any one or more of Examples 16-24, wherein, to perform the lookup in the selected-stream data structure, the processing circuitry is configured to: fail to find the stream-scope value in the selected-stream data structure; locate a stream ID from either the selected-stream data structure or an available-stream data structure based on the contents of the selected stream data structure; and create an entry to the selected-stream data structure that includes the stream ID, the stream-scope value, and a timestamp of a time when the entry is added.

In Example 26, the subject matter of Example 25, wherein, to locate the stream ID from either the selected-stream data structure or an available-stream data structure based on the contents of the selected stream data structure, the processing circuitry is configured to: compare a first number of entries from the selected-stream data structure to a second number of entries from the available-stream data structure to determine that the first number of entries and the second number of entries are equal; locate a group of entries from the selected-stream data structure that correspond to the stability value; and return a stream ID of an entry in the group of entries that has the oldest timestamp.

In Example 27, the subject matter of any one or more of Examples 25-26, wherein, to locate the stream ID from either the selected-stream data structure or an available-stream data structure based on the contents of the selected stream data structure, the processing circuitry is configured to: compare a first number of entries from the selected-stream data structure to a second number of entries from the available-stream data structure to determine that the first number of entries and the second number of entries are not equal; perform a lookup on the available-stream data structure using the stability value and stream IDs in entries of the selected-stream data structure; receive a result of the lookup that includes a stream ID that is not in the entries of the selected-stream data structure; and add an entry to the selected-stream data structure that includes the stream ID, the stream-scope value, and a timestamp of a time when the entry is added.

In Example 28, the subject matter of any one or more of Examples 16-27, wherein, to return the stream ID corresponding to the stream-scope from the selected-stream data structure, the processing circuitry is configured to update a timestamp for an entry in the selected-stream data structure corresponding to the stream ID.

In Example 29, the subject matter of any one or more of Examples 16-28, wherein the write request includes a WLAST flag, and wherein, to return the stream ID corresponding to the stream-scope from the selected-stream data structure, the processing circuitry is configured to remove an entry from the selected-stream data structure corresponding to the stream ID.

In Example 30, the subject matter of any one or more of Examples 16-29, wherein the processing circuitry is further configured to remove entries from the selected-stream data structure with a timestamp beyond a threshold.

Example 31 is at least one machine readable medium including instructions that, when executed by a machine, cause the machine to perform operations comprising: receiving notification of a KVS tree write request for a multi-stream storage device, the notification including a KVS tree scope corresponding to data in the write request; assigning a stream identifier (ID) to the write request based on the KVS tree scope and a stability value of the write request; and returning the stream ID to govern stream assignment to the write request, the stream assignment modifying a write operation of the multi-stream storage device.

In Example 32, the subject matter of Example 31, wherein the KVS tree scope includes at least one of: a kvset ID corresponding to a kvset of the data; a node ID corresponding to a node of the KVS tree corresponding to the data; a level ID corresponding to a tree-level corresponding to the data; a tree ID for the KVS tree; a forest ID corresponding to a forest to which the KVS tree belongs; or a type corresponding to the data.

In Example 33, the subject matter of Example 32, wherein the type either a key-block type or a value-block type.

In Example 34, the subject matter of any one or more of Examples 31-33, wherein the notification includes a device ID for the multi-stream device.

In Example 35, the subject matter of Example 34, wherein the notification includes a WLAST flag corresponding to a last write request in a sequence of write requests to write a kvset, identified by the kvset ID, to the multi-stream storage device.

In Example 36, the subject matter of any one or more of Examples 31-35, wherein the operations comprise assigning the stability value based on the KVS tree scope.

In Example 37, the subject matter of Example 36, wherein the stability value is one of a predefined set of stability values.

In Example 38, the subject matter of Example 37, wherein the predefined set of stability values includes HOT, WARM, and COLD, wherein HOT indicates a lowest expected lifetime of the data on the multi-stream storage device and COLD indicates a highest expected lifetime of the data on the multi-stream storage device.

In Example 39, the subject matter of any one or more of Examples 36-38, wherein assigning the stability value includes locating the stability value from a data structure using a portion of the KVS tree scope.

In Example 40, the subject matter of Example 39, wherein the portion of the KVS tree scope includes a tree ID for the data.

In Example 41, the subject matter of Example 40, wherein the portion of the KVS tree scope includes a level ID for the data.

In Example 42, the subject matter of Example 41, wherein the portion of the KVS tree scope includes a node ID for the data.

In Example 43, the subject matter of any one or more of Examples 39-42, wherein the portion of the KVS tree scope includes a level ID for the data.

In Example 44, the subject matter of any one or more of Examples 39-43, wherein the portion of the KVS tree scope includes a type for the data.

In Example 45, the subject matter of any one or more of Examples 36-44, wherein assigning the stability value includes: maintaining a set of frequencies of stability value assignments for level IDs, each member of the set of frequencies corresponding to a unique level ID; retrieving a frequency from the set of frequencies that corresponds to a level ID in the KVS tree scope; and selecting a stability value from a mapping of stability values to frequency ranges based on the frequency.

In Example 46, the subject matter of any one or more of Examples 31-45, wherein assigning the stream ID to the write request based on the KVS tree scope and the stability value of the write request includes: creating a stream-scope value from the KVS tree scope; performing a lookup in a selected-stream data structure using the stream-scope value; and returning a stream ID corresponding to the stream-scope from the selected-stream data structure.

In Example 47, the subject matter of Example 46, wherein performing the lookup in the selected-stream data structure includes: failing to find the stream-scope value in the selected-stream data structure; performing a lookup on an available-stream data structure using the stability value; receiving a result of the lookup that includes a stream ID; and adding an entry to the selected-stream data structure that includes the stream ID, the stream-scope value, and a timestamp of a time when the entry is added.

In Example 48, the subject matter of Example 47, wherein multiple entries of the available-stream data structure correspond to the stability value, and wherein the result of the lookup is at least one of a round-robin or random selection of an entry from the multiple entries.

In Example 49, the subject matter of any one or more of Examples 47-48, wherein the operations comprise initializing the available-stream data structure by: obtaining a number of streams available from the multi-stream storage device; obtaining a stream ID for all streams available from the multi-stream storage device, each stream ID being unique; adding stream IDs to stability value groups; and creating a record in the available-stream data structure for each stream ID, the record including the stream ID, a device ID for the multi-stream storage device, and a stability value corresponding to a stability value group of the stream ID.

In Example 50, the subject matter of any one or more of Examples 46-49, wherein the stream-scope value includes a tree ID for the data.

In Example 51, the subject matter of Example 50, wherein the stream-scope value includes a level ID for the data.

In Example 52, the subject matter of Example 51, wherein the stream-scope value includes a node ID for the data.

In Example 53, the subject matter of any one or more of Examples 50-52, wherein the stream-scope value includes a kvset ID for the data.

In Example 54, the subject matter of any one or more of Examples 46-53, wherein the stream-scope value includes a level ID for the data.

In Example 55, the subject matter of any one or more of Examples 46-54, wherein performing the lookup in the selected-stream data structure includes: failing to find the stream-scope value in the selected-stream data structure; locating a stream ID from either the selected-stream data structure or an available-stream data structure based on the contents of the selected stream data structure; and creating an entry to the selected-stream data structure that includes the stream ID, the stream-scope value, and a timestamp of a time when the entry is added.

In Example 56, the subject matter of Example 55, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are equal; locating a group of entries from the selected-stream data structure that correspond to the stability value; and returning a stream ID of an entry in the group of entries that has the oldest timestamp.

In Example 57, the subject matter of any one or more of Examples 55-56, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are not equal; performing a lookup on the available-stream data structure using the stability value and stream IDs in entries of the selected-stream data structure; receiving a result of the lookup that includes a stream ID that is not in the entries of the selected-stream data structure; and adding an entry to the selected-stream data structure that includes the stream ID, the stream-scope value, and a timestamp of a time when the entry is added.

In Example 58, the subject matter of any one or more of Examples 46-57, wherein returning the stream ID corresponding to the stream-scope from the selected-stream data structure includes updating a timestamp for an entry in the selected-stream data structure corresponding to the stream ID.

In Example 59, the subject matter of any one or more of Examples 46-58, wherein the write request includes a WLAST flag, and wherein returning the stream ID corresponding to the stream-scope from the selected-stream data structure includes removing an entry from the selected-stream data structure corresponding to the stream ID.

In Example 60, the subject matter of any one or more of Examples 46-59, wherein the operations comprise removing entries from the selected-stream data structure with a timestamp beyond a threshold.

Example 61 is a machine-implemented method comprising: receiving notification of a KVS tree write request for a multi-stream storage device, the notification including a KVS tree scope corresponding to data in the write request; assigning a stream identifier (ID) to the write request based on the KVS tree scope and a stability value of the write request; and returning the stream ID to govern stream assignment to the write request, the stream assignment modifying a write operation of the multi-stream storage device.

In Example 62, the subject matter of Example 61, wherein the KVS tree scope includes at least one of: a kvset ID corresponding to a kvset of the data; a node ID corresponding to a node of the KVS tree corresponding to the data; a level ID corresponding to a tree-level corresponding to the data; a tree ID for the KVS tree; a forest ID corresponding to a forest to which the KVS tree belongs; or a type corresponding to the data.

In Example 63, the subject matter of Example 62, wherein the type either a key-block type or a value-block type.

In Example 64, the subject matter of any one or more of Examples 61-63, wherein the notification includes a device ID for the multi-stream device.

In Example 65, the subject matter of Example 64, wherein the notification includes a WLAST flag corresponding to a last write request in a sequence of write requests to write a kvset, identified by the kvset ID, to the multi-stream storage device.

In Example 66, the subject matter of any one or more of Examples 61-65 optionally include assigning the stability value based on the KVS tree scope.

In Example 67, the subject matter of Example 66, wherein the stability value is one of a predefined set of stability values.

In Example 68, the subject matter of Example 67, wherein the predefined set of stability values includes HOT, WARM, and COLD, wherein HOT indicates a lowest expected lifetime of the data on the multi-stream storage device and COLD indicates a highest expected lifetime of the data on the multi-stream storage device.

In Example 69, the subject matter of any one or more of Examples 66-68, wherein assigning the stability value includes locating the stability value from a data structure using a portion of the KVS tree scope.

In Example 70, the subject matter of Example 69, wherein the portion of the KVS tree scope includes a tree ID for the data.

In Example 71, the subject matter of Example 70, wherein the portion of the KVS tree scope includes a level ID for the data.

In Example 72, the subject matter of Example 71, wherein the portion of the KVS tree scope includes a node ID for the data.

In Example 73, the subject matter of any one or more of Examples 69-72, wherein the portion of the KVS tree scope includes a level ID for the data.

In Example 74, the subject matter of any one or more of Examples 69-73, wherein the portion of the KVS tree scope includes a type for the data.

In Example 75, the subject matter of any one or more of Examples 66-74, wherein assigning the stability value includes: maintaining a set of frequencies of stability value assignments for level IDs, each member of the set of frequencies corresponding to a unique level ID; retrieving a frequency from the set of frequencies that corresponds to a level ID in the KVS tree scope; and selecting a stability value from a mapping of stability values to frequency ranges based on the frequency.

In Example 76, the subject matter of any one or more of Examples 61-75, wherein assigning the stream ID to the write request based on the KVS tree scope and the stability value of the write request includes: creating a stream-scope value from the KVS tree scope; performing a lookup in a selected-stream data structure using the stream-scope value; and returning a stream ID corresponding to the stream-scope from the selected-stream data structure.

In Example 77, the subject matter of Example 76, wherein performing the lookup in the selected-stream data structure includes: failing to find the stream-scope value in the selected-stream data structure; performing a lookup on an available-stream data structure using the stability value; receiving a result of the lookup that includes a stream ID; and adding an entry to the selected-stream data structure that includes the stream ID, the stream-scope value, and a timestamp of a time when the entry is added.

In Example 78, the subject matter of Example 77, wherein multiple entries of the available-stream data structure correspond to the stability value, and wherein the result of the lookup is at least one of a round-robin or random selection of an entry from the multiple entries.

In Example 79, the subject matter of any one or more of Examples 77-78 optionally include initializing the available-stream data structure by; obtaining a number of streams available from the multi-stream storage device; obtaining a stream ID for all streams available from the multi-stream storage device, each stream ID being unique; adding stream IDs to stability value groups; and creating a record in the available-stream data structure for each stream ID, the record including the stream ID, a device ID for the multi-stream storage device, and a stability value corresponding to a stability value group of the stream ID.

In Example 80, the subject matter of any one or more of Examples 76-79, wherein the stream-scope value includes a tree ID for the data.

In Example 81, the subject matter of Example 80, wherein the stream-scope value includes a level ID for the data.

In Example 82, the subject matter of Example 81, wherein the stream-scope value includes a node ID for the data.

In Example 83, the subject matter of any one or more of Examples 80-82, wherein the stream-scope value includes a kvset ID for the data.

In Example 84, the subject matter of any one or more of Examples 76-83, wherein the stream-scope value includes a level ID for the data.

In Example 85, the subject matter of any one or more of Examples 76-84, wherein performing the lookup in the selected-stream data structure includes: failing to find the stream-scope value in the selected-stream data structure; locating a stream ID from either the selected-stream data structure or an available-stream data structure based on the contents of the selected stream data structure; and creating an entry to the selected-stream data structure that includes the stream ID, the stream-scope value, and a timestamp of a time when the entry is added.

In Example 86, the subject matter of Example 85, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are equal; locating a group of entries from the selected-stream data structure that correspond to the stability value; and returning a stream ID of an entry in the group of entries that has the oldest timestamp.

In Example 87, the subject matter of any one or more of Examples 85-86, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are not equal; performing a lookup on the available-stream data structure using the stability value and stream IDs in entries of the selected-stream data structure; receiving a result of the lookup that includes a stream ID that is not in the entries of the selected-stream data structure; and adding an entry to the selected-stream data structure that includes the stream ID, the stream-scope value, and a timestamp of a time when the entry is added.

In Example 88, the subject matter of any one or more of Examples 76-87, wherein returning the stream ID corresponding to the stream-scope from the selected-stream data structure includes updating a timestamp for an entry in the selected-stream data structure corresponding to the stream ID.

In Example 89, the subject matter of any one or more of Examples 76-88, wherein the write request includes a WLAST flag, and wherein returning the stream ID corresponding to the stream-scope from the selected-stream data structure includes removing an entry from the selected-stream data structure corresponding to the stream ID.

In Example 90, the subject matter of any one or more of Examples 76-89 optionally include removing entries from the selected-stream data structure with a timestamp beyond a threshold.

Example 91 is a system comprising: means for receiving notification of a KVS tree write request for a multi-stream storage device, the notification including a KVS tree scope corresponding to data in the write request; means for assigning a stream identifier (ID) to the write request based on the KVS tree scope and a stability value of the write request; and means for returning the stream ID to govern stream assignment to the write request, the stream assignment modifying a write operation of the multi-stream storage device.

In Example 92, the subject matter of Example 91, wherein the KVS tree scope includes at least one of: a kvset ID corresponding to a kvset of the data; a node ID corresponding to a node of the KVS tree corresponding to the data; a level ID corresponding to a tree-level corresponding to the data; a tree ID for the KVS tree; a forest ID corresponding to a forest to which the KVS tree belongs; or a type corresponding to the data.

In Example 93, the subject matter of Example 92, wherein the type either a key-block type or a value-block type.

In Example 94, the subject matter of any one or more of Examples 91-93, wherein the notification includes a device ID for the multi-stream device.

In Example 95, the subject matter of Example 94, wherein the notification includes a WLAST flag corresponding to a last write request in a sequence of write requests to write a kvset, identified by the kvset ID, to the multi-stream storage device.

In Example 96, the subject matter of any one or more of Examples 91-95 optionally include means for assigning the stability value based on the KVS tree scope.

In Example 97, the subject matter of Example 96, wherein the stability value is one of a predefined set of stability values.

In Example 98, the subject matter of Example 97, wherein the predefined set of stability values includes HOT, WARM, and COLD, wherein HOT indicates a lowest expected lifetime of the data on the multi-stream storage device and COLD indicates a highest expected lifetime of the data on the multi-stream storage device.

In Example 99, the subject matter of any one or more of Examples 96-98, wherein assigning the stability value includes locating the stability value from a data structure using a portion of the KVS tree scope.

In Example 100, the subject matter of Example 99, wherein the portion of the KVS tree scope includes a tree ID for the data.

In Example 101, the subject matter of Example 100, wherein the portion of the KVS tree scope includes a level ID for the data.

In Example 102, the subject matter of Example 101, wherein the portion of the KVS tree scope includes a node ID for the data.

In Example 103, the subject matter of any one or more of Examples 99-102, wherein the portion of the KVS tree scope includes a level ID for the data.

In Example 104, the subject matter of any one or more of Examples 99-103, wherein the portion of the KVS tree scope includes a type for the data.

In Example 105, the subject matter of any one or more of Examples 96-104, wherein assigning the stability value includes: maintaining a set of frequencies of stability value assignments for level IDs, each member of the set of frequencies corresponding to a unique level ID; retrieving a frequency from the set of frequencies that corresponds to a level ID in the KVS tree scope; and selecting a stability value from a mapping of stability values to frequency ranges based on the frequency.

In Example 106, the subject matter of any one or more of Examples 91-105, wherein assigning the stream ID to the write request based on the KVS tree scope and the stability value of the write request includes: creating a stream-scope value from the KVS tree scope; performing a lookup in a selected-stream data structure using the stream-scope value; and returning a stream ID corresponding to the stream-scope from the selected-stream data structure.

In Example 107, the subject matter of Example 106, wherein performing the lookup in the selected-stream data structure includes: failing to find the stream-scope value in the selected-stream data structure; performing a lookup on an available-stream data structure using the stability value; receiving a result of the lookup that includes a stream ID; and adding an entry to the selected-stream data structure that includes the stream ID, the stream-scope value, and a timestamp of a time when the entry is added.

In Example 108, the subject matter of Example 107, wherein multiple entries of the available-stream data structure correspond to the stability value, and wherein the result of the lookup is at least one of a round-robin or random selection of an entry from the multiple entries.

In Example 109, the subject matter of any one or more of Examples 107-108 optionally include means for initializing the available-stream data structure by: obtaining a number of streams available from the multi-stream storage device; obtaining a stream ID for all streams available from the multi-stream storage device, each stream ID being unique; adding stream IDs to stability value groups; and creating a record in the available-stream data structure for each stream ID, the record including the stream ID, a device ID for the multi-stream storage device, and a stability value corresponding to a stability value group of the stream ID.

In Example 110, the subject matter of any one or more of Examples 106-109, wherein the stream-scope value includes a tree ID for the data.

In Example 111, the subject matter of Example 110, wherein the stream-scope value includes a level ID for the data.

In Example 112, the subject matter of Example 111, wherein the stream-scope value includes a node ID for the data.

In Example 113, the subject matter of any one or more of Examples 110-112, wherein the stream-scope value includes a kvset ID for the data.

In Example 114, the subject matter of any one or more of Examples 106-113, wherein the stream-scope value includes a level ID for the data.

In Example 115, the subject matter of any one or more of Examples 106-114, wherein performing the lookup in the selected-stream data structure includes: failing to find the stream-scope value in the selected-stream data structure; locating a stream ID from either the selected-stream data structure or an available-stream data structure based on the contents of the selected stream data structure; and creating an entry to the selected-stream data structure that includes the stream ID, the stream-scope value, and a timestamp of a time when the entry is added.

In Example 116, the subject matter of Example 115, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are equal; locating a group of entries from the selected-stream data structure that correspond to the stability value; and returning a stream ID of an entry in the group of entries that has the oldest timestamp.

In Example 117, the subject matter of any one or more of Examples 115-116, wherein locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are not equal; performing a lookup on the available-stream data structure using the stability value and stream IDs in entries of the selected-stream data structure; receiving a result of the lookup that includes a stream ID that is not in the entries of the selected-stream data structure; and adding an entry to the selected-stream data structure that includes the stream ID, the stream-scope value, and a timestamp of a time when the entry is added.

In Example 118, the subject matter of any one or more of Examples 106-117, wherein returning the stream ID corresponding to the stream-scope from the selected-stream data structure includes updating a timestamp for an entry in the selected-stream data structure corresponding to the stream ID.

In Example 119, the subject matter of any one or more of Examples 106-118, wherein the write request includes a WLAST flag, and wherein returning the stream ID corresponding to the stream-scope from the selected-stream data structure includes removing an entry from the selected-stream data structure corresponding to the stream ID.

In Example 120, the subject matter of any one or more of Examples 106-119 optionally include means for removing entries from the selected-stream data structure with a timestamp beyond a threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system comprising processing circuitry configured to perform operations comprising:

receiving notification of a key-value set (KVS) tree write request for a multi-stream storage device, the notification comprising a KVS tree scope corresponding to data in the KVS tree write request, the KVS tree being a data structure stored in memory and comprising nodes, a node of the KVS tree comprising a temporally ordered sequence of key-value sets (kvsets), the temporally ordered sequence comprising an oldest kvset at one end of the temporally ordered sequence and a newest kvset at another end of the temporally ordered sequence, the kvsets storing keys in sorted order, a kvset being immutable once added to the temporally ordered sequence of the node, the KVS tree having a determinative mapping that provides a rule such that any key-value pair maps a specific path through the KVS tree to a specific child node at any level of the KVS tree without regard to node content of the KVS tree;

assigning a stream identifier (ID) to the KVS tree write request based on the KVS tree scope and a stability value of the KVS tree write request; and returning the stream ID to govern stream assignment to the KVS tree write request, the stream assignment modifying a write operation of the multi-stream storage device.

2. The system of claim 1, wherein the processing circuitry is configured to assign the stability value based on the KVS tree scope.

3. The system of claim 2, wherein the stability value is one of a predefined set of stability values.

4. The system of claim 3, wherein the predefined set of stability values comprises HOT, WARM, and COLD, wherein HOT indicates a lowest expected lifetime of the data on the multi-stream storage device and COLD indicates a highest expected lifetime of the data on the multi-stream storage device.

5. The system of claim 2, wherein, to assign the stability value, the processing circuitry is configured to locate the stability value from a data structure using a portion of the KVS tree scope.

6. The system of claim 5, wherein the portion of the KVS tree scope comprises a tree ID for the data.

7. The system of claim 5, wherein the portion of the KVS tree scope comprises a level ID for the data.

8. The system of claim 5, wherein the portion of the KVS tree scope comprises a type for the data.

9. The system of claim 2, wherein, to assign the stability value, the processing circuitry is configured to:

maintain a set of frequencies of stability value assignments for level IDs, each member of the set of frequencies corresponding to a unique level ID;

retrieve a frequency from the set of frequencies that corresponds to a level ID in the KVS tree scope; and select a stability value from a mapping of stability values to frequency ranges based on the frequency.

10. The system of claim 1, wherein, to assign the stream ID to the KVS tree write request based on the KVS tree scope and the stability value of the KVS tree write request, the processing circuitry is configured to:

create a stream-scope value from the KVS tree scope;

perform a lookup in a selected-stream data structure using the stream-scope value; and return a stream ID corresponding to the stream-scope from the selected-stream data structure.

11. The system of claim 10, wherein, to perform the lookup in the selected-stream data structure, the processing circuitry is configured to:

fail to find the stream-scope value in the selected-stream data structure;

perform a lookup on an available-stream data structure using the stability value;
receive a result of the lookup that comprises a stream ID; and
add an entry to the selected-stream data structure that comprises the stream ID, the stream-scope value, and a timestamp of a time when the entry is added.

12. The system of claim 11, wherein the processing circuitry is further configured to initialize the available-stream data structure, comprising the processing circuitry configured to:
obtain a number of streams available from the multi-stream storage device;
obtain a stream ID for all streams available from the multi-stream storage device, each stream ID being unique;
add stream IDs to stability value groups; and
create a record in the available-stream data structure for each stream ID, the record comprising the stream ID, a device ID for the multi-stream storage device, and a stability value corresponding to a stability value group of the stream ID.

13. The system of claim 10, wherein, to perform the lookup in the selected-stream data structure, the processing circuitry is configured to:
fail to find the stream-scope value in the selected-stream data structure;
locate a stream ID from either the selected-stream data structure or an available-stream data structure based on the contents of the selected stream data structure; and
create an entry to the selected-stream data structure that comprises the stream ID, the stream-scope value, and a timestamp of a time when the entry is added.

14. The system of claim 13, wherein, to locate the stream ID from either the selected-stream data structure or an available-stream data structure based on the contents of the selected stream data structure, the processing circuitry is configured to:
compare a first number of entries from the selected-stream data structure to a second number of entries from the available-stream data structure to determine that the first number of entries and the second number of entries are equal;
locate a group of entries from the selected-stream data structure that correspond to the stability value; and
return a stream ID of an entry in the group of entries that has the oldest timestamp.

15. At least one machine readable medium comprising instructions that, when executed by a machine, cause the machine to perform operations comprising:
receiving notification of a key-value set (KVS) tree write request for a multi-stream storage device, the notification comprising a KVS tree scope corresponding to data in the KVS tree write request, the KVS tree being a data structure stored in memory and comprising nodes, a node of the KVS tree comprising a temporally ordered sequence of key-value sets (kvsets), the temporally ordered sequence comprising an oldest kvset at one end of the temporally ordered sequence and a newest kvset at another end of the temporally ordered sequence the kvsets storing keys in sorted order, a kvset being immutable once added to the temporally ordered sequence of the node, the KVS tree having a determinative mapping that provides a rule such that any key-value pair maps a specific path through the KVS tree to a specific child node at any level of the KVS tree without regard to node content of the KVS tree;
assigning a stream identifier (ID) to the KVS tree write request based on the KVS tree scope and a stability value of the KVS tree write request; and
returning the stream ID to govern stream assignment to the KVS tree write request, the stream assignment modifying a write operation of the multi-stream storage device.

16. The at least one machine readable medium of claim 15, wherein the operations comprise assigning the stability value based on the KVS tree scope.

17. The at least one machine readable medium of claim 16, wherein the stability value is one of a predefined set of stability values.

18. The at least one machine readable medium of claim 17, wherein the predefined set of stability values comprises HOT, WARM, and COLD, wherein HOT indicates a lowest expected lifetime of the data on the multi-stream storage device and COLD indicates a highest expected lifetime of the data on the multi-stream storage device.

19. The at least one machine readable medium of claim 16, wherein assigning the stability value comprises locating the stability value from a data structure using a portion of the KVS tree scope.

20. The at least one machine readable medium of claim 19, wherein the portion of the KVS tree scope comprises a tree ID for the data.

21. The at least one machine readable medium of claim 20, wherein the portion of the KVS tree scope comprises a level ID for the data.

22. The at least one machine readable medium of claim 21, wherein the portion of the KVS tree scope comprises a node ID for the data.

23. The at least one machine readable medium of claim 19, wherein the portion of the KVS tree scope comprises a level ID for the data.

24. The at least one machine readable medium of claim 19, wherein the portion of the KVS tree scope comprises a type for the data.

25. The at least one machine readable medium of claim 16, wherein assigning the stability value comprises:
maintaining a set of frequencies of stability value assignments for level IDs, each member of the set of frequencies corresponding to a unique level ID;
retrieving a frequency from the set of frequencies that corresponds to a level ID in the KVS tree scope; and
selecting a stability value from a mapping of stability values to frequency ranges based on the frequency.

26. The at least one machine readable medium of claim 15, wherein assigning the stream ID to the KVS tree write request based on the KVS tree scope and the stability value of the KVS tree write request comprises:
creating a stream-scope value from the KVS tree scope;
performing a lookup in a selected-stream data structure using the stream-scope value; and
returning a stream ID corresponding to the stream-scope from the selected-stream data structure.

27. The at least one machine readable medium of claim 26, wherein performing the lookup in the selected-stream data structure comprises:
failing to find the stream-scope value in the selected-stream data structure;
performing a lookup on an available-stream data structure using the stability value;
receiving a result of the lookup that comprises a stream ID; and adding an entry to the selected-stream data structure that comprises the stream ID, the stream-scope value, and a timestamp of a time when the entry is added.

28. The at least one machine readable medium of claim 27, wherein the operations comprise initializing the available-stream data structure by:
obtaining a number of streams available from the multi-stream storage device;
obtaining a stream ID for all streams available from the multi-stream storage device, each stream ID being unique;
adding stream IDs to stability value groups; and
creating a record in the available-stream data structure for each stream ID, the record comprising the stream ID, a device ID for the multi-stream storage device, and a stability value corresponding to a stability value group of the stream ID.

29. The at least one machine readable medium of claim 26, wherein performing the lookup in the selected-stream data structure comprises:
failing to find the stream-scope value in the selected-stream data structure;
locating a stream ID from either the selected-stream data structure or an available-stream data structure based on the contents of the selected stream data structure; and
creating an entry to the selected-stream data structure that comprises the stream ID, the stream-scope value, and a timestamp of a time when the entry is added.

30. The at least one machine readable medium of claim 29, wherein locating the stream ID from either the selected-stream data structure or an available-stream data structure based on the contents of the selected stream data structure comprises:
comparing a first number of entries from the selected-stream data structure to a second number of entries from the available-stream data structure to determine that the first number of entries and the second number of entries are equal;
locating a group of entries from the selected-stream data structure that correspond to the stability value; and
returning a stream ID of an entry in the group of entries that has the oldest timestamp.

31. A machine-implemented method comprising:
receiving notification of a key-value set (KVS)tree write request for a multi-stream storage device, the notification comprising a KVS tree scope corresponding to data in the KVS tree write request, the KVS tree being a data structure stored in memory and comprising nodes, a node of the KVS tree comprising a temporally ordered sequence of key-value sets (kvsets), the temporally ordered sequence comprising an oldest kvset at one end of the temporally ordered sequence and a newest kvset at another end of the temporally ordered sequence, the kvsets storing keys in sorted order, a kvset being immutable once added to the temporally ordered sequence of the node, the KVS tree having a determinative mapping that provides a rule such that any key-value pair maps to a specific path through the KVS tree a specific child node at any level of the KVS tree without regard to node content of the KVS tree;
assigning a stream identifier (ID) to the KVS tree write request based on the KVS tree scope and a stability value of the KVS tree write request; and
returning the stream ID to govern stream assignment to the KVS tree write request, the stream assignment modifying a write operation of the multi-stream storage device.

32. The method of claim 31, comprising assigning the stability value based on the KVS tree scope.

33. The method of claim 31, wherein assigning the stream ID to the KVS tree write request based on the KVS tree scope and the stability value of the KVS tree write request comprises:
creating a stream-scope value from the KVS tree scope;
performing a lookup in a selected-stream data structure using the stream-scope value; and
returning a stream ID corresponding to the stream-scope from the selected-stream data structure.

34. The method of claim 33, wherein performing the lookup in the selected-stream data structure comprises:
failing to find the stream-scope value in the selected-stream data structure;
locating a stream ID from either the selected-stream data structure or an available-stream data structure based on the contents of the selected stream data structure; and
creating an entry to the selected-stream data structure that comprises the stream ID, the stream-scope value, and a timestamp of a time when the entry is added.

35. A system comprising:
means for receiving notification of a key-value set (KVS) tree write request for a multi-stream storage device, the notification comprising a KVS tree scope corresponding to data in the KVS tree write request, the KVS tree being a data structure stored in memory and comprising nodes, a node of the KVS tree comprising a temporally ordered sequence of key-value sets (kvsets), the temporally ordered sequence comprising an oldest kvset at one end of the temporally ordered sequence and a newest kvset at another end of the temporally ordered sequence, a kvset being immutable once added to the temporally ordered sequence of the node, the KVS tree having a determinative mapping that provides a rule such that, any key-value pair maps to a specific path through the KVS tree a specific child node at any level of the KVS tree without regard to node content of the KVS tree;
means for assigning a stream identifier (ID) to the KVS tree write request based on the KVS tree scope and a stability value of the KVS tree write request; and
means for returning the stream ID to govern stream assignment to the KVS tree write request, the stream assignment modifying a write operation of the multi-stream storage device.

36. The system of claim 35, comprising means for assigning the stability value based on the KVS tree scope.

37. The system of claim 35, wherein assigning the stream ID to the KVS tree write request based on the KVS tree scope and the stability value of the KVS tree write request comprises:
creating a stream-scope value from the KVS tree scope;
performing a lookup in a selected-stream data structure using the stream-scope value; and
returning a stream ID corresponding to the stream-scope from the selected-stream data structure.

38. The system of claim 37, wherein performing the lookup in the selected-stream data structure comprises:
failing to find the stream-scope value in the selected-stream data structure;
locating a stream ID from either the selected-stream data structure or an available-stream data structure based on the contents of the selected stream data structure; and creating an entry to the selected-stream data structure that comprises the stream ID, the stream-scope value, and a timestamp of a time when the entry is added.

\* \* \* \* \*